July 22, 1952 G. C. CURRIE ET AL 2,603,924
MEANS FOR PLACING BOTTLES IN OPEN BOTTOMED CARTONS
Filed Nov. 28, 1947 32 Sheets-Sheet 8
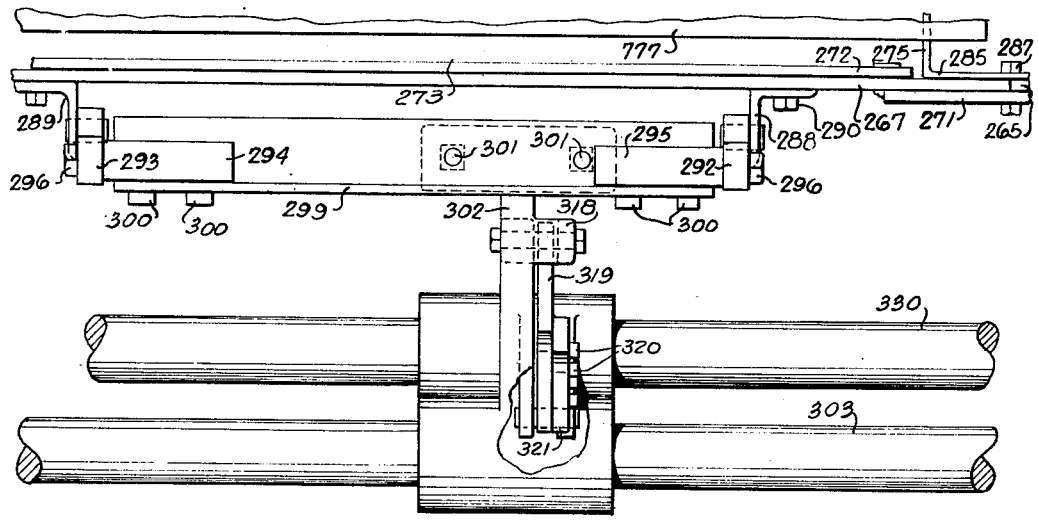
Fig-10
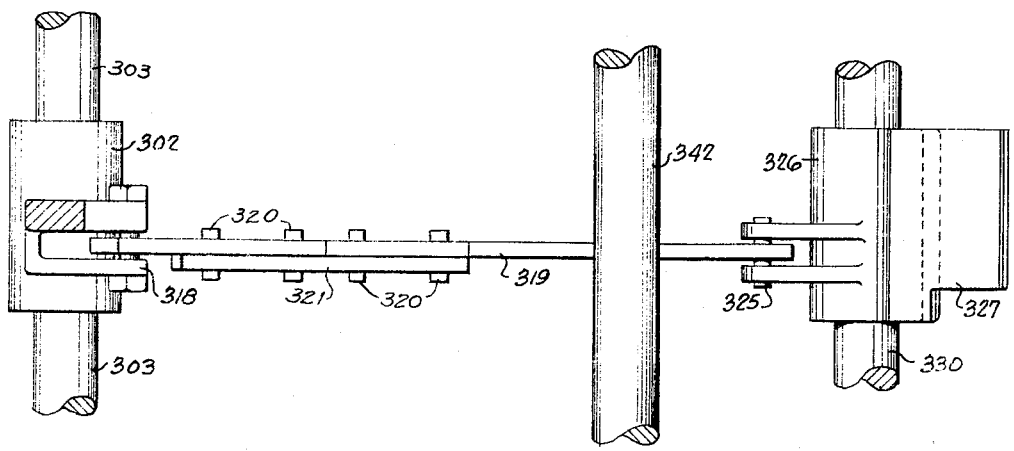
Fig-11
GROVER C. CURRIE,
BERNARD D. DANS, &
STERLING R. ARNER,
INVENTORS.
BY 
ATTORNEY.

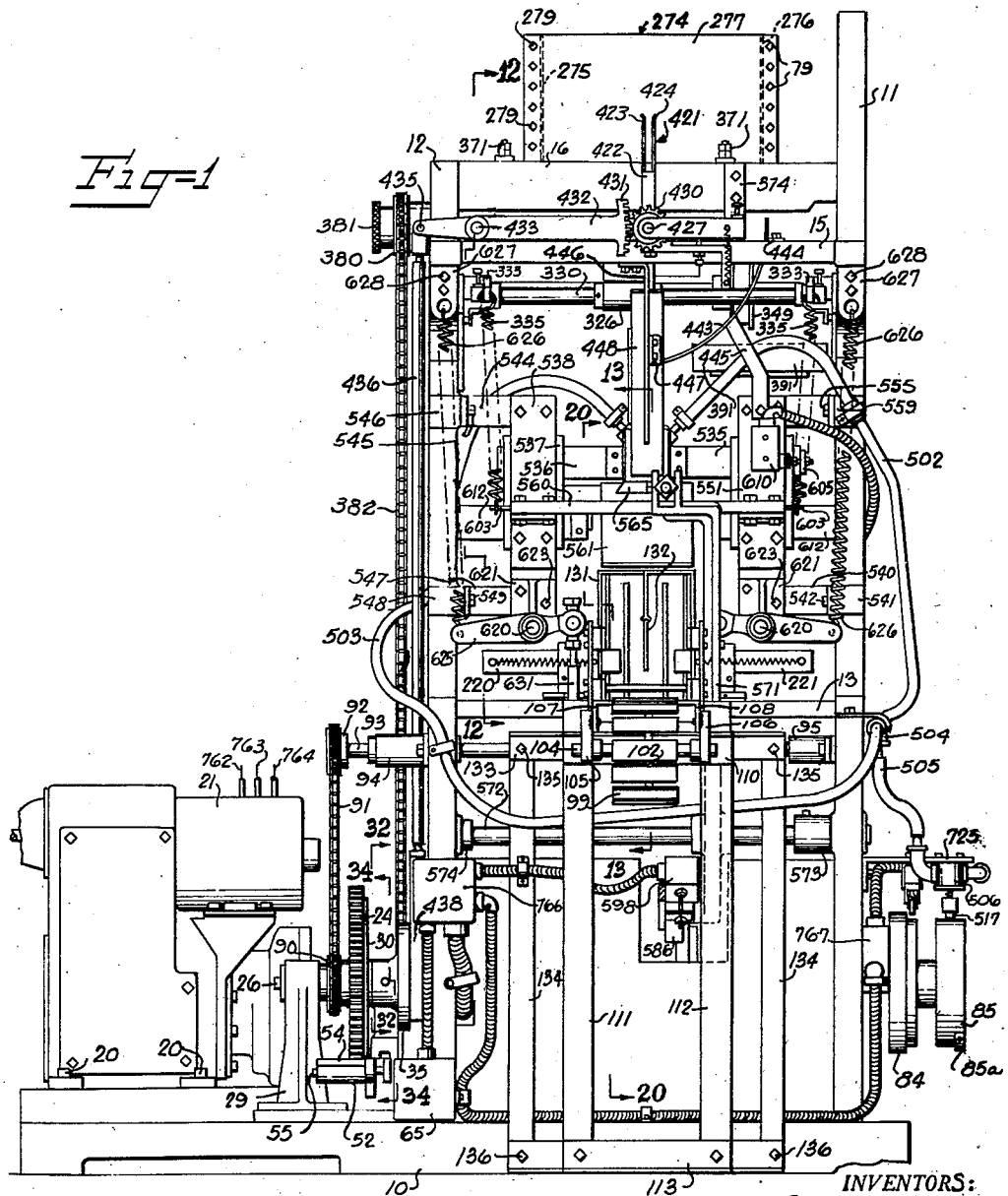

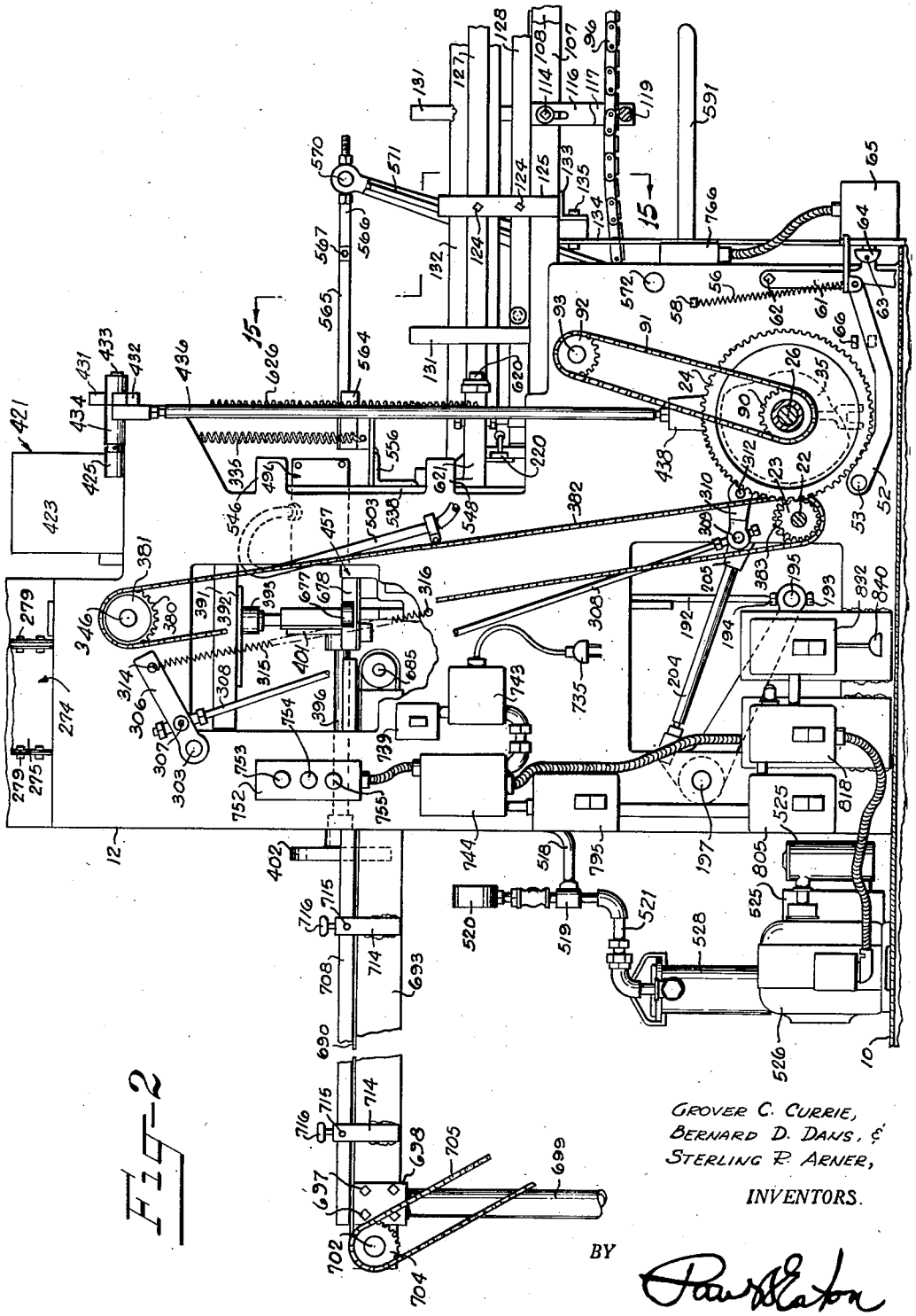

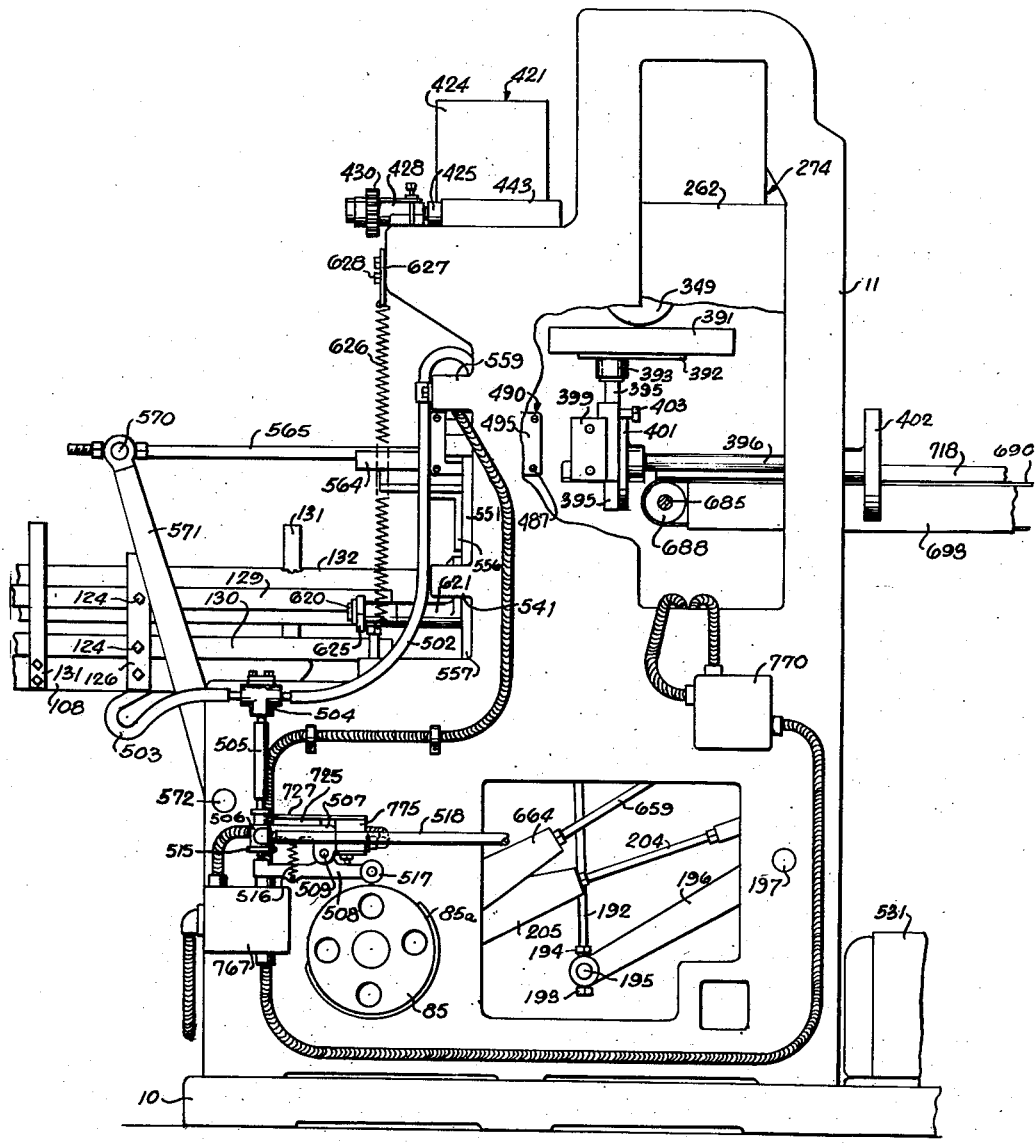

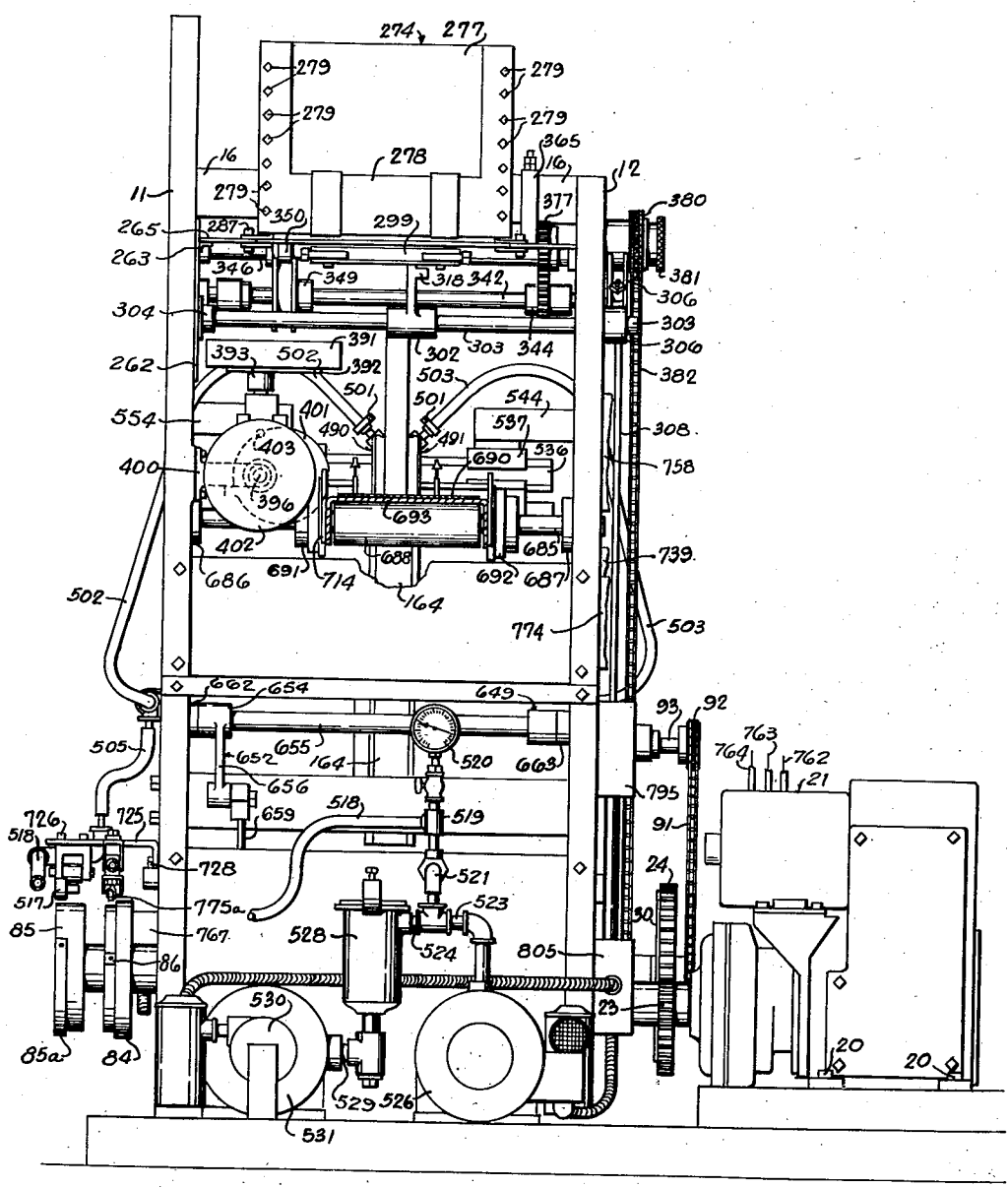

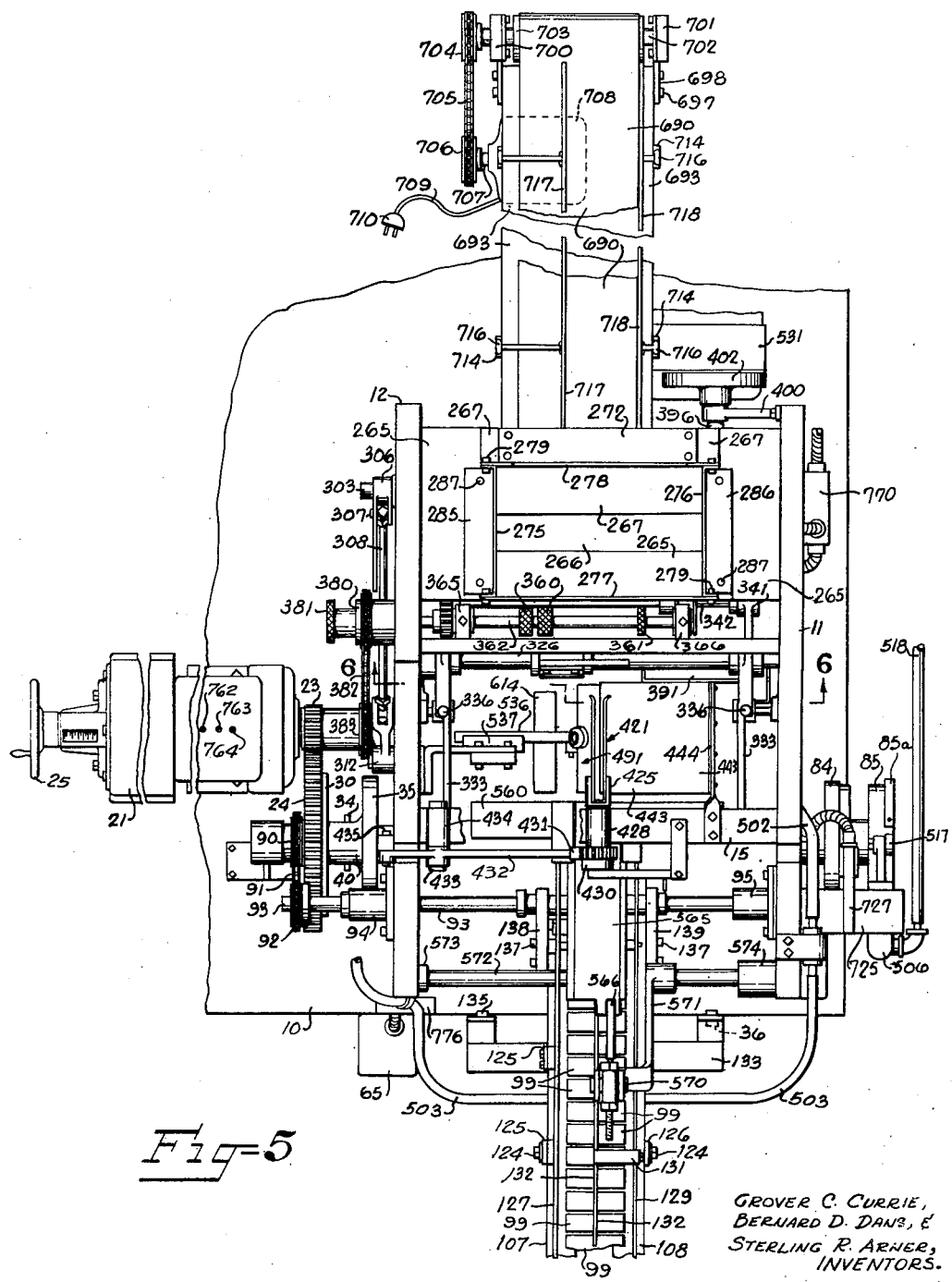

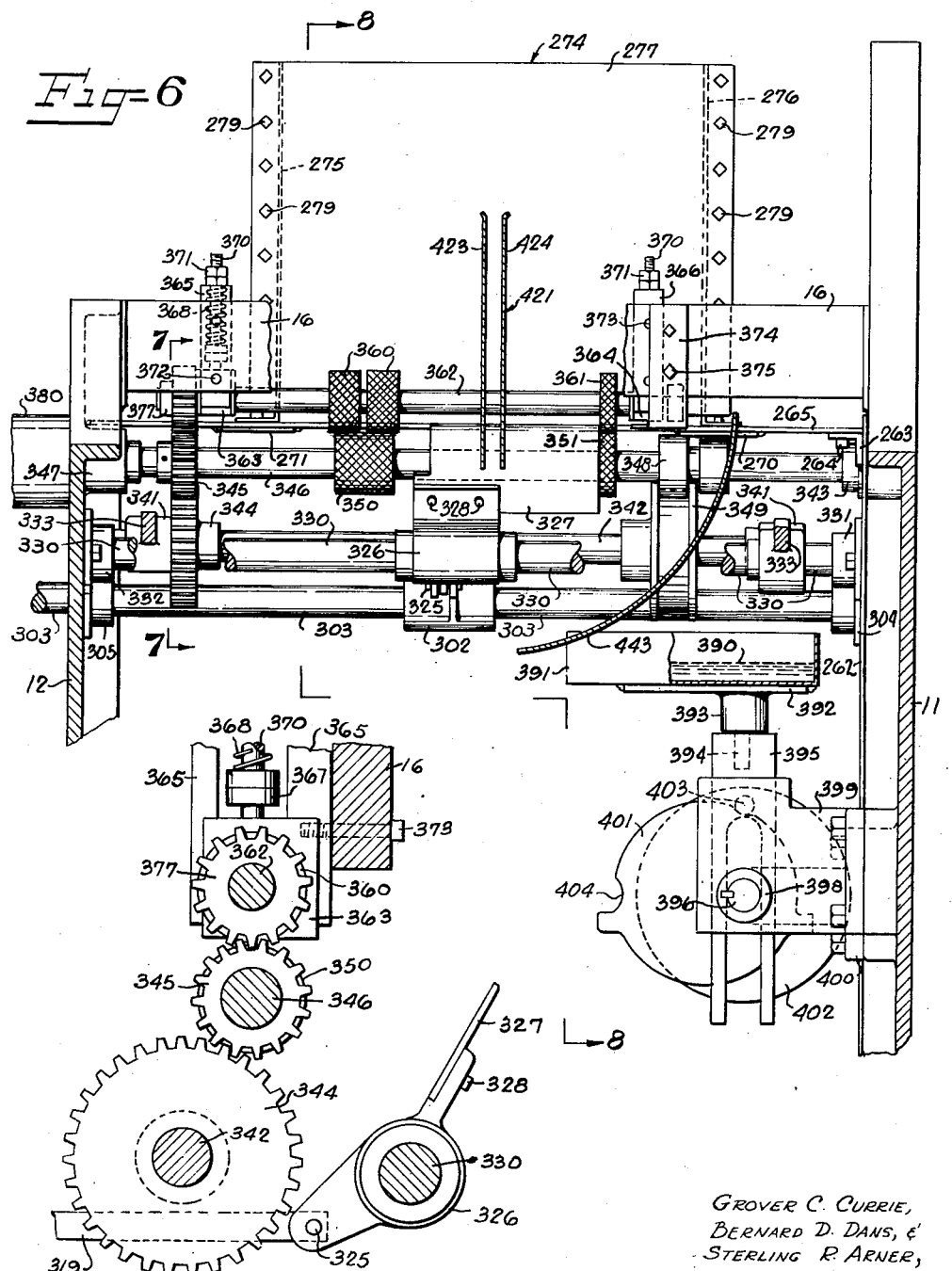

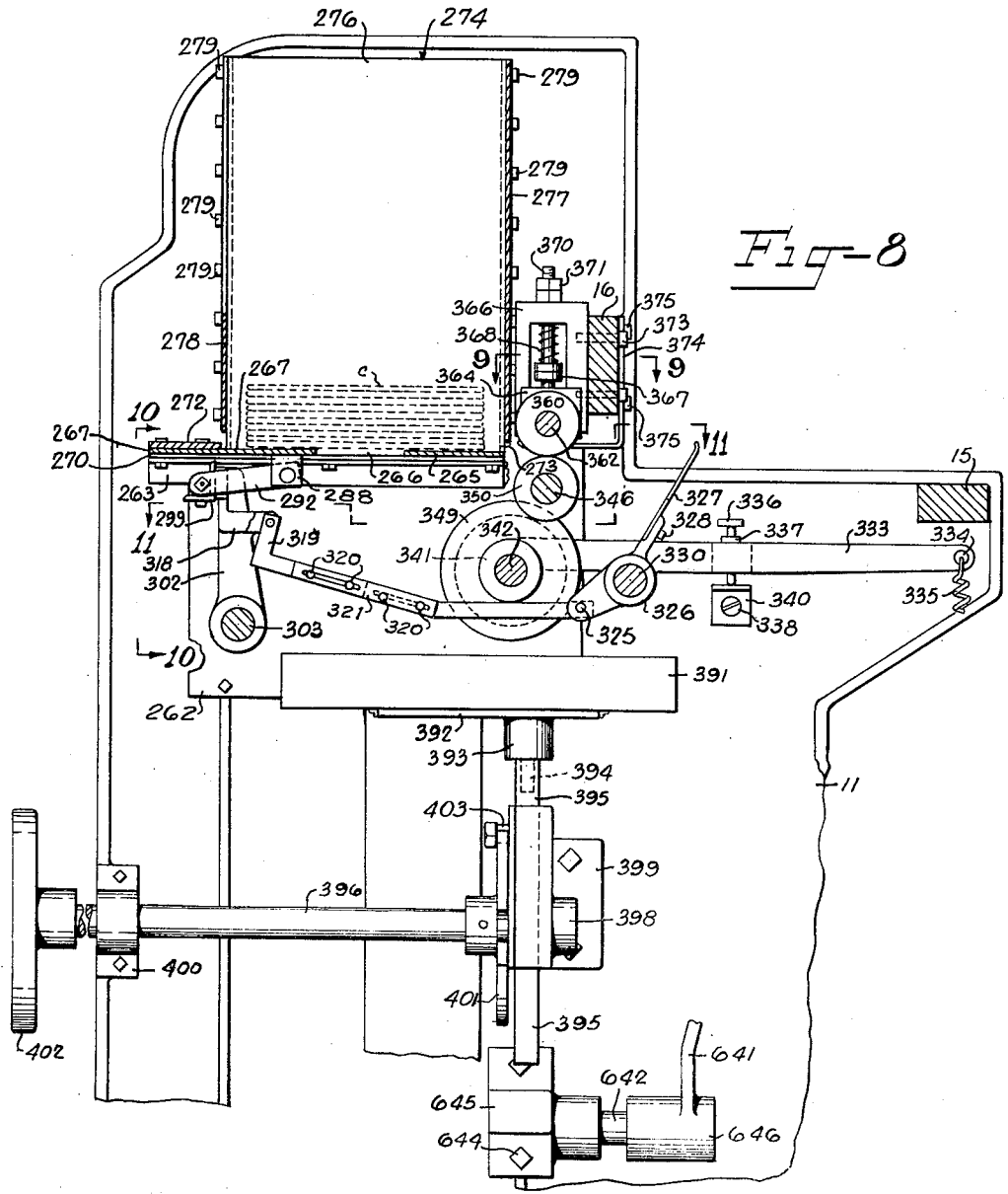

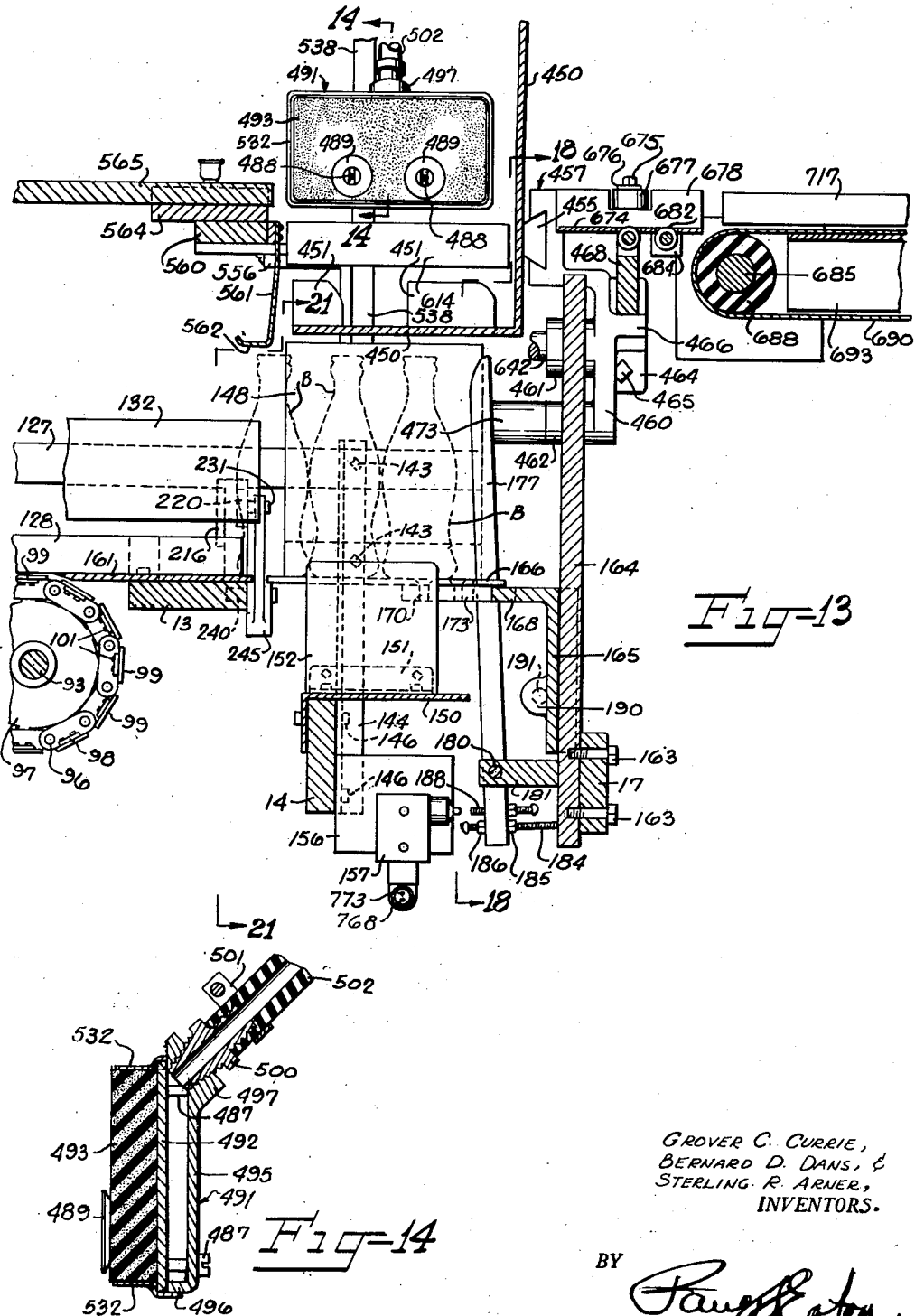

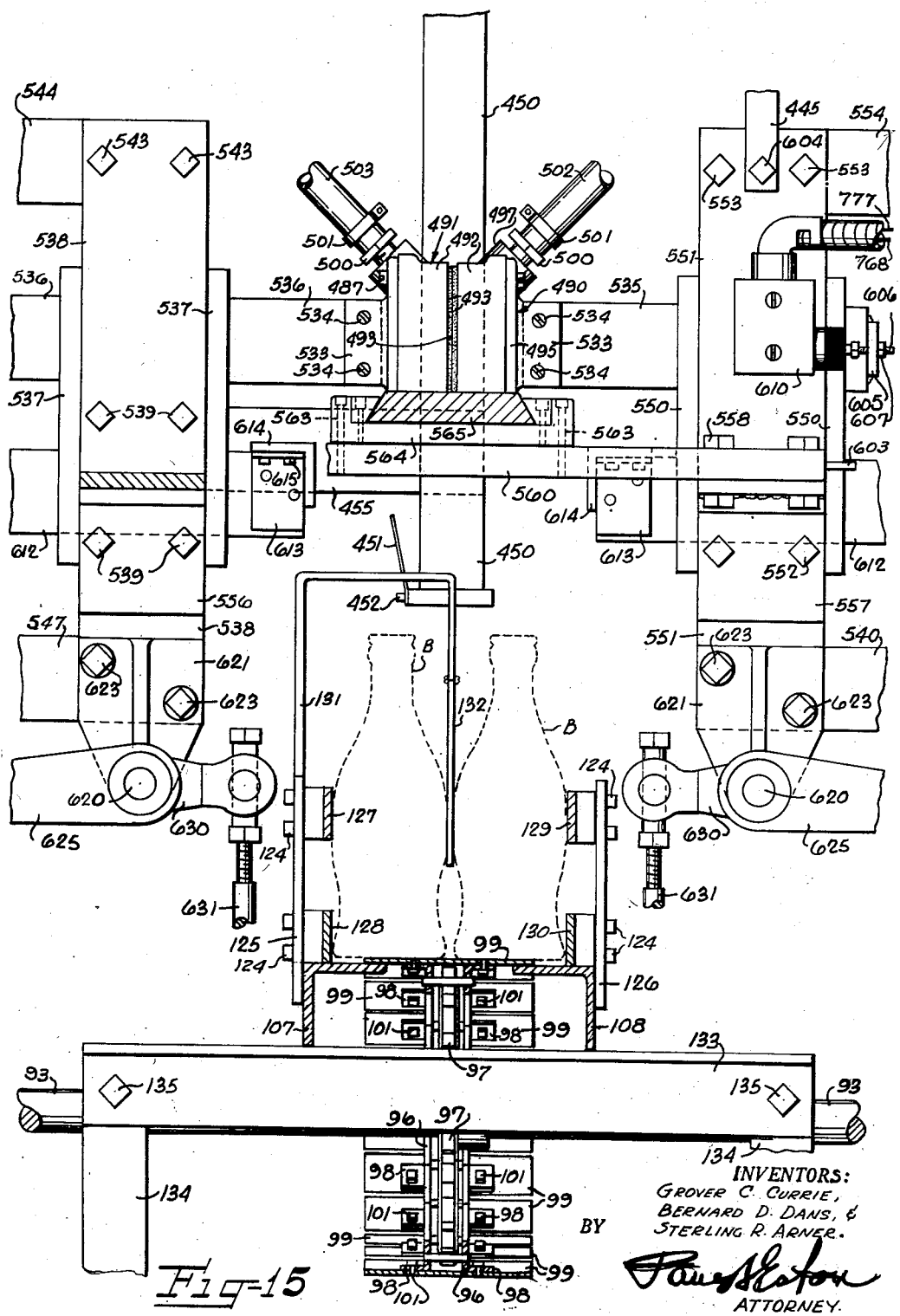

July 22, 1952 G. C. CURRIE ET AL 2,603,924
MEANS FOR PLACING BOTTLES IN OPEN BOTTOMED CARTONS
Filed Nov. 28, 1947 32 Sheets-Sheet 15
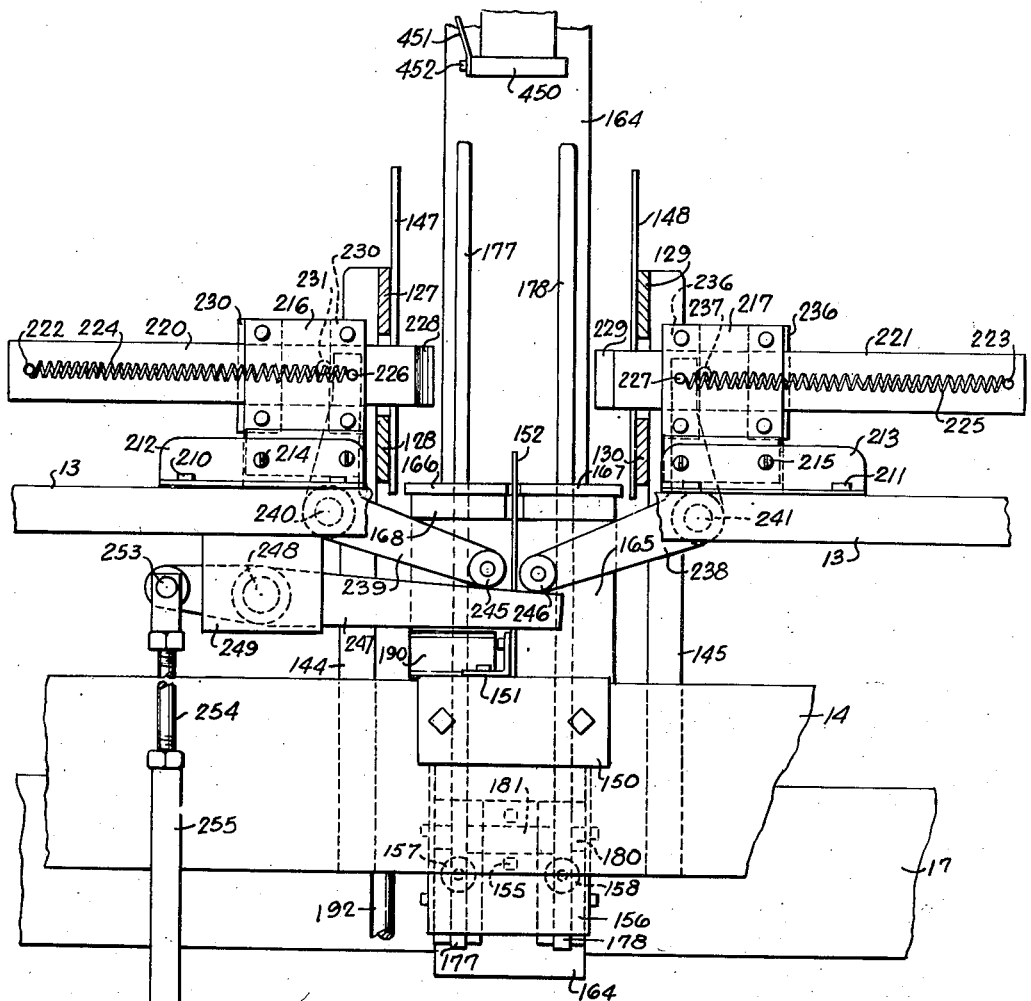
Fig-21
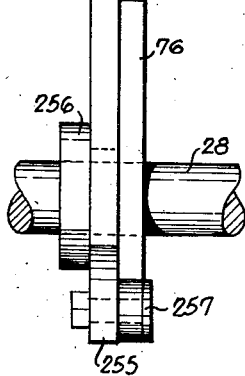
GROVER C. CURRIE,
BERNARD D. DANS, &
STERLING R. ARNER,
INVENTORS.
BY Paul D Eaton
ATTORNEY.

July 22, 1952    G. C. CURRIE ET AL    2,603,924
MEANS FOR PLACING BOTTLES IN OPEN BOTTOMED CARTONS
Filed Nov. 28, 1947    32 Sheets-Sheet 21

GROVER C. CURRIE,
BERNARD D. DANS, &
STERLING R. ARNER,
INVENTORS.

BY
ATTORNEY

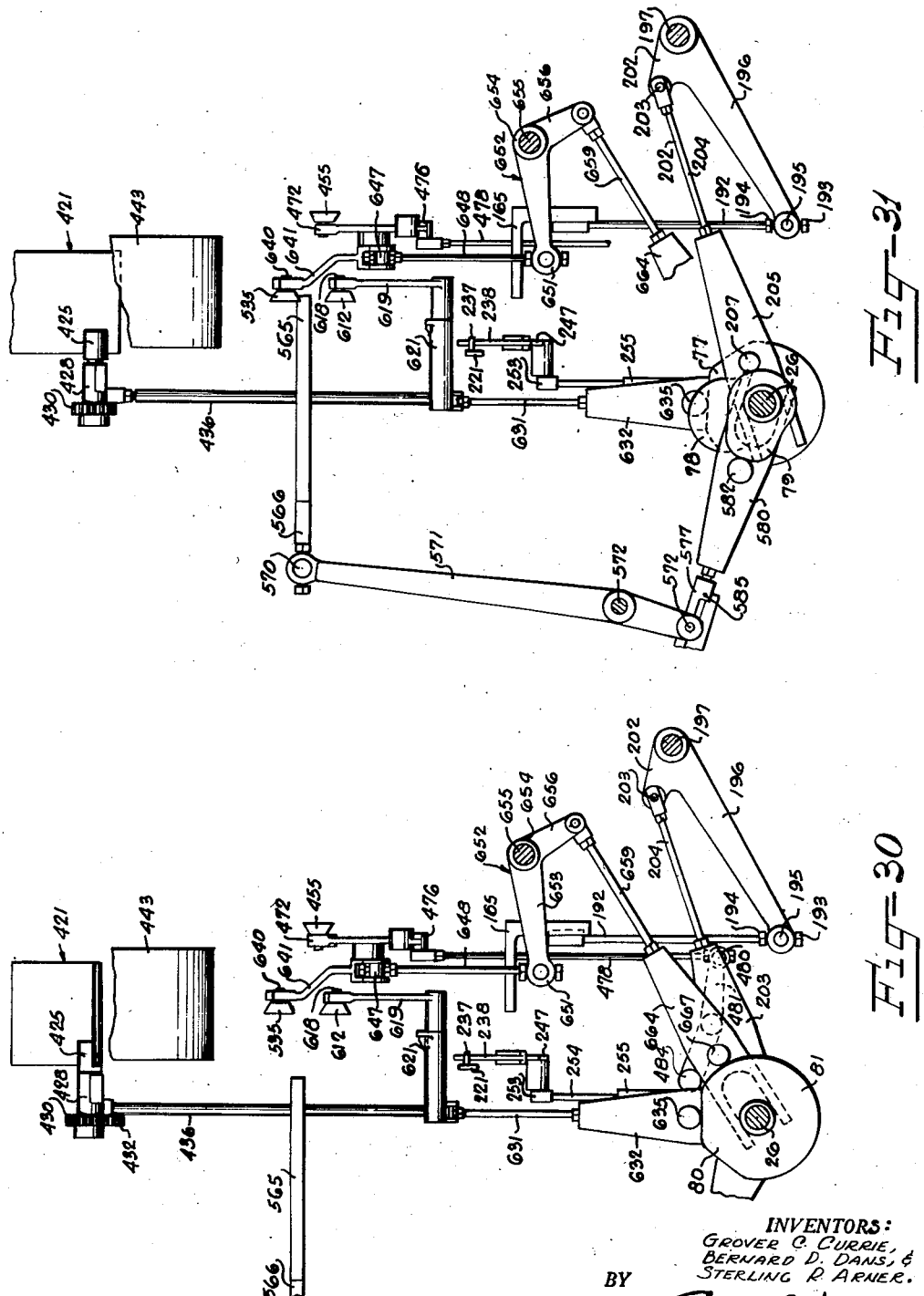

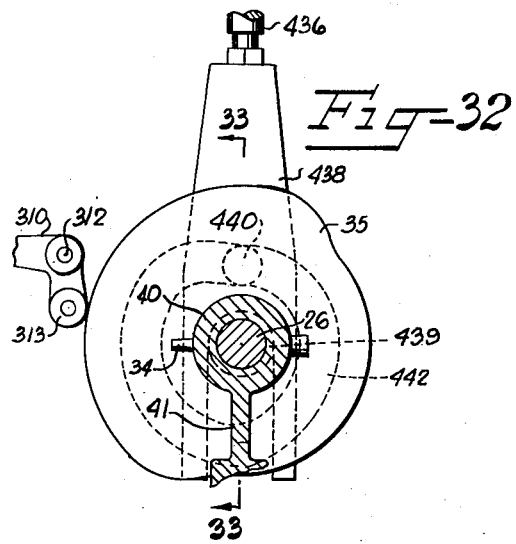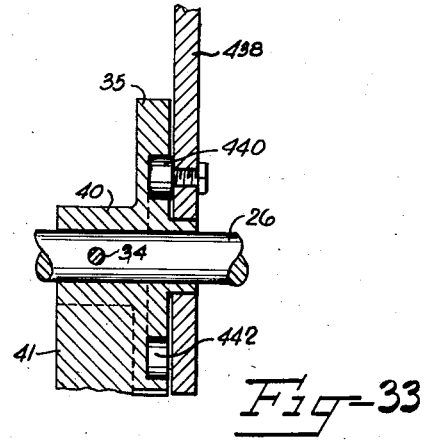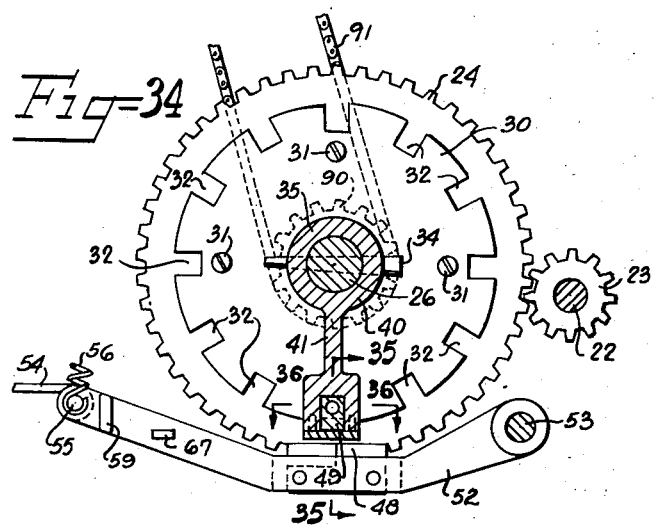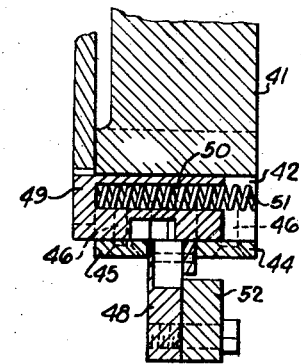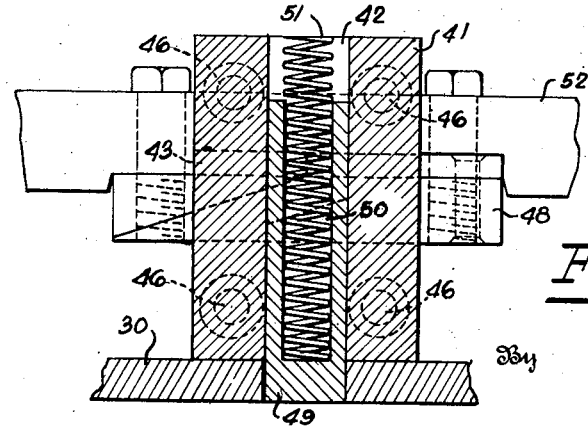

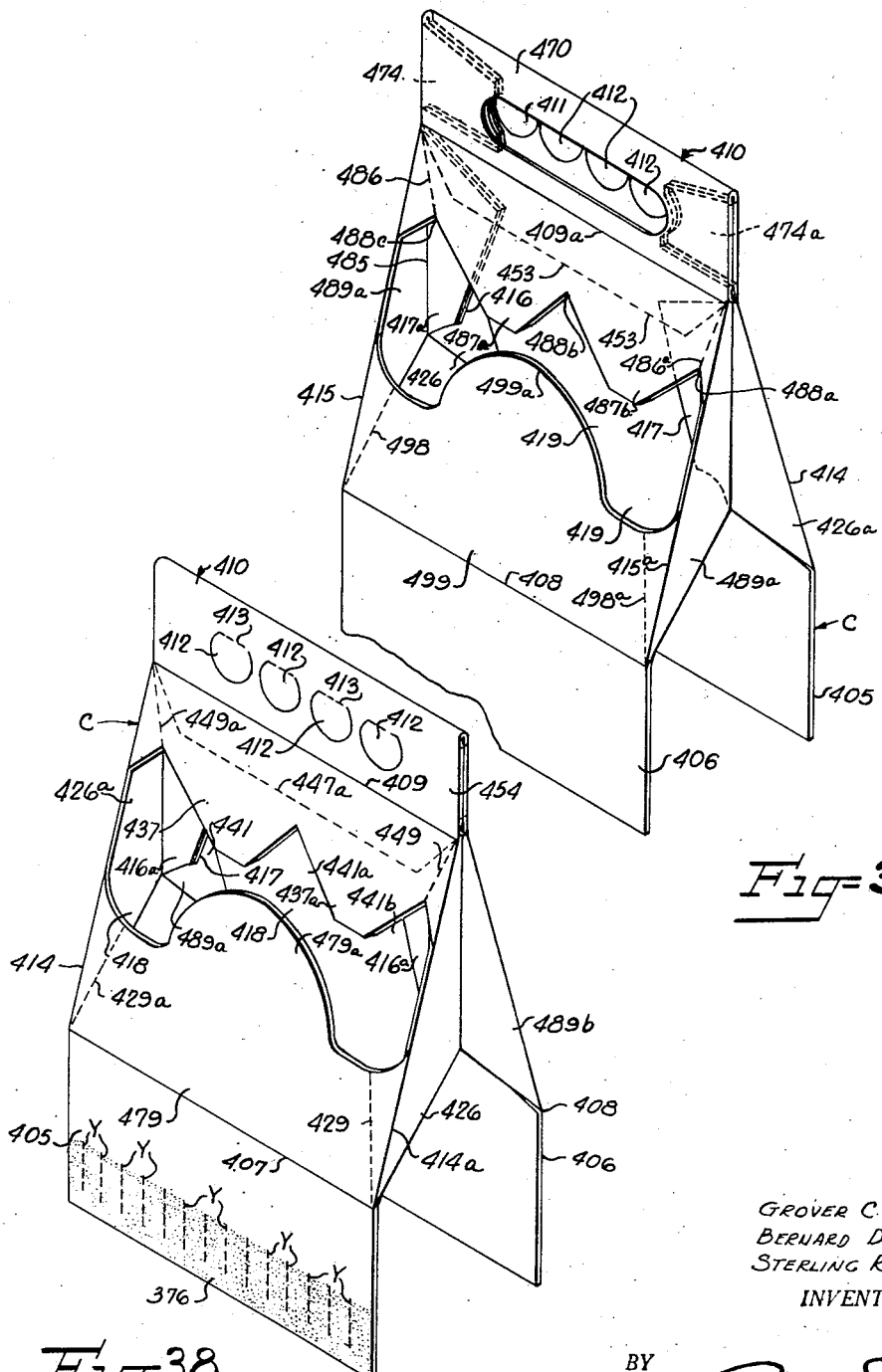

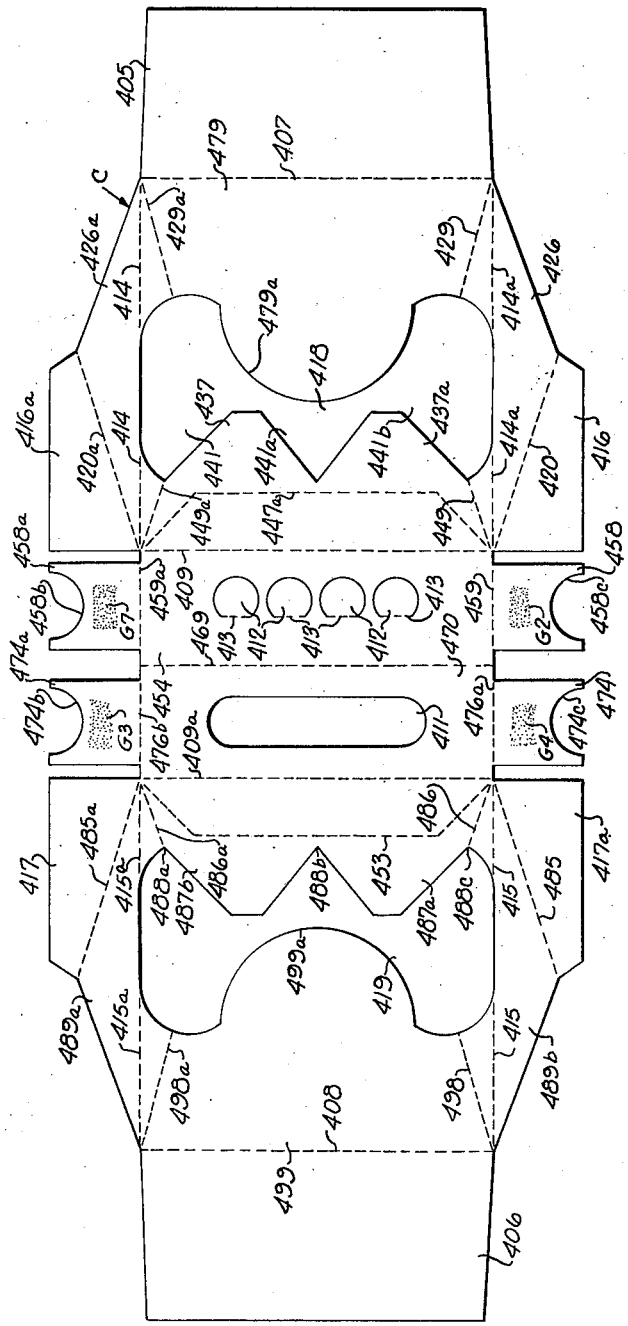

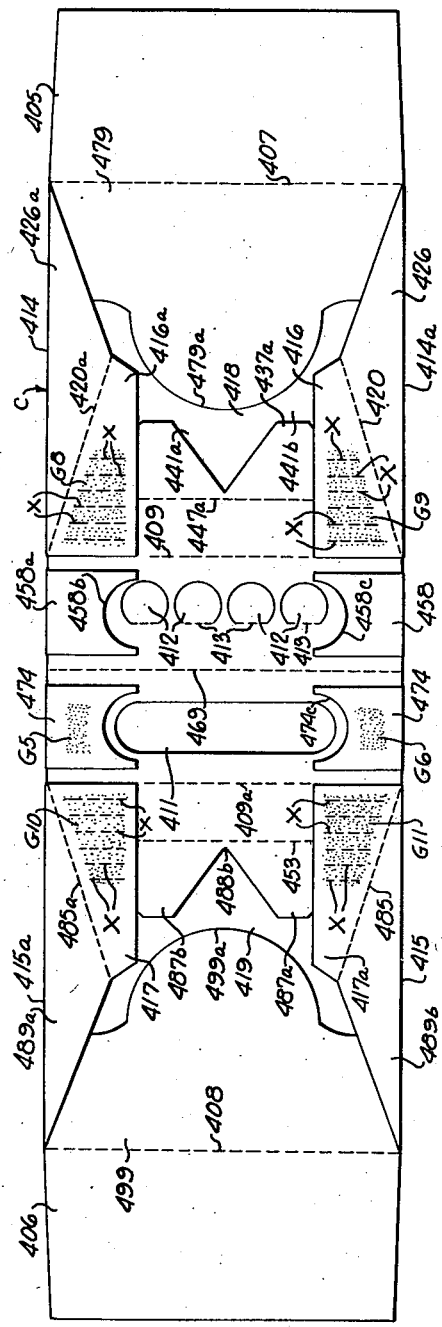

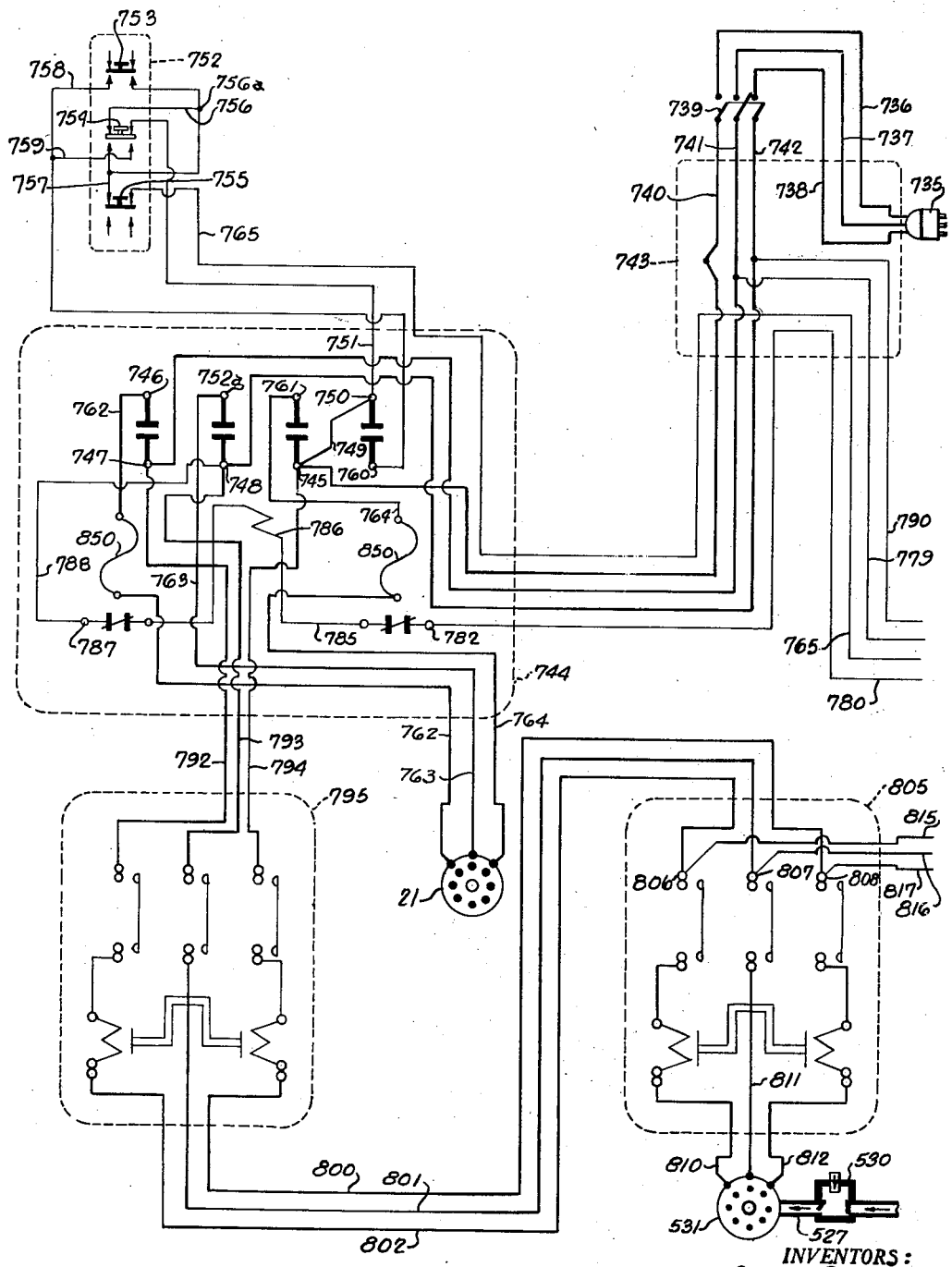

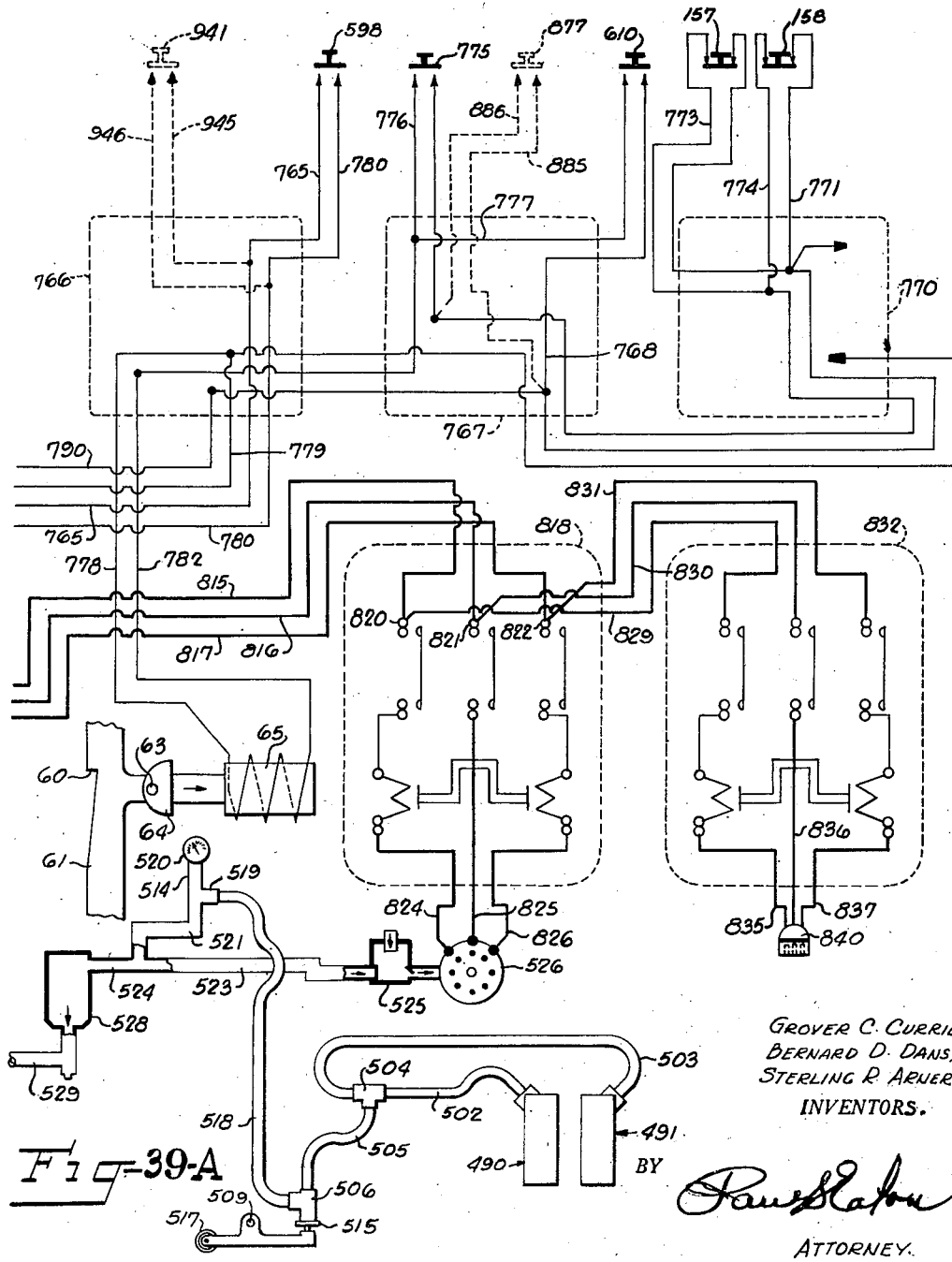

July 22, 1952     G. C. CURRIE ET AL     2,603,924
MEANS FOR PLACING BOTTLES IN OPEN BOTTOMED CARTONS
Filed Nov. 28, 1947     32 Sheets-Sheet 30
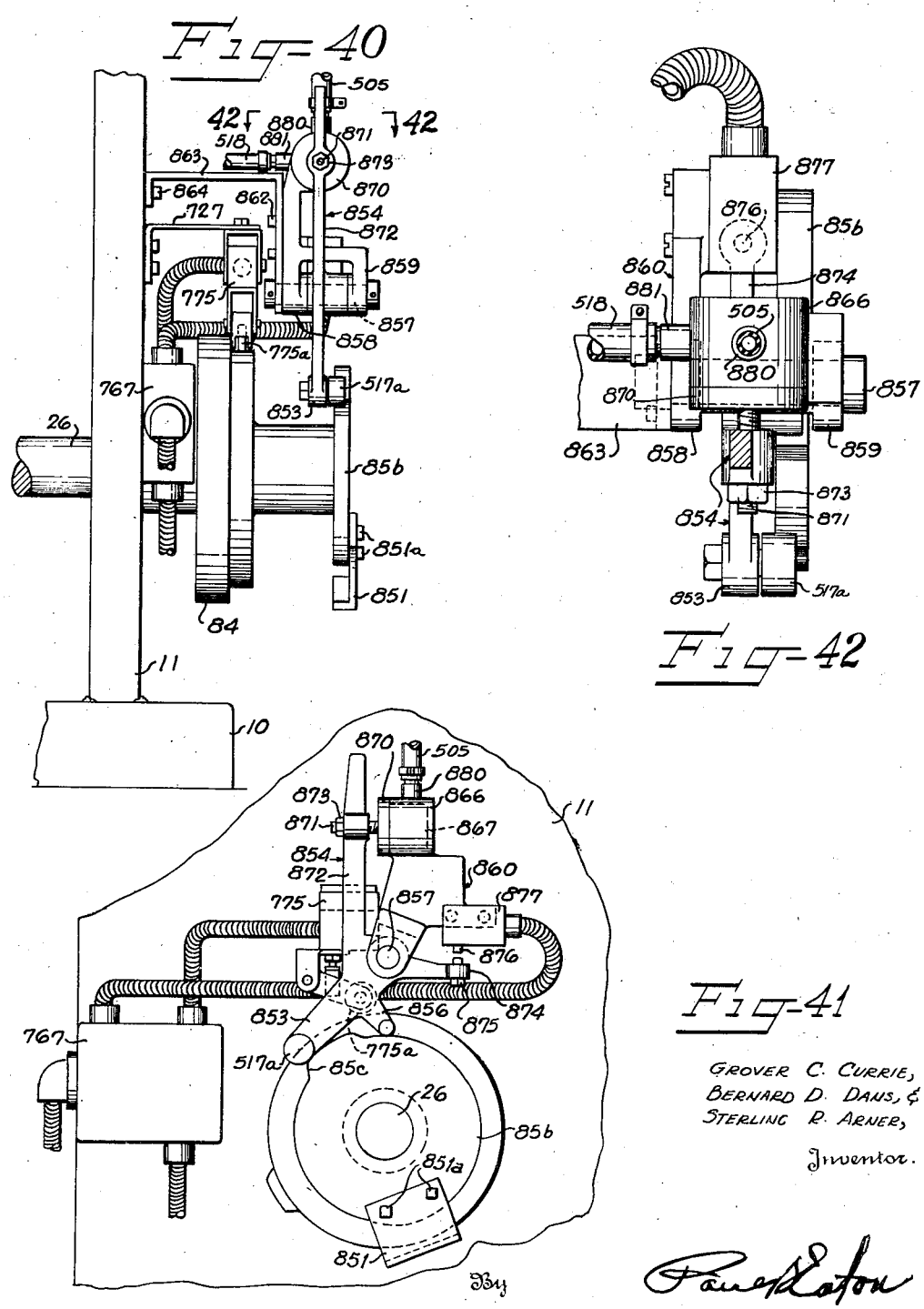

July 22, 1952 G. C. CURRIE ET AL 2,603,924
MEANS FOR PLACING BOTTLES IN OPEN BOTTOMED CARTONS
Filed Nov. 28, 1947 32 Sheets-Sheet 31
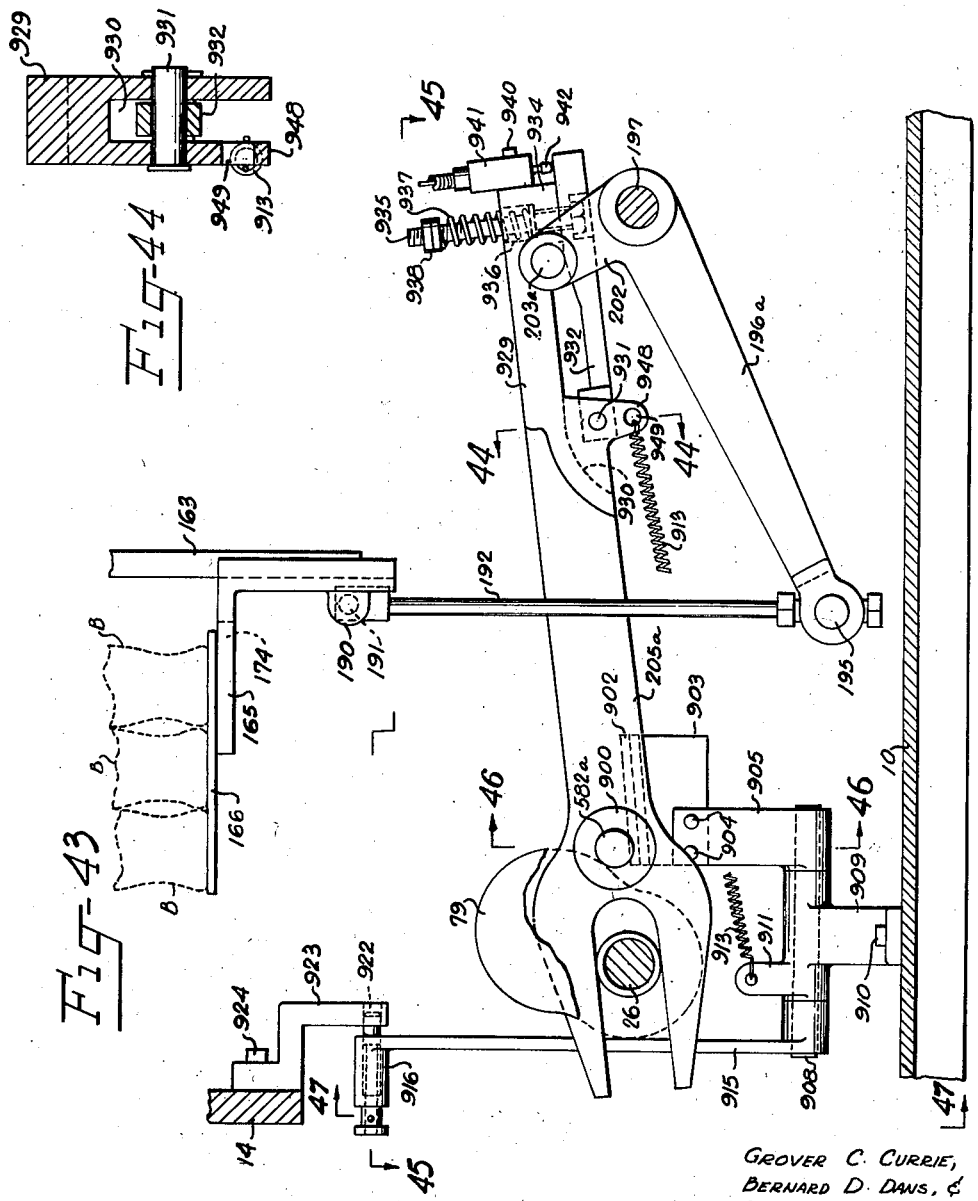
GROVER C. CURRIE,
BERNARD D. DAVIS, &
STERLING R. ARNER,
Inventor.
By Paul Eaton
Attorney

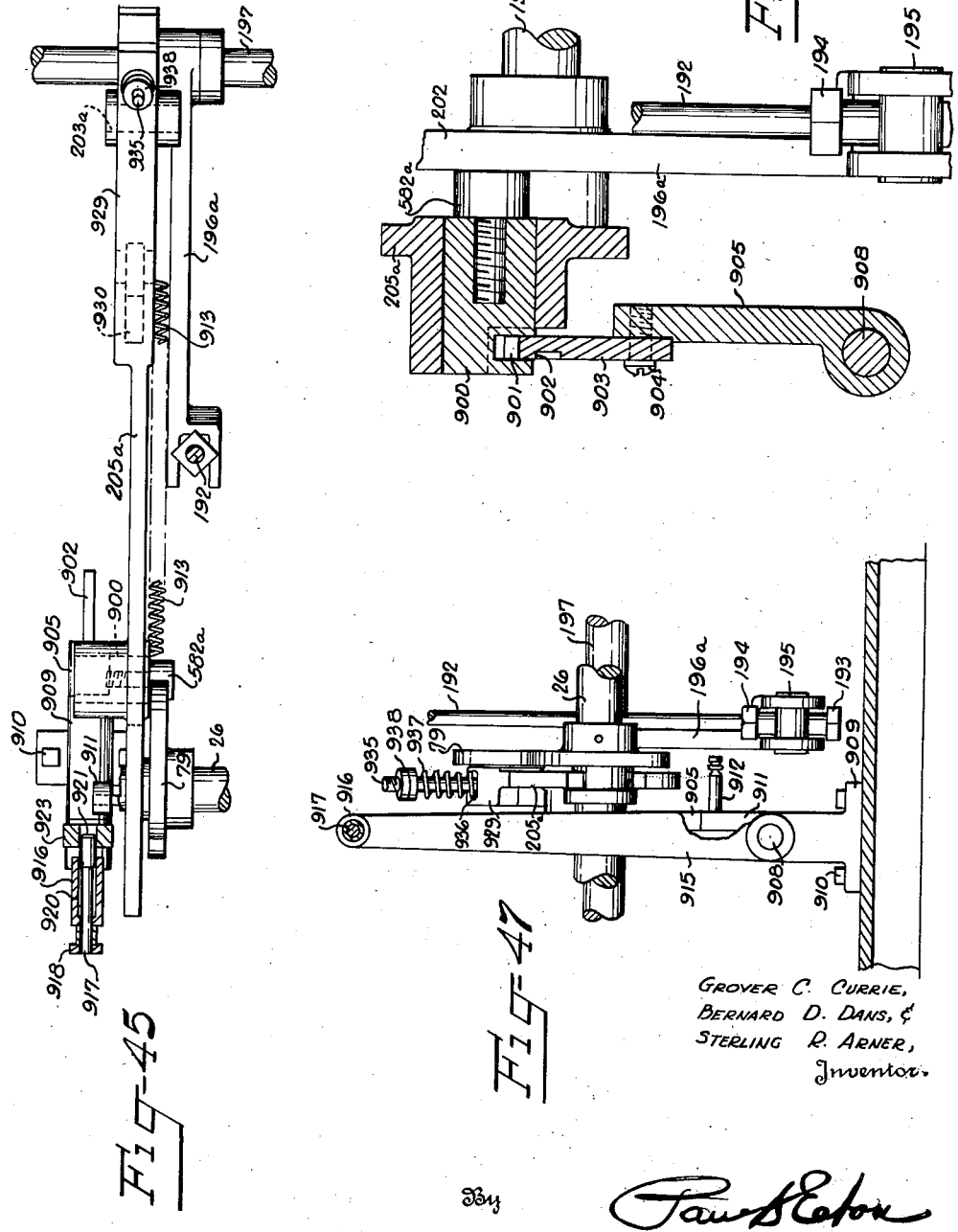

Patented July 22, 1952

2,603,924

UNITED STATES PATENT OFFICE 2,603,924

MEANS FOR PLACING BOTTLES IN OPEN BOTTOMED CARTONS

Grover C. Currie, Charlotte, N. C., Bernard D. Dans, Brooklyn, N. Y., and Sterling R. Arner, Charlotte, N. C., assignors to Dacam Corporation, Charlotte, N. C., a corporation of North Carolina Application November 28, 1947, Serial No. 788,602

35 Claims. (Cl. 53—22)

1

This invention relates to a machine for receiving bottled beverages and placing the same in a carton and sealing the carton and delivering the filled carton from the machine.

Heretofore, bottled beverages have been enclosed in cartons of six with three bottles on each side of a carton and the carton has usually been assembled and the bottom secured in position with slots on each side of the carton and as the beverages are delivered from a bottling machine, operators seize three bottles in each hand and insert them into the two slots on each side of the carton.

It is an object of this invention to overcome this manual operation and to provide a machine to which the filled bottles are delivered from a bottling machine, and the cartoning machine will take open bottomed cartons and move the same to a definite position in the machine, and then means are provided for opening the sides of the carton apart from each other and then other means are provided for raising a group of bottles up into the carton and then the cartons and the bottles are held in elevated position while the elevating means are moved away from below the bottles, and then the bottom flaps are moved to horizontal position against the bottoms of the bottles, then secured in horizontal position and then are delivered onto an endless conveyor at the exit end of the machine.

It is therefore an object of this invention to provide an apparatus for receiving bottles from a bottling machine and placing the same in cartons and delivering the cartons with the bottles therein from the machine.

Some of the objects of the invention having been stated, other objects will appear when taken in connection with the accompanying drawings, in which Figure 1 is an end elevation of the intake end of the machine;

Figure 2 is a side elevation looking from the left-hand side of Figure 1;

Figure 3 is a side elevation being a reverse view from Figure 2 and looking from the right-hand side of Figure 1;

Figure 3-A is an elevation showing the discharge end of a conveyor from a bottling machine and the intake end of the conveyor of the cartoning machine;

Figure 4 is an end elevation which is a reverse view from Figure 1 and looking at the discharge end of the machine;

Figure 5 is a top plan view of the machine;

Figure 6 is a vertical sectional view with parts

Figure 12:
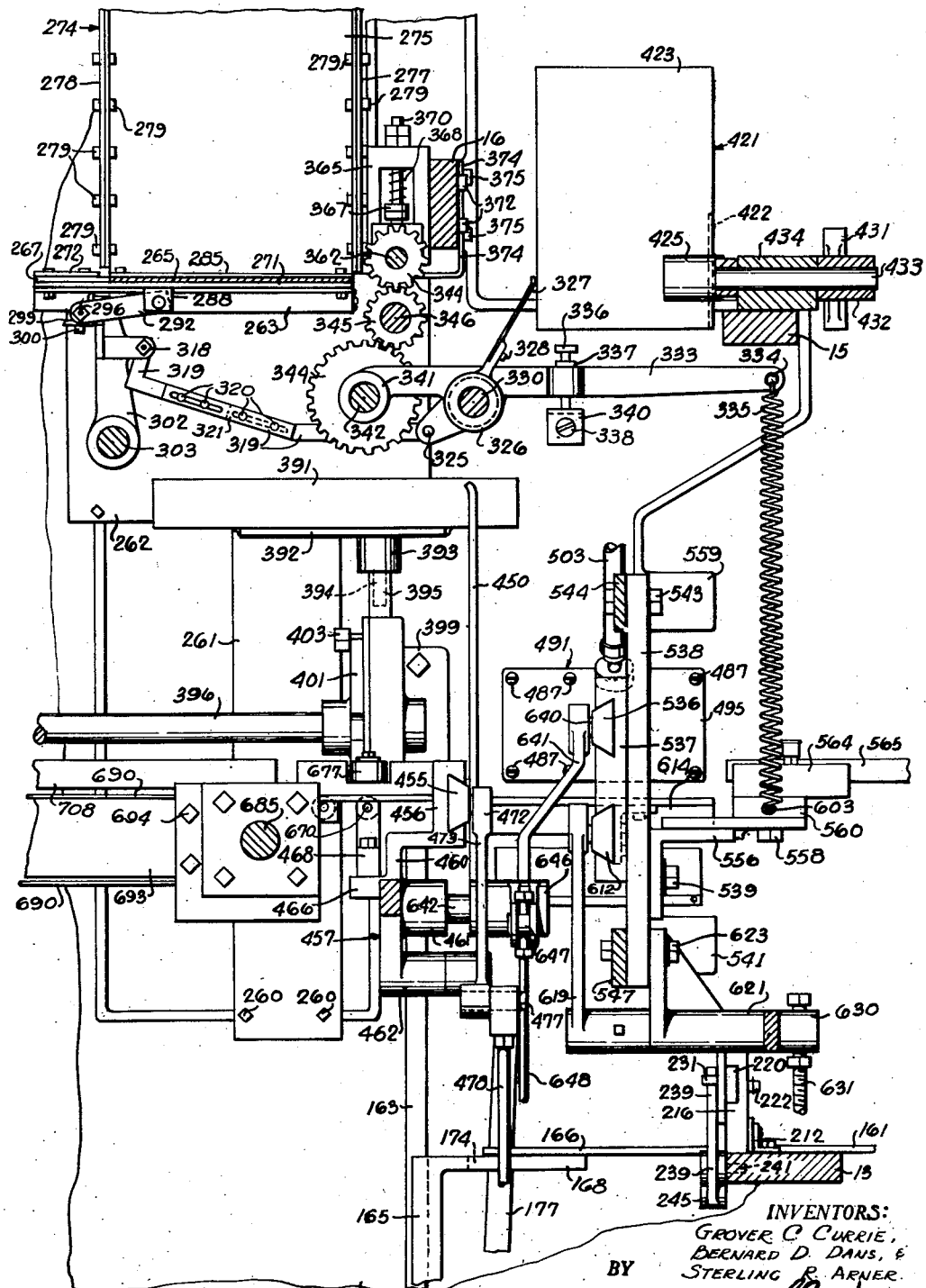
Figure 16:
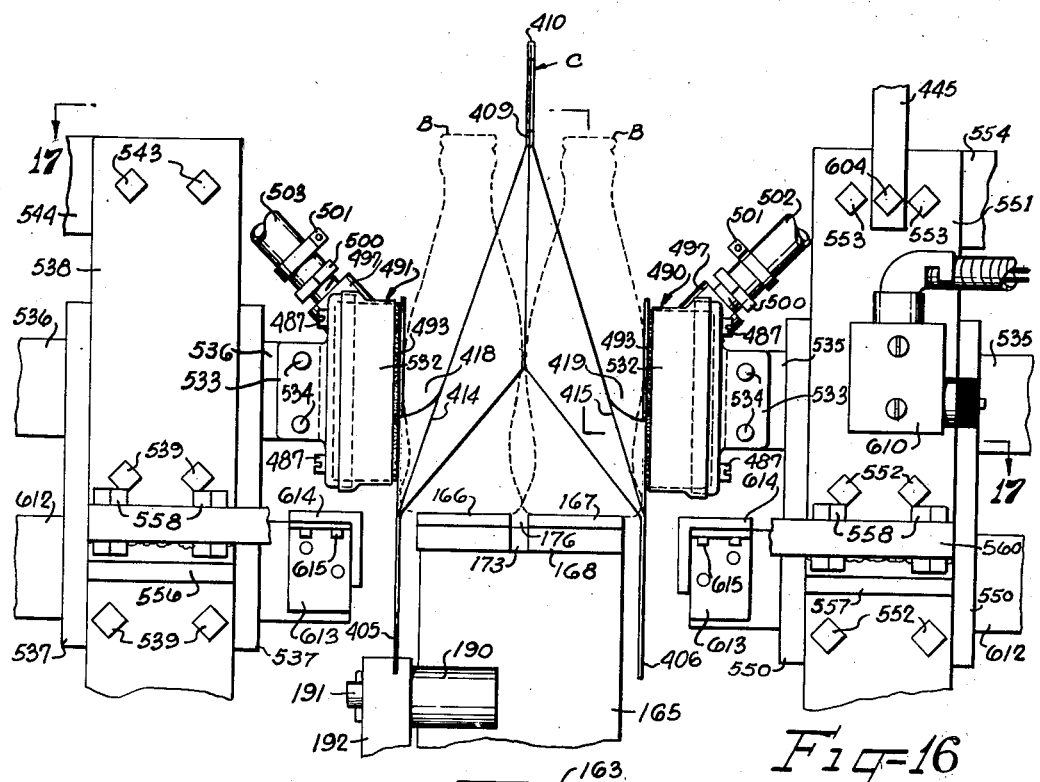
Figure 17:
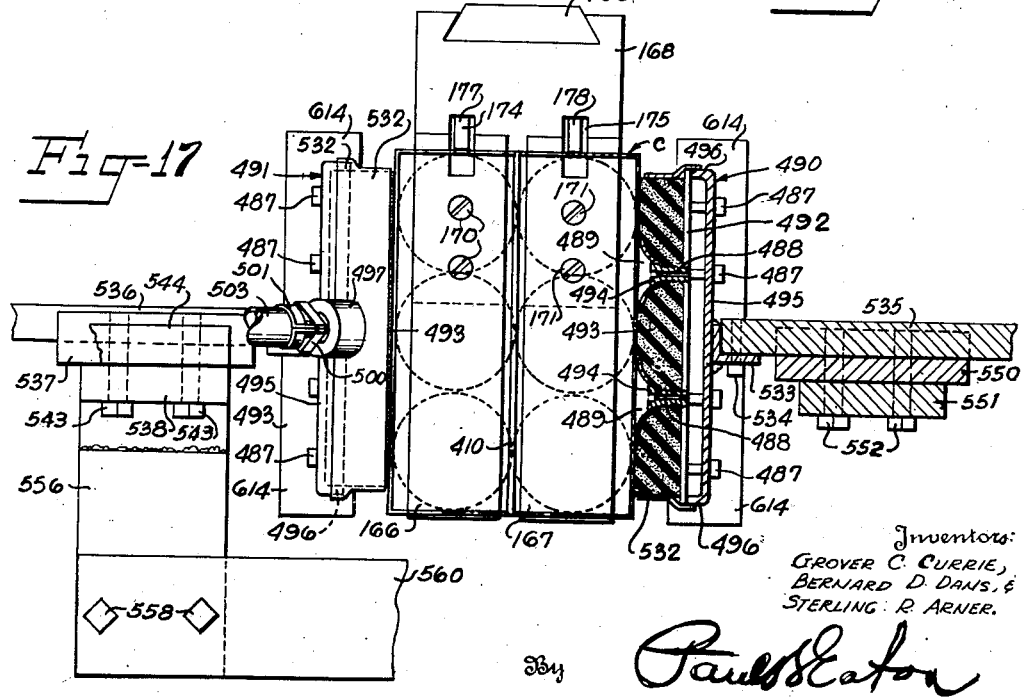
Figure 18:
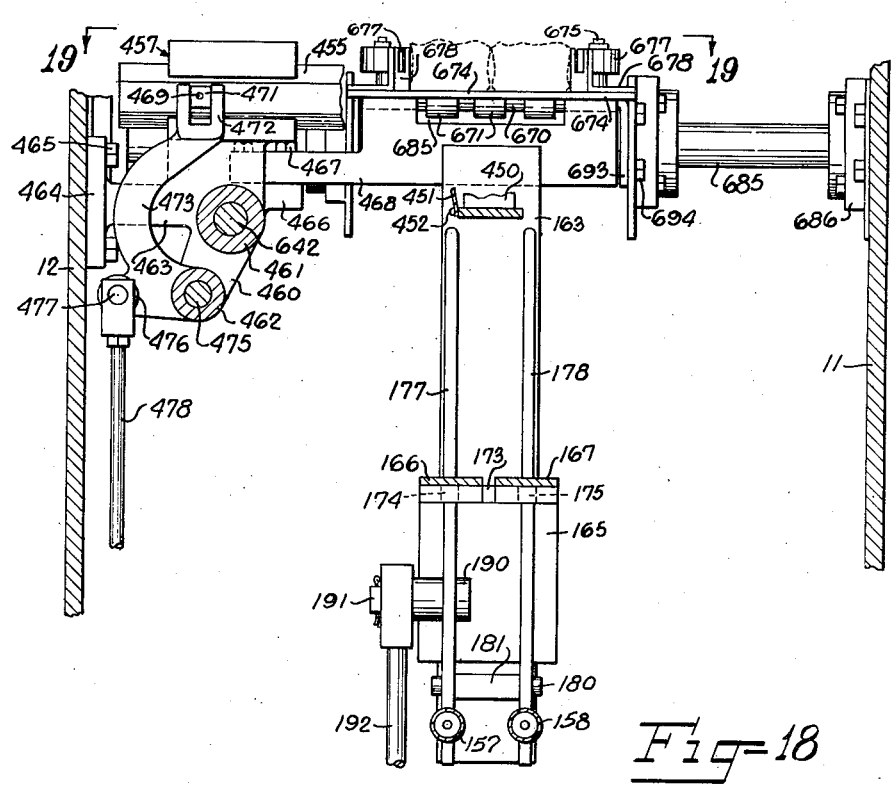
Figure 19:
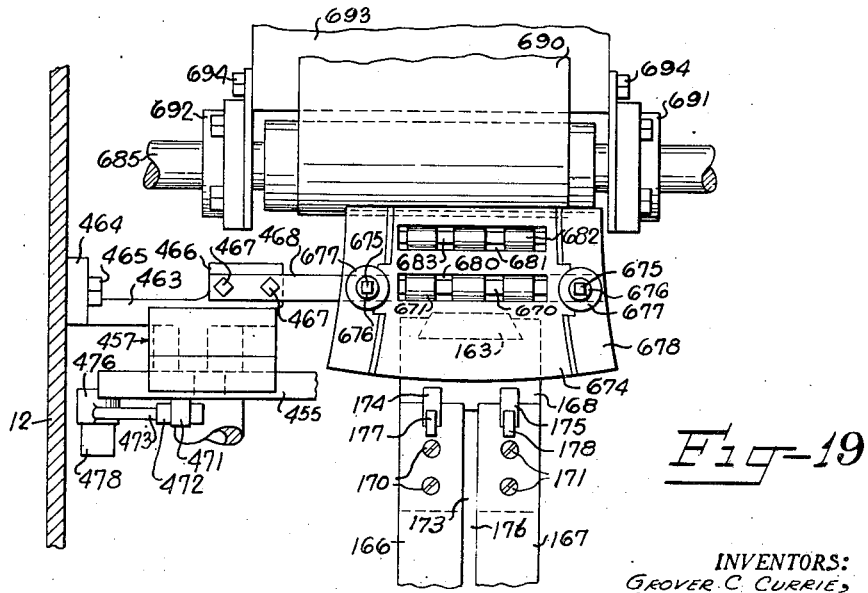
Figure 20:
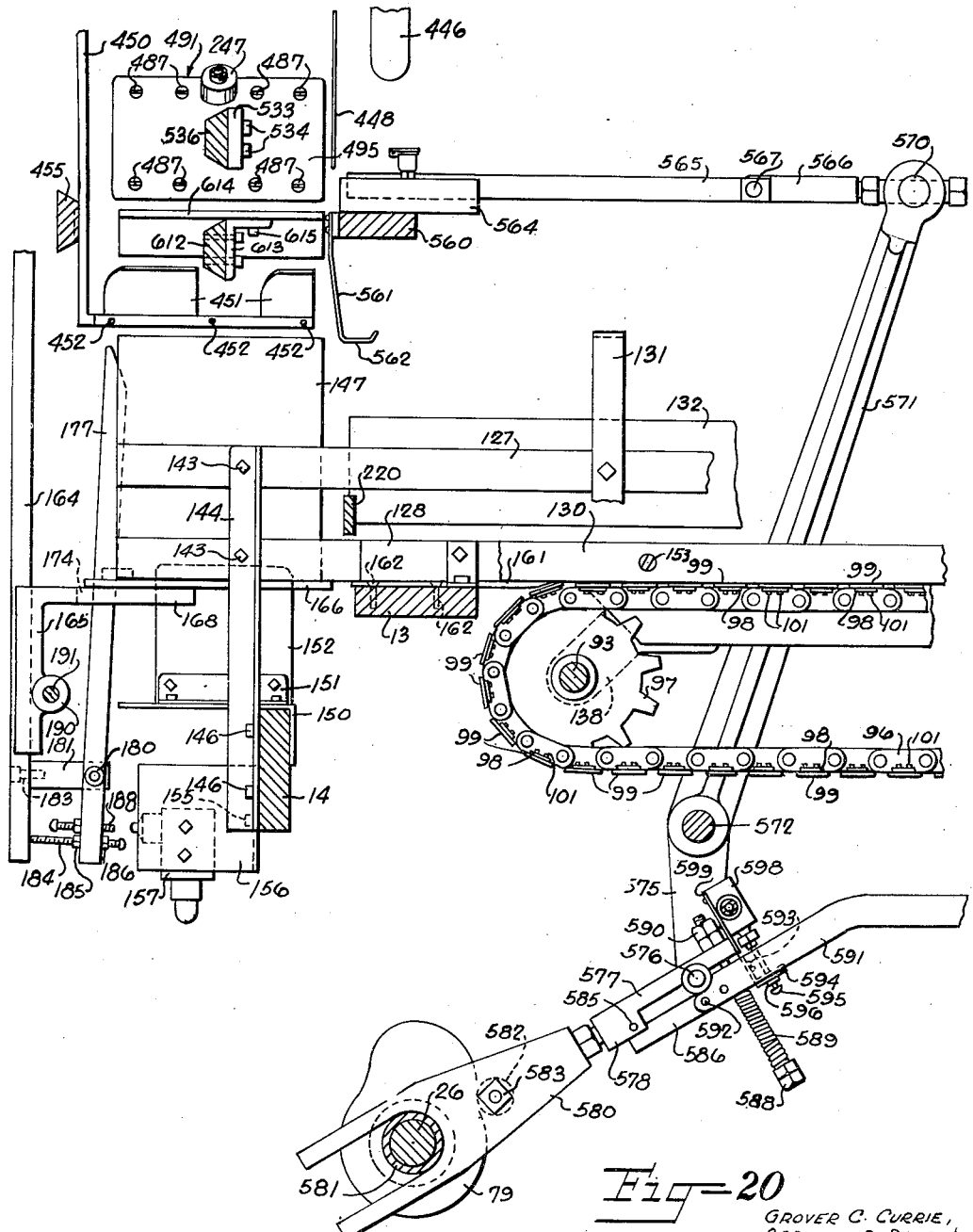
Figure 22:
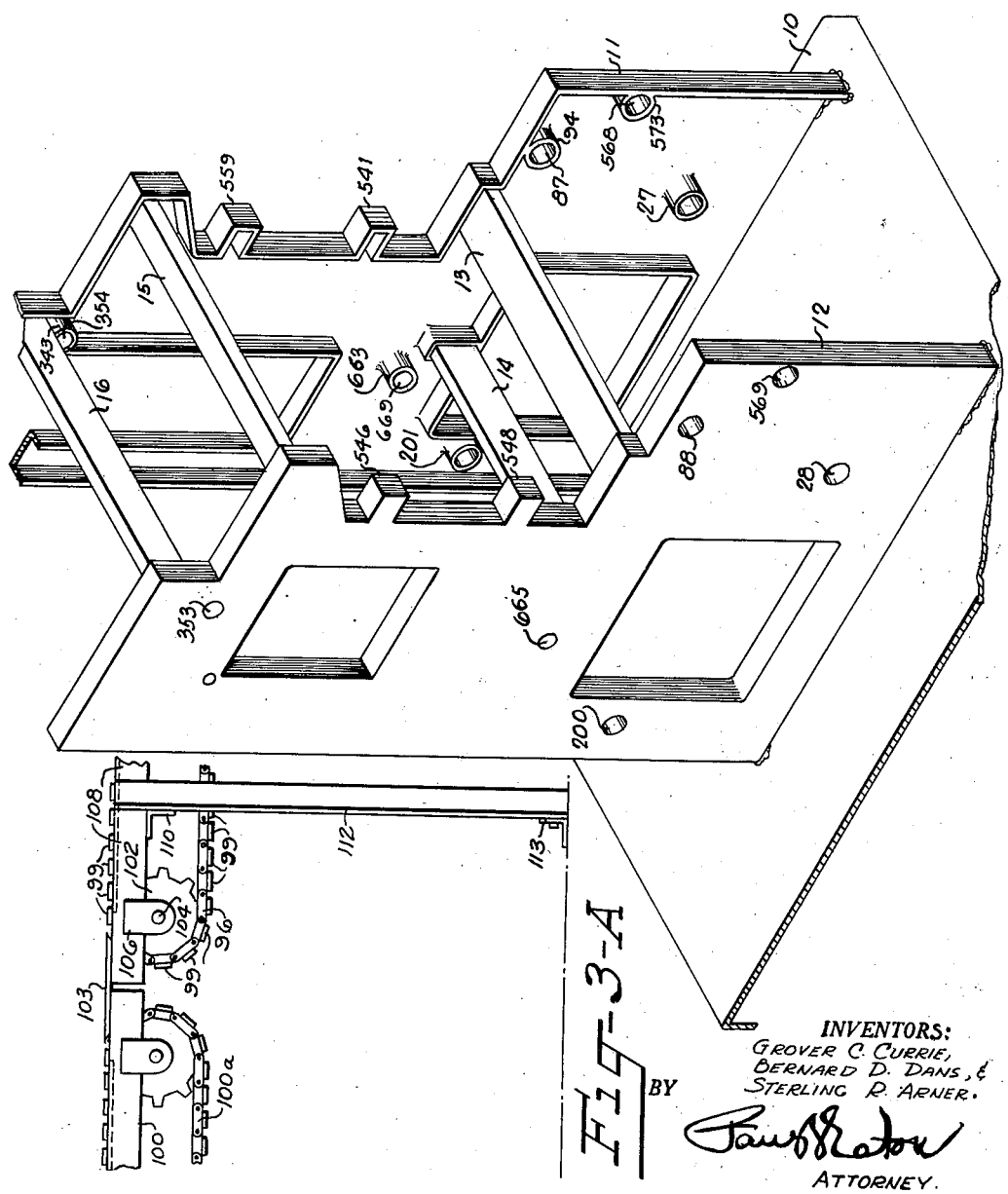
Figure 23:
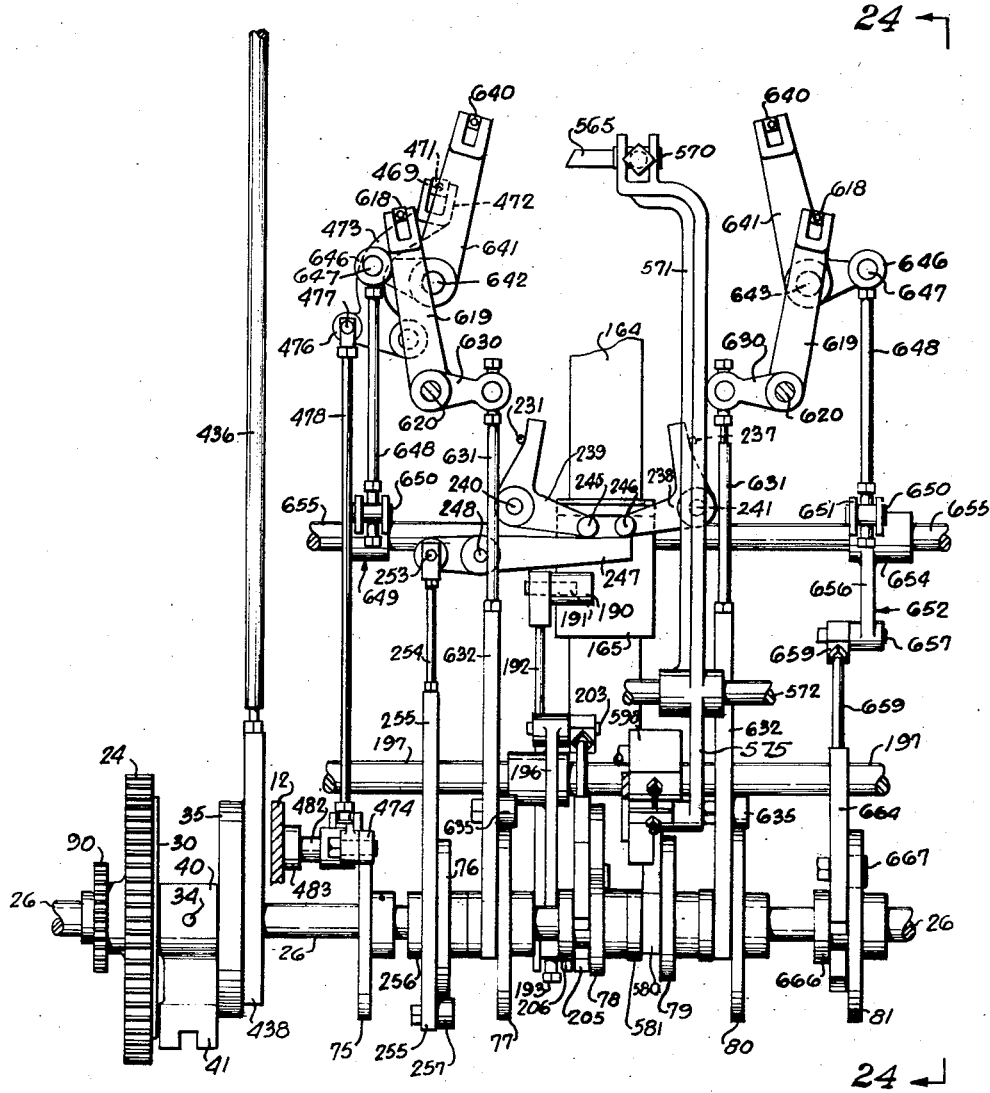
Figure 24:
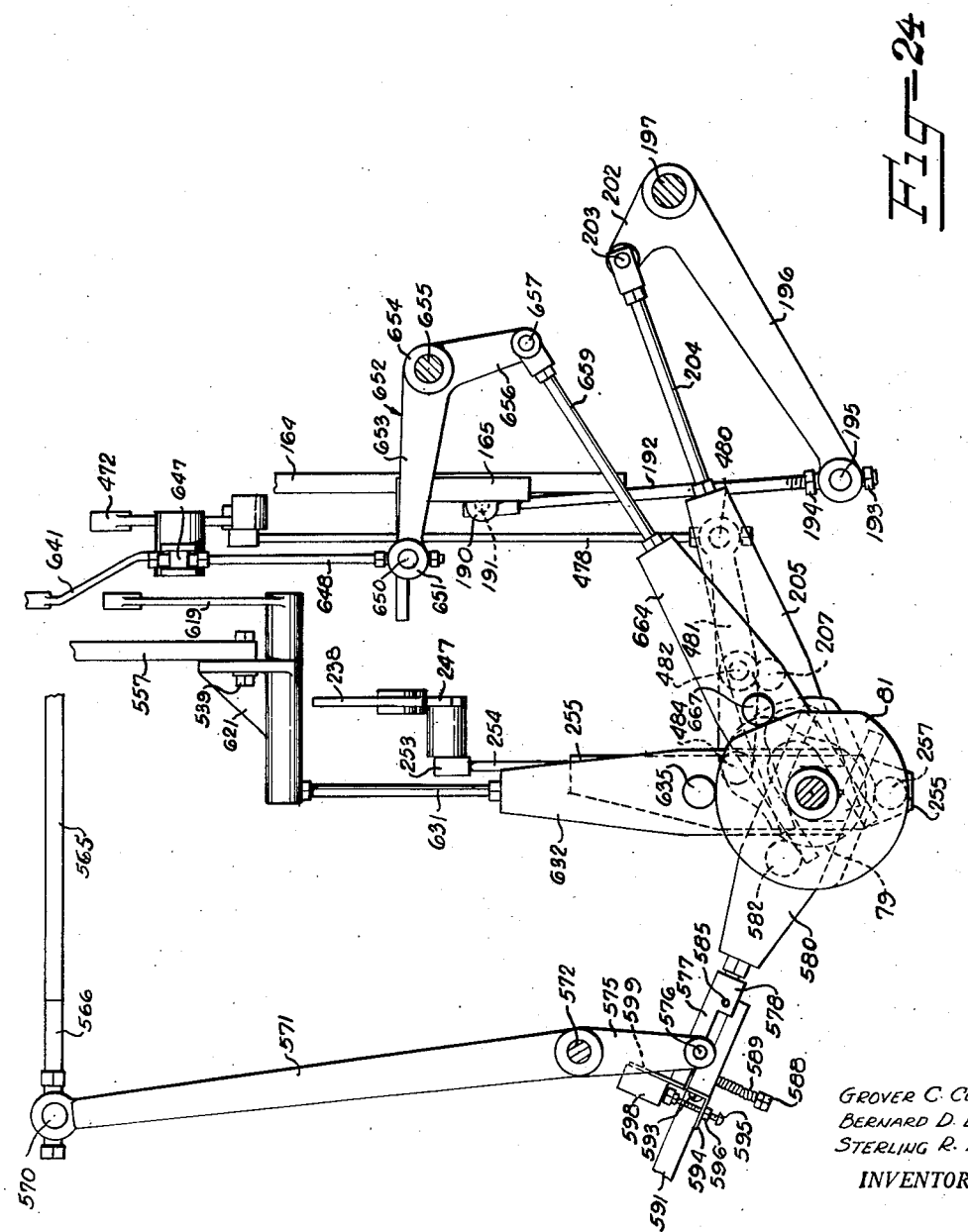
Figure 25:
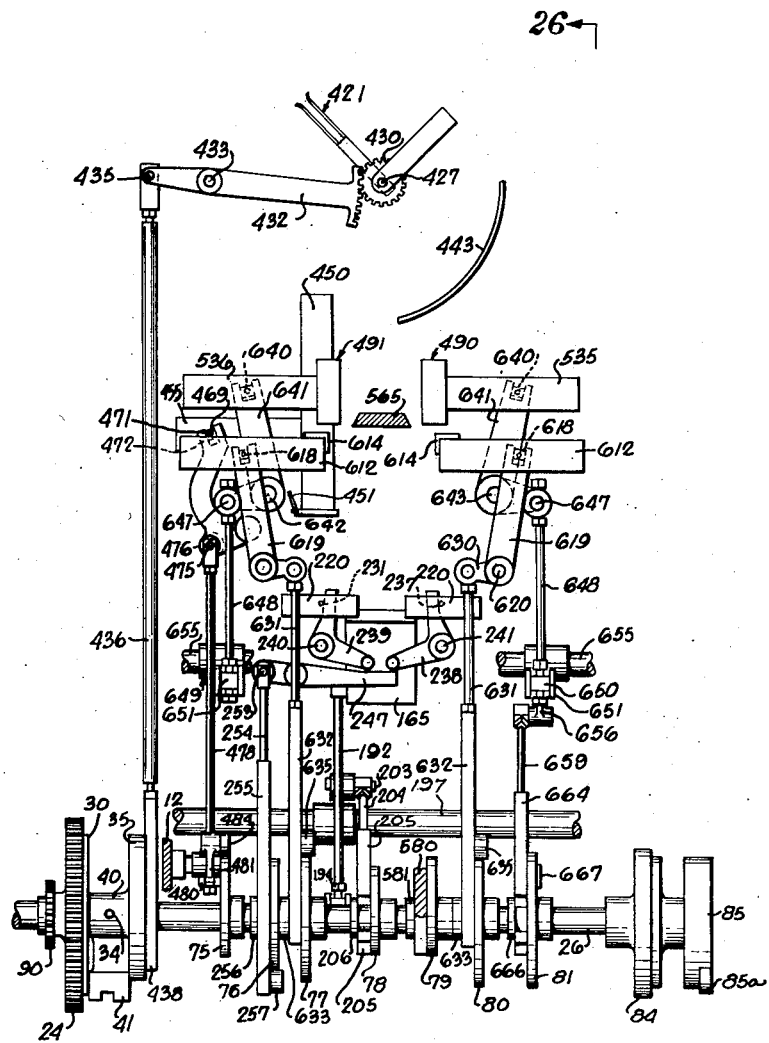
Figure 26:
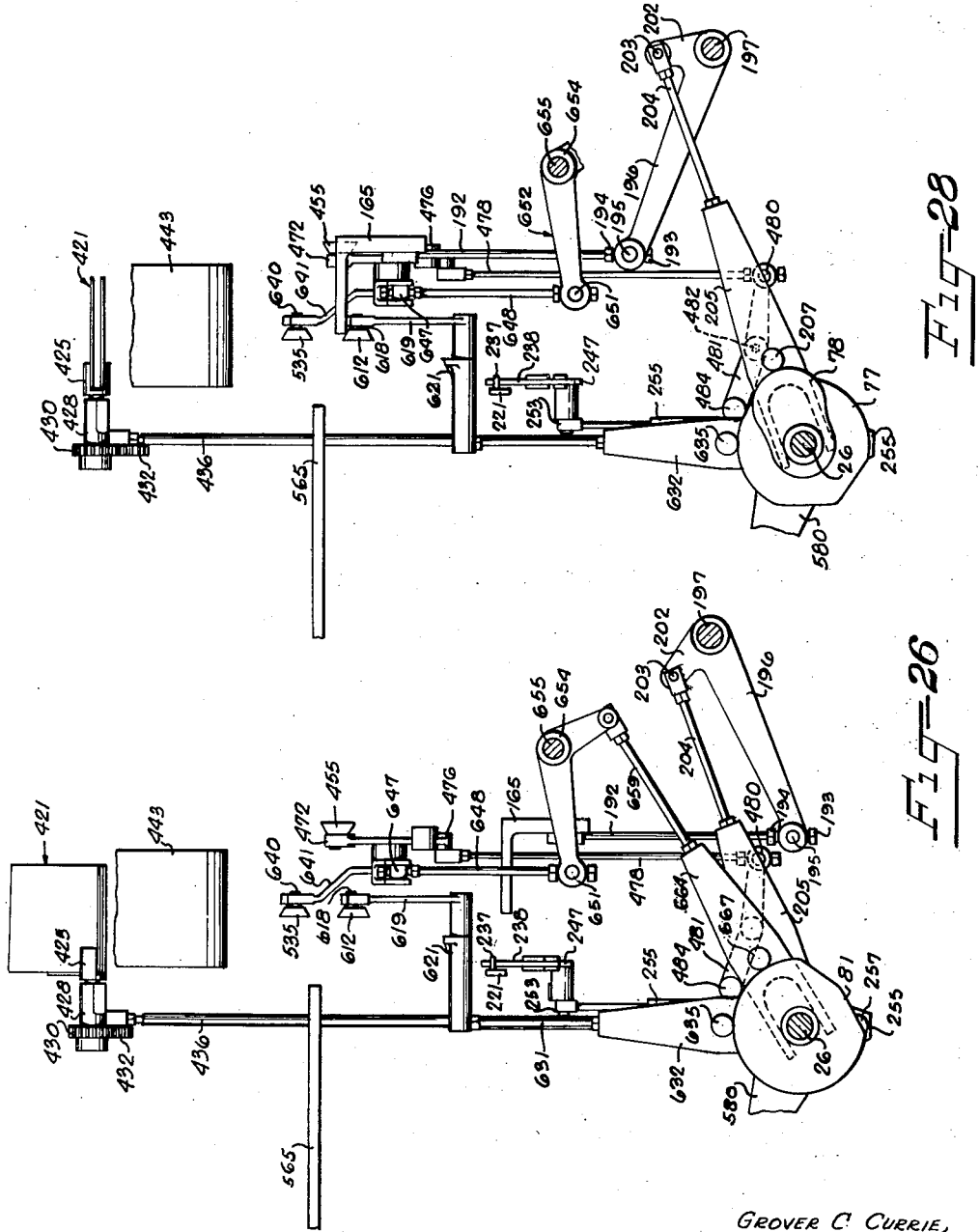
Figure 27:
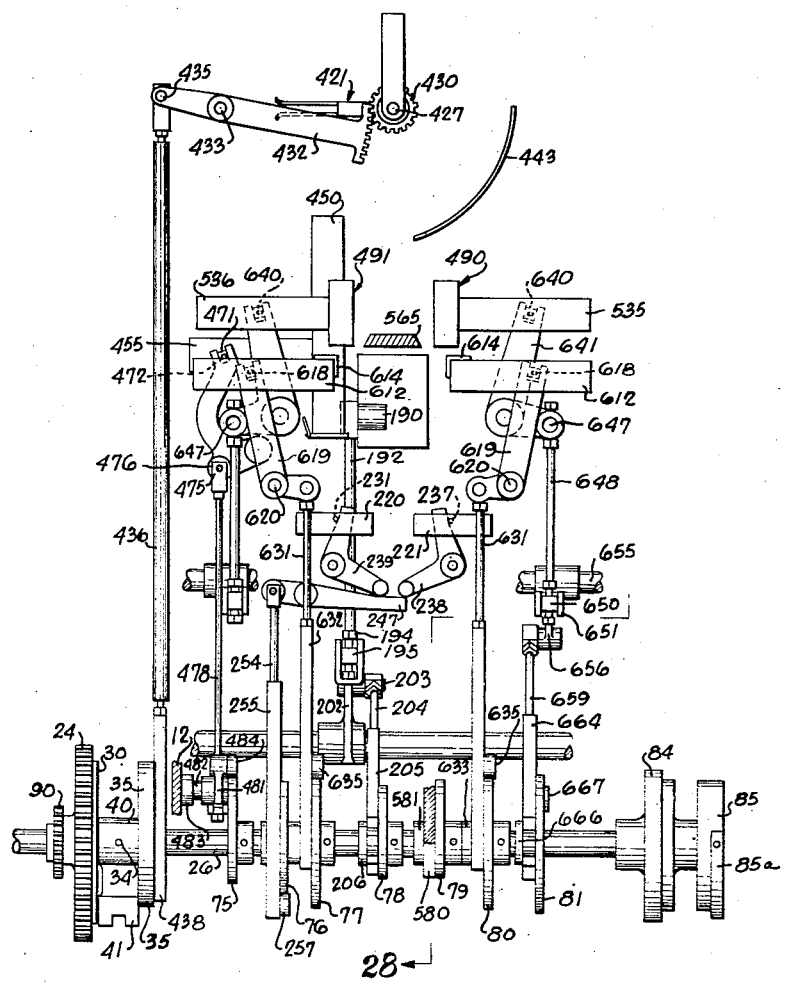
Figure 29:
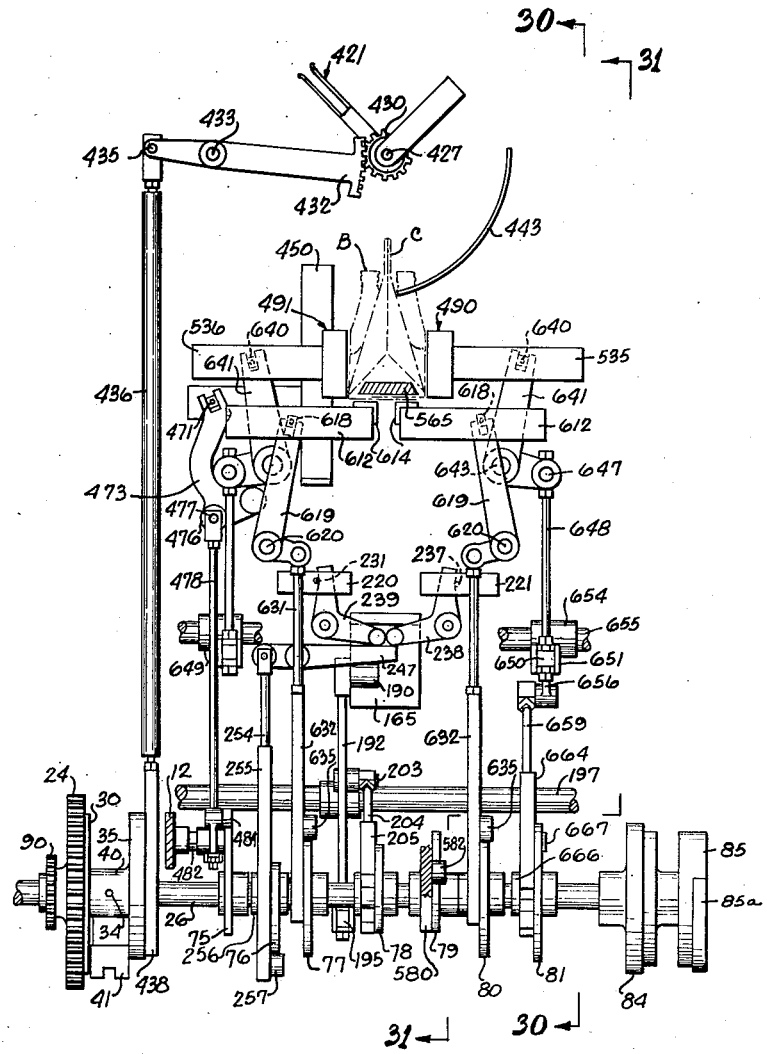

2 broken away and being taken along the line 6—6 in Figure 5;

Figure 7 is a vertical sectional view taken along the line 7—7 in Figure 6;

Figure 8 is a vertical sectional view taken along the line 8—8 in Figure 6;

Figure 9 is a sectional plan view taken along the line 9—9 in Figure 8;

Figure 10 is an elevation with parts broken away and taken along the line 10—10;

Figure 11 is a top plan view partly in section and taken along the line 11—11 in Figure 8;

Figure 12 is a vertical sectional view taken along the line 12—12 in Figure 1;

Figure 13 is a vertical sectional view taken along the line 13—13 in Figure 1;

Figure 14 is a vertical sectional view taken along the line 14—14 in Figure 13;

Figure 15 is a vertical sectional view taken along the line 15—15 in Figure 2;

Figure 16 is a view similar to Figure 15 except that the bottles are shown in raised position;

Figure 17 is a sectional plan view taken along the line 17—17 in Figure 16;

Figure 18 is a vertical sectional view taken along the line 18—18 in Figure 13;

Figure 19 is a top plan view taken along the line 19—19 in Figure 18;

Figure 20 is a vertical sectional view taken along the line 20—20 in Figure 1;

Figure 21 is an elevation taken along the line 21—21 in Fig. 13;

Figure 22 is an isometric view of the frame of the machine with parts broken away and showing all working parts removed;

Figure 23 is a schematic view looking into the intake end of the machine and being removed from the frame and showing the main cam shaft, clamping mechanisms and associated parts;

Figure 24 is an elevation taken along the line 24—24 in Figure 23;

Figure 25 is a schematic view similar to Figure 23 but being drawn on a smaller scale and showing additional parts;

Figure 26 is a vertical sectional view mostly in elevation and taken along the line 26—26 in Figure 25;

Figure 27 is a view similar to Figure 25 but showing the parts in a different position;

Figure 28 is a vertical sectional view taken along the line 28—28 in Figure 27;

Figure 29 is a view similar to Figure 27 but showing the parts in still another position;

Figure 30 is a view mostly in elevation and partly in section and taken along the line 30—30 in Figure 29;

Figure 31 is a view mostly in elevation and partly in section and taken along the line 31—31 in Figure 29;

Figure 32 is a vertical sectional view taken along the line 32—32 in Figure 1;

Figure 33 is a vertical sectional view taken along the line 33—33 in Figure 32;

Figure 34 is a vertical sectional view, mostly in elevation and taken along the line 34—34 in Figure 1;

Figure 35 is a vertical sectional view taken along the line 35—35 in Figure 34;

Figure 36 is a sectional plan view taken along the line 36—36 in Figure 34;

Figure 37 is an isometric view of the carton employed in this machine;

Figure 37-A is a plan view looking at the inside surface of the carton before it is folded;

Figure 37-B is a view similar to Figure 37-A but showing the end wall tabs and the handle tabs folded inwardly on top of the blank;

Figure 38 is a reversed isometric view from that shown in Figure 37;

Figures 39 and 39-A show a schematic wiring diagram and pneumatic portions of the machine;

Figure 40 is an enlarged view of the lower right-hand portion of Figure 1 and showing a modified form of that part of the invention;

Figure 41 is an enlarged view of the lower left-hand portion of Figure 3 also showing a modified form of the invention and this view is also looking from right to left at Figure 40;

Figure 42 is a plan view taken along the line 42—42 in Figure 40 and being on enlarged scale;

Figure 43 is a modified illustration of that part of the invention shown in Figure 28 and more especially pertains to the bottle elevating means;

Figure 44 is a vertical sectional view taken along the line 44—44 in Figure 43 and being on an enlarged scale;

Figure 45 is a plan view taken along the line 45—45 in Figure 43;

Figure 46 is a vertical sectional view taken along the line 46—46 in Figure 43;

Figure 47 is an elevation with parts in section and being taken along the line 47—47 in Figure 43.

Referring more specifically to the drawings, the numeral 10 indicates the base plate of the machine which has integral therewith vertical side members 11 and 12 which are held in proper spaced relation by horizontally disposed bars 13, 14, 15, 16 and 17. Bars 13 to 17, inclusive, are secured to the proximate sides of the side members 11 and 12.

Fixedly secured to the base 10 by any suitable means such as bolts 20 is a variable speed motor 21, having a driving shaft 22 extending therefrom on which is fixed a gear 23 which meshes with a gear 24 which is rotatably mounted on a shaft 26 rotatably mounted in bearing bores 27 and 28 (Figure 22) in the side members 11 and 12 respectively. The motor 21 has a hand wheel 25 by means of which the speed of drive shaft 22 can be varied.

The left-hand end of the shaft 26 as viewed in Figure 1, extends beyond the side member 12 and is mounted in a bearing block 29 fixed to the base plate 10. Fixedly secured by screws 31 to the right-hand face of the gear 24, as viewed in Figure 1, is a circular clutch plate 30. The clutch plate 30 has a plurality of spaced cavities 32 in its periphery which are to be engaged by a dog 49 in the clutch mechanism to be presently described (Figures 32 to 36 inclusive).

Adjacent the gear 24 and fixed to the shaft 26 by a tapered pin 34 is a cam 35 having a bearing portion 40 which has integral therewith an arm 41 having transverse slots 42 and 43 therein. The lower end of the arm 41, as viewed in Figure 35, has two plates 44 and 45 secured thereon by any suitable means such as screws 46. The plates 44 and 45 are held in spaced relation by the screws 46 and permit a clutch knife 48 to pass therebetween during the engagement of the knife 48 with the clutch dog 49.

The clutch dog 49 is slidably mounted in the slot 42 and has a horizontally disposed hole 50 therein in which is loosely mounted a compression spring 51. The opposite end of the spring 51 presses against the inside vertical surface of the cam 35 and forces the clutch dog 49 to the left in Figures 1 and 35 thereby forcing it into one of the cavities 32 in the plate 30.

The clutch knife 48 is secured to a treadle bar 52 pivotally mounted as at 53 to the side member 12. The treadle bar 52 has integral therewith a treadle 54 and has also fixed therein a pin 55 on which is mounted the lower end of a tension spring 56 which at its upper end is fastened to a spring perch 58 secured to the vertical side member 12 (Figures 2 and 34). Near the free end of and integral with the treadle bar 52 is a lip 59. When the treadle bar 52 is moved to its low position the lip 59 is engaged by a shoulder 60 in a vertically disposed bar 61 pivotally mounted as at 62 to the side member 12 (Figures 2 and 39-A).

Pivotally mounted as at 63 near the lower end of the bar 61 is a solenoid plunger 64 of an electrically operated solenoid 65. When the solenoid plunger 64 is moved to the right in Figures 2 and 39-A, the shoulder 60 on bar 61 is drawn out of engagement with the projection 59 on the treadle bar 52. When the solenoid 65 is de-energized, the bar 61 will swing by gravity to vertical position so its shoulder 60 will be engaged by the lip 59. To limit the upward movement of the treadle bar 52 when it has been released by the bar 61, a bumper 66 (Figure 2) is welded to the side member 12 and a mating bumper 67 (Figure 34) on the treadle bar 52, will engage the bumper 66.

Fixedly secured to the shaft 26 and disposed between the side members 11 and 12 is a plurality of cams 75, 76, 77, 78, 79, 80 and 81 (Figure 23). The shaft 26 extends to the right in Figure 1 beyond the side member 11 and has fixedly mounted thereon cam wheels 84 and 85. The cam wheel 85 has fixed thereon a projecting cam 85a. The cam wheel 84 has a cam 86 on its periphery for engaging a roller 175a, to be later described.

Fixedly secured to the shaft 26 and disposed between the gear 24 and the bearing block 29 is a sprocket wheel 90 (Figures 1, 2, 4 and 5) which has mounted thereon a sprocket chain 91 which extends upwardly and is mounted on a sprocket wheel 92 fixedly secured on a shaft 93 rotatably mounted in bearings 94 and 95 integral with the side members 11 and 12 respectively and having bearing bores 87 and 88 therein (Figure 22).

Centered between the side members 11 and 12 and fixedly mounted on the shaft 93 is a sprocket wheel 97 (Figures 13, 15 and 20) on which is mounted an endless sprocket chain conveyor 96.

Each of the links of the sprocket chain 96 has out-turned ears 98 thereon to which are secured plate members 99 by any suitable means such as screws 101. The intake end of the endless chain conveyor 96 is supported by a sprocket wheel 102 (Figures 1 and 3-A) fixedly secured on a shaft 104 rotatably mounted in bearings 105 and 106. Bearing blocks 105 and 106 are welded at their upper end to transverse angle bars 107 and 108 which extend longitudinally of the endless chain conveyor 96. The angle bars 107 and 108 serve to support the plates 99 of the upper reach of the conveyor.

Forwardly of the sprocket wheel 102 and welded to the lower edges of the angle bars 107 and 108 is a cross angle bar 110 (Figures 1 and 3-A), which has welded thereto downwardly projecting angle bars 111 and 112. The angle bars 111 and 112 are joined together at their lower ends by an angle bar 113. The framework consisting of angle bars 110, 111, 112 and 113 supports the outer end of the intake conveyor 96.

Referring to Figure 3-A it may be observed that the discharge end of a conveyor 100, having a conveyor chain 100a, is shown adjacent the intake end of the conveying mechanism just described and bridging the gap between the upper reaches of the conveyor 100a and the conveyor 96 is a plate 103 which rests on the extended vertical portions of the angle bars 107 and 108 at one end, and the other end rests on the framework 100 of the conveyor 100a. The conveyor 100a conveys filled and capped bottles from a conventional bottling machine, not shown.

Secured to the sides of the angle bars 107 and 108 by screws 114 are downwardly projecting bars 116 and 117 which are joined at their lower ends by a round bar or shaft 119 (Figure 2), and this bar 119 supports the lower reach of the conveyor chain 96 during its return travel. Also secured to the sides of the angle bars 107 and 108 are uprising bars 125 and 126 (Figures 2 and 3), which have secured to the proximate sides thereof by screws 124 horizontally disposed guide bars 127, 128, 129 and 130.

Also fixed to the angle bars 107 and 108 are upwardly projecting bars 131 which project upwardly and inwardly and downwardly and are welded at their inner lower ends to a guide partition 132 which extends the full length of the conveyor 96 (Figure 5). The angle bars 107 and 108 are supported near their left-hand ends as viewed in Figure 2 by a transverse angle bar 133 which is fastened to vertically disposed bars 134 by any suitable means such as bolts 135.

The lower ends of the bars 134 are bolted to the base plate 10 by bolts 136 (Figure 1). The left-hand ends of the angle bars 107 and 108 also have fastened thereto by any suitable means such as bolts 137, suitable bearings 138 in which is rotatably mounted the shaft 93 as viewed in Figure 20.

The extreme left-hand ends of bars 127, 128, 129 and 130, as viewed in Figures 2 and 20 are fixed by screws 143 to vertically disposed angle bars 144 and 145, the lower ends of which are fixed to the cross member 14 by any suitable means such as screws 146. The horizontal bars 127 and 128 and the horizontal bars 129 and 130 have welded at their free ends and to their proximate sides, vertically disposed guide plates 147 and 148 respectively between which the forward bottles are pushed by the following bottles on the conveyor 96, where the forward bottles rest on elevating plates 166 and 167, to be presently described. Also fixed to the cross bar 14 is an angle plate 150 which is located between the vertically disposed angle bars 144 and 145. The horizontal portion of the angle plate 150 has fixed thereto an angle bar 151 to which is fixed a vertically disposed spacer vane 152.

By referring to Figures 1, 2, 5 and 20 there may be observed a stop pin 153. This pin 153 is loosely mounted in the lower guide bars 128 and 130 and spans the distance therebetween. The pin 153 may be manually withdrawn from the guide bars 128 and 130 at the will of the operator of the machine and is used when desired to prevent bottles from being carried to the elevating means to be presently described.

Referring to Figures 13 and 20 it may be seen that the vertical face of cross member 14 has secured thereto, by screws 155, a U-shaped plate member 156 which has secured thereon sensitive switches 157 and 158, the function of which will be later described.

Bridging the gap between the endless chain conveyor 96 and the cross bar 13, and extending over the same, is a plate 161 which is fastened to the horizontal cross bar 13 by flush-top screws 162. Secured to the center of the cross bar 17 by screws 163 is a vertically disposed dove-tail member 164 (Figures 13 and 19) on which is mounted for vertical sliding movement an angle bracket 165 which has mounted on its horizontal leg 168 two plates 166 and 167.

The plates 166 and 167 support bottles B for raising them during the process of encasing them in a carton. The plate 166 is secured to the horizontal leg 168 of angle bracket 165 by means of screws 170 and the plate 167 is fastened to the horizontal leg 168 of angle bracket 165 by means of screws 171. The horizontal leg 168 is slotted as at 173 for receiving the vane 152 when the bracket 165 is lowered. The plates 166 and 167 are spaced from each other to provide a slot 176 of the same width as slot 173. Thus, the space between the plates 165 and 166 is also provided.

The horizontal leg 168 of the bracket 165 has squared holes 174 and 175 (Figures 18 and 19) therein through which vertically disposed levers 177 and 178 pass. The vertically disposed levers 177 and 178 are pivotally mounted near their lower ends on a shaft 180 which is fixedly mounted in a bar 181 which extends to the left in Figure 20, and is secured to the dove-tail bar 164 by a screw 183 (Figure 20). Due to the limits of the rectangular holes 174 and 175 in the horizontal leg 168 of the bracket 165, the vertically disposed levers 177 and 178 are caused to lean toward the left in Figure 13 at their top ends and they are prevented from leaning too far to the left in Figure 13 by means of adjusting screw 184 which slidably penetrates the lower end of each of the bars 177 and 178 and has lock nuts 185 and 186 threadably mounted thereon for adjustment.

Immediately above the adjusting screw 184 in each bar 177 and 178 is another adjusting screw 188 which threadably penetrates the bars 177 and 178 and each screw 188 has a lock nut 189 thereon for adjustment. The screws 188 will contact the switches 157 and 158 when the bottles B are moved all the way into the machine thus completing a circuit which will be described later.

There is integral with the vertical leg of the bracket 165 a bearing block 190 which has fixed therein a stub shaft 191 on which is pivotally mounted a connecting rod 192 (Figure 24) which extends downwardly and slidably penetrates a pin 195 and is threaded on its lower end and has adjustment nuts 193 and 194 thereon. The pin 195 is pivotally mounted in a bell crank 196.

The bell crank 196, which serves as a bottle raising lever, is pivoted on a transverse shaft 197 (see also Figures 2, 3, 23 and 25) which is fixedly secured in bearing blocks 201 and 200 integral with the side members 11 and 12. A leg 202 of the bottle raising bell crank lever 196 has fixed therein a stub shaft 203 on which is pivotally mounted a connecting rod 204. The left-hand end of the connecting rod 204 as viewed in Figure 24 is threadably imbedded in a yoke member 205. The free end of the yoke 205 is rotatably mounted on a collar 206 (Figure 23) which is fixed to the shaft 26. Approximately one-third of the distance from the free end of the yoke 205 is a cam follower 207 which rides on the exterior surface of the cam 78 heretofore described. A modified form of the matter just described will be later explained in detail.

Fixed to the top surface of cross bar 13, by any suitable means such as screws 210 and 211, are angle bars 212 and 213 (Figure 21) to which are secured by bolts 214 and 215 slotted brackets 216 and 217 respectively, which have mounted therein for horizontal sliding movement horizontally disposed bars 220 and 221 respectively. The remote ends of the bars 220 and 221 have secured thereon spring perches 222 and 223 to which are fastened one of the ends of tension springs 224 and 225. The brackets 216 and 217 respectively have fixed thereon spring perches 226 and 227 on which the other ends of the springs 224 and 225 respectively are mounted.

The proximate ends of the bars 220 and 221 are beveled as at 228 and 229 (Figure 21), the purpose of which will be explained in the method of operation. Secured to the back of the slotted bracket 216 as viewed in Figure 21 are vertically disposed bars 230 which are in spaced relation to each other and extending from the horizontal bar 220 and in the space provided between the bars 230 is a pin 231. Fixed on the back of the slotted bracket 217 (see Figure 21) are bars 236 similar to bars 230 which are also in spaced relation to each other, and a pin 237 extends rearwardly from the bar 221 to be engaged by the upper leg of a bell crank 238 while the pin 231 on the bar 220 is engaged by the upper leg of a bell crank 239 (Figures 25, 27, 29 and 30). The bell cranks 238 and 239 are oscillatably mounted on stub shafts 240 and 241, respectively, fixedly mounted on the cross bar 13.

The proximate ends of the lower legs of the bell cranks 238 and 239 have bearing portions 245 and 246 thereon which are engaged by a lever 247 pivotally secured as at 248 to a bracket 249 (Figure 21) which is integral with the cross bar 13. Pivotally secured to the free end of lever 247, as at 253, is a connecting rod 254 which is threadably imbedded in a yoke 255. The lower portion of the yoke 255 (Figure 24) is slotted at its lower end and encircles a collar 256 which is secured to the shaft 26 while the lower end of the yoke 255 has secured thereon a cam follower 257 which rides on the outside surface of the cam 76 heretofore described as being mounted on the shaft 26.

By referring to Figures 37, 37–A, 37–B, and 38, there may be observed the details of a specially constructed carton for use in the machine. This carton structure is the subject matter of a separate application filed of even date herewith by Grover C. Currie and Walter A. Becker, Serial No. 788,603, filed November 28, 1947, now Patent No. 2,556,069. This carton is made from a single piece of material, such as cardboard, creased along a crease line 469 to divide it into two identical sections. On the right-hand side of crease line 469 in Figure 37–A, there is a rectangular section 454 bounded by crease lines 459 and 459a, 469 and 409. This section has cut outs 412 therein with crease lines 413 along which they may be bent by insertion of one's fingers for carrying the filled carton. Extending from crease lines 459 and 459a are tabs 458 and 458a respectively, which hase semi-circular cut outs 458c and 458b respectively which have glue spots G2 and G1 respectively thereon and which tabs are folded over to the position shown in Figure 37–B.

This end of the blank has an opening 418 which is irregular and is provided with tabs 437 and 437a which define gaps 441, 441a and 441b into which one side of the bottles in one side of the carton fit in the assembled carton.

This side of the blank also has an irregular crease line 447a along which the tabs 437 and 437a may be bent outwardly and it also has crease lines 449 and 449a to allow outward bulging of the tabs 437 and 437a.

This section also has crease lines 414 and 414a along which end tabs 426 and 426a may be bent over to the position shown in Figure 37–B. Tabs 416 and 416a project from the portions 426 and 426a respectively and may be bent along the crease lines 420 and 420a respectively in distending the carton ready for filling.

The tabs 416, 426, 416a and 426a when turned over to the position shown in Figure 37–B have glue spots G9 and G8 respectively applied thereto and one of the glue spots may be omitted, if desired. The said one side portion of the blank has crease lines 429 and 429a along which a portion 479 may bulge outwardly as the bottles are inserted therein. The sidewall portion 479 has a lip 479a for engaging the outer sides of the bottles.

The lower end of the portion 479 has a crease line 407 along which a bottom tab 405 may be bent inwardly to horizontal position.

The other half of the carton has a rectangular section 470 bounded by crease lines 469, 409a, 476a, and 476b. This is the section which has a slot 411 therein. The crease lines 476a and 476b define tabs 474 and 474a which have semi-circular cut outs 474c and 474b respectively in their outer ends. These tabs have glue spots G4 and G3 respectively on their upper faces in Figure 37–A, before they are bent over from the position shown in Figure 37–A to the position shown in Figure 37–B. The other side of the carton has an irregular opening 419 having tabs 487a and 487b projecting down into this opening which define notches 488a, 488b and 488c for accommodating one side of the bottles when placed in the carton. These tab portions 487a and 487b are bent outwardly along a crease line 453 when the carton is distended to receive the bottles.

There are also crease lines 486 and 486a to allow outward distention of this portion of the side wall.

In alignment with the outer edges of the opening 419 are crease lines 415 and 415a along which end wall tabs 489a and 489b may be bent and crease lines 485 and 485a define tabs 417a and 417 respectively, which, when bent over to the position shown in Figure 37-B, have glue spots G10 and G11 applied thereto.

At this stage in Figure 37-B, glue spots G5 and G6 are applied to the top surfaces of the tabs 474a and 474 respectively so that they may adhere to the tabs 458a and 458 respectively.

The left-hand side wall portion 499 also has crease lines 498 and 498a along which the lower portion of this side wall may bulge outwardly along with its projecting portion 499a. The portion 499 has a crease line 408 along which another bottom tab 406 may be bent to horizontal position.

Before any glue spots G8 to G11 are applied, a plurality of rows of indentations X are formed in the tabs 416, 416a, 417 and 417a to cause better adherence between the proximate faces of these tabs when the carton is folded to assembled position.

Also it will be noted that the bottom flap 405 has rows of indentations Y formed in its lower surface before a coating of glue 376 is applied thereto.

With the carton blank treated as above and being in the position shown in Figure 37-B, one of the halves of this blank may be folded on top of the other half of the blank along the crease line 469 and glue spots G10 and G8 will secure tabs 416a and 417 together and glue spots G11 and G9 will secure the tabs 416 and 417a together and glue spot G5 will secure tabs 458a and 474a together and glue spot G6 will secure the tabs 458 and 474 together forming handle 410 and thus the carton is assembled in flat form ready to be fed into the machine and to have its side walls separated from each other by the suction means to be presently described. If desired, the glue spots G8 and G9 may be omitted.

Secured to the inside surface of the side frame 11, by means of screws 260, or by welding are vertically disposed plates 261 and 262 (Figures 6 and 8). Secured to the inside surface and near the upper end of plate 262 is an angle bar 263 which has secured thereto by means of screws 264 one end of a horizontally disposed U-shaped plate 265, the other end of which is welded to the inside surface of the vertical side member 12 as viewed in Figures 6, 8, 10 and 12.

An opening 266 is provided in the U-shaped plate 265 for receiving a sliding plate 267. The plate 267 is supported at each end on bars 270 and 271 which are welded to the bottom of the plate 265 at their outer edges, and extend below the opening 266, and support the plate 267 on their top surfaces.

Secured to the top left-hand surface of the plate 267 as viewed in Figures 8 and 12, is a pusher plate 272. This will push the lowermost of the cartons which are indicated by the reference character C, one at a time, through the opening 273 in the lower end of a hopper broadly referred to by reference character 274.

The hopper 274 consists of opposed sides 275 and 276 which are joined together by a front plate 277 and a rear plate 278 and secured by bolts 279. The plate 278 is U-shaped to ease the loading of the hopper 274 with carton blanks as well as permitting observations of the contents of the hopper (Figure 4). The lower ends of the plates 275 and 276 are flanged outwardly as at 285 and 286 and are fastened to the plate 265 by any suitable means such as bolts 287. The flanged portions 285 and 286 prevent upward movement of the plate 267 as it is moved in a horizontal plane as viewed in Figures 8 and 12.

Angle clips 288 and 289 (Figure 10) are secured to the bottom surface of the plate 267 by means of screws 290 and have pivotally secured thereto links 292 and 293, the free ends of which are fixedly secured to transverse arms 294 and 295 by means of screws 296.

Fixed to the lower surfaces of the bars 294 and 295 is an angle bar 299. By means of screws 301 a T-shaped bracket 302 is secured to the angle bar 299 and the bracket 302 extends downwardly and is fixedly mounted on a shaft 303 (Figure 8). The shaft 303 is rotatably mounted in bearings 304 and 305 (Figures 4 and 6) mounted on the inside surfaces of the vertical side members 11 and 12 respectively.

The shaft 303 extends through the side member 12 and has fixedly mounted on the end thereof a lever bar 306 (Figure 2). Fixedly mounted on the lever bar 306 is a pivot pin 307 which pivotally penetrates a connecting rod 308 which projects downwardly and its lower end penetrates a pin 309 which is pivotally mounted in a bell crank 310 (Figure 32). The bell crank 310 is pivoted on a pin 312 secured to the side member 12 (Figure 2).

The free end of the bell crank 310 has a bearing portion 313 thereon which is engaged by the cam 35 mounted on the shaft 26. The lever bar 306 has a spring perch 314 (Figure 2) thereon to which is fastened the upper end of a tension spring 315, the lower end of which is fastened to a spring perch 316 fixed to the vertical side member 12. The bracket 302 which is fixed on the shaft 303 in the center of the machine has a lug 318 (Figures 8, 10, 11 and 12) thereon on which is pivotally mounted an L-shaped bar 319. The bar 319 is in two parts whose proximate ends are slotted and penetrated by bolts 320 mounted in a connecting bar 321, whereby the overall length of bar 319 may be varied. The free end of the L-shaped bar 319 is pivotally secured as at 325 to a bracket 326 which has fixed thereto a plate 327 by means of screws 328, and the bracket 326 is pivotally mounted on a shaft 330, the ends of which are secured in bearings 331 and 332 mounted on the proximate surfaces of the side member 11 and 12, (Figure 6).

Also pivotally mounted on the shaft 330, at its fulcrum point, is a lever bar 333 which has at its free end a hole 334 in the upper end of which a tension spring 335 is fixed (Figures 6 to 11), the lower end of which is to be later described. Half way between the two ends of the bar 333 is a thumb screw 336 which is threadably imbedded in the bar 333 and has a lock nut 337 thereon. The lower end of the thumb screw 336 is contacted by an angle clip 340 which is fixed to the inside surface of the vertical side member 11 by a screw 338. A similar bar 338 is mounted adjacent the inside surface of the vertical side member 12 and like reference characters will apply.

The levers 333 have bearing portions 341 integral therewith in which is rotatably mounted the lower ends of a shaft 342. Adjacent the vertical side member 12 and fixed to the shaft 342 is a gear wheel 344 which meshes with and is driven by a pinion 345. The pinion 345 is fixedly secured to a shaft 346. The shaft 346 is rotatably mounted at one end in a bearing 347 having a bearing bore 353 integral with the side member 12 and at its opposite end the shaft 346 is rotatably mounted in a bearing block 343 which is integral with the side member 11 and has a bearing bore 354 therein (Figure 22). The shaft 346 has an upper glue roll 348 fixed thereon which rides in a pick-up grooved glue roll 349 fixedly secured to the shaft 342.

Also fixed to an intermediate portion of the shaft 346 are knurled rolls 350 and 351 which are engaged by knurled rolls 360 and 361 under pressure and these rolls 360 and 361 are fixedly secured to a shaft 362 rotatably mounted in bearings 363 and 364. The bearings 363 and 364 are mounted for vertical sliding movement in inverted U-shaped brackets 365 and 366 respectively, (Figures 6, 7 and 9).

The bearings 363 and 364 have upwardly projecting pads 367 thereon against which the head portion of a bolt 370 is urged by a compression spring 368. The springs 368 are guided by the bolts 370 which slidably penetrate the brackets 365 and 366 and are confined at their upper ends by lock nuts 371 and the brackets 365 and 366 are secured to the cross bar 16 by screws 372 and 373 respectively.

Also secured to the right-hand surface of the cross bar 16, as viewed in Figure 8, is an L-shaped bar 374 which is secured to the bar 16 by means of screws 375, and the bar 374 extends downwardly below the cross bar 16 and to the left in Figure 8 and passes below the shaft 362. The bar 374 holds the cartons C in a flattened manner as they are expelled from the hopper 274, thereby forcing them to pass between the rollers 360 and 350 and also between rollers 361 and 351.

The L-shaped bar 374 also holds down the bottom flaps 405 and 406 of the carton C so that flap 405 may have glue stripe 376 therein (Figure 38) since one of the flaps 405 of the carton C will be engaged by the glue roller 348 to thereby apply a glue stripe thereon.

The left-hand end of the shaft 362, as viewed in Figure 6, extends beyond the bearing 363 and has secured thereto a gear wheel 377 which is engaged by the gear 345 fixed on the shaft 346. The shaft 346 extends through the vertical side member 12 and has fixed on the end thereof a sprocket wheel 380 (Figures 1 and 2) which has integral therewith a knurled hand wheel 381 for manual adjustment of the glue rolls. The sprocket wheel 380 supports the upper portion of an endless sprocket chain 382. The sprocket chain 382 passes downwardly and is engaged by a sprocket wheel 383 which is fixed to the pinion 23 mounted on the shaft 22 as heretofore described. It may be noted that this will provide a continuous drive for the glue rolls 348 and 349 although the clutch mechanism may be disengaged.

During the operation of the machine it is necessary that the glue roll 349 be partially immersed in the glue at all times and the glue 390 is retained in a reservoir 391 which is welded to a plate 392 which has a bearing portion 393 thereon in which a vertically disposed shaft 394 is extended (Figures 6, 8 and 12). The vertical shaft 394 is round in cross section and extends downwardly into a yoke 395 which is guided by a shaft 396 mounted in a bearing portion 398 of a bracket 399 at one end and also being mounted in a bearing block 400 near the free end of the shaft 396. The bracket 399 and the bearing block 400 are secured to the inside surface of the vertical side member 11. The bracket 399 also is slotted to provide vertical sliding movement for the yoke 395.

Adjacent the yoke 395 and bracket 399, and secured to the shaft 396 is a manually movable cam member 401, and on the left-hand end of the shaft 396, as viewed in Figure 8, is secured a hand wheel 402. The hand wheel 402 may be manually rotated to raise or lower the reservoir 391. The cam 401 is engaged by a cam follower 403 which is fixedly secured to the yoke 395. The cam 401 has a cavity 404 into which the pin 403 falls when the reservoir 391 is fully raised. The reservoir is shown in fully lowered position for sake of clearness.

After the carton C has been projected to the right in Figure 12 between the rolls 350 and 360 and 351 and 361, it is picked up by the sheet metal member 327 and brought to the right in Figures 8 and 12 and is fed between the portions 423 and 424 of U-shaped member 421, which member 421 at each time will be rotated 90 degrees from the position shown in Figures 6 and 12 to the position shown in Figures 27 and 28. The U-shaped member 421 consists of a back 422 and the sides 423 and 424.

The U-shaped member 421 (Figure 12) is welded to an enlarged portion 425 of a shaft 427 which is rotatably mounted in a bearing block 428 (Figure 3) and has on the free end thereof a spur gear wheel 430. The gear 430 meshes with a segmental gear on the end of a lever 432 which is pivotally mounted on a stub shaft 433 secured in a bearing block 434. The bearing blocks 428 and 434 are welded to the top surface of the cross bar 15.

The horizontal lever 432 has pivotally mounted as at 435, in its free end a connecting rod 436 which extends downwardly and is threadably imbedded in a yoke 438 (Figures 1 and 2), which is mounted for vertical sliding movement on a collar 439 fixed to the shaft 26 (Figure 32). A cam follower 440 is fixed to the yoke 438 and extends into a groove 442 in the side face of the cam 35 heretofore described.

After the carton C is passed into the U-shaped member 421 and as it is in the position shown in Figure 27, the U-shaped member 421 is rotated in a clockwise direction as shown in Figures 27, 29 and 1, until it has reached the position shown in Figures 1 and 12. When gravity has forced a carton to pass out of the U-shaped member 421, the lower ends of the carton will contact a chute 443 thereby limiting its outward movement from the U-shaped member 421 until it has reached a vertical position as shown in Figures 1 and 12. After the carton C has left the U-shaped member 421, the U-shaped member 421 will return in a counter-clockwise direction as shown in Figure 29 and will ultimately be in the position shown in Figure 27.

The uppermost end of chute 443 is held in rigid position by a strap iron bar 444 (Figure 1) being secured to the back edge thereof by welding and the bar 444 extends forwardly to the cross bar 15 to which it is secured. The intermediate portion of the chute 443 is welded to a strap iron member 445 which extends forwardly and downwardly and is fastened to parts of the machine to be later described.

Welded to the lower surface of the cross bar 15 and located in the center thereof is an inverted L-shaped bar 446 which is welded to a vertically disposed plate 448. Located in the back of the vertically disposed sheet metal plate 448 as viewed in Figure 1 and to the left of plate 448 as viewed in Figure 20 is an L-shaped plate 450 which extends downwardly below the plate 448 and to the right in Figure 20 and has secured thereto plates 451 by means of screws 452.

Welded near the lower ends of the L-shaped member 450 and to the back thereof is a horizontally disposed dovetail bar 455 which, when viewed in Figure 15, extends to the left and passes through a portion 456 of a bracket 457 for horizontal sliding movement therein. The bracket 457 (Figure 12) projects rearwardly and downwardly from the portion 456 as at 460 which has bearing portions 461 and 462 projecting therefrom.

Integral with the bracket 457 and extending to the left in Figure 18 is an arm 463 which has an out-turned portion 464 integral therewith which is secured to the side member 12 by any suitable means such as screws 465. Extending from the back side of the bracket 457, as viewed in Figure 19, is a lip portion 466 which has secured thereto by screws 467 a bearing block 468, the use of which will be later described.

The horizontally disposed dovetail bar 455 has pivotally secured thereto as at 469 a square block 471 (Figures 18 and 19) which is slidably engaged by a U-shaped portion 472 of a bracket 473 which curves downwardly as shown in Figure 18 and is pivotally mounted on a stub shaft 475 fixedly secured in the bearing portion 462 of the bracket 457. The bracket 473 has a bearing portion 476 integral therewith in which is fixed a pin 477 on which is pivotally mounted a connecting rod 478. The connecting rod 478 projects downwardly and is pivotally secured as at 480 (Figures 27 and 28) at its lower end to a lever 481 which is pivotally secured on a shaft 482 fixed in a bearing block 483 integral with the vertical side frame member 12.

The free end of the lever 481 has mounted thereon a cam follower 484 which engages the outer surface of the cam 75 mounted on the shaft 26 as heretofore described.

After the carton C has been rotated along the chute 443 by the U-shaped member 421 to a point where it falls out of the U-shaped member 421, it falls onto the horizontal portion of the L-shaped member 450 and is prevented from falling off the same by the side plates 451. As the cartons fall downwardly a pair of suction mouthpieces broadly indicated at 490 and 491 are in the position shown in Figure 25 and these suction mouthpieces come together to the approximate position shown in Figure 15 but the carton is omitted to Figure 15, but it would be present and its outer surfaces of its sidewalls would be clamped by and between the resilient pads 493.

Inasmuch as both of these suction mouthpieces 490 and 491 are of the same construction, except being right-hand and left-hand, like reference characters will apply. The suction mouthpieces 490 and 491 have plates 492 secured thereon by screws 487 which penetrate cast metal housings 495 which are flanged as at 496 at all edges. Glued to the plates 492 are the sponge rubber blocks 493 which are penetrated by bolts 494, which have holes 488 therethrough and bolts 494 have resilient vacuum cups 489 thereon.

At the upper edges of the housings 495 are provided suitable bosses 497 (Figures 13 to 16) which are threadably penetrated by a pipe coupling 500. Secured to the pipe couplings 500 by means of clamp rings 501 are flexible pipes 502 and 503. The flexible pipes 502 and 503 extend to a pipe T 504 (Figure 3) where a branch pipe 505 connects the T to an escape valve 506. Integral with the escape valve 506 is an arm 507 to which a lever bar 508 is pivoted as at 509.

At the left-hand end of the bar 508 as viewed in Figure 3 there is secured a flat valve disk 515 which is urged upwardly by a tension spring 516 secured between the arms 507 and 508. The free end of the lever bar 508 has rotatably secured thereon a cam follower 517 which is permitted to engage the cam 85. A modified form of the matter just described will be later explained.

The vacuum escape valve 506 (Figures 3, 39 and 39–A) has leading therefrom a pipe 518 which is connected to a pipe T 519 which has a branch pipe 514 extending upwardly therefrom having a pressure guage 520 fixed thereon and T 519 has another branch pipe 521 extending downwardly therefrom which is connected to a vacuum pump 525 which is driven by a motor 526, and the means for driving the same will be later described.

The branch pipe 524 leads to a vacuum pressure tank 528 which has a pipe 529 leading from the bottom thereof. The pipe 529 leads to a vacuum pump 530 and has a pipe 527 leading therefrom to a motor 531. The source of power for the motor 531 will be later described.

Rubber tape or other suitable resilient material is indicated by reference character 532 and is placed around all edges of the sponge rubber blocks 493 and flanges 496 to assist in securing the blocks 493 to the plates 492.

Welded to the remote surfaces of the housings 495 is a vertically disposed angle bar 533 (Figure 15) which has secured thereto, by bolts 534, slide bars 535 and 536. The horizontally disposed dovetail bar 536 is slidably mounted in a dovetailed block 537 (Figure 17) which is fixed to a vertically disposed bar 538 by means of screws 539 (Figure 16). The upper end of the vertically disposed bar 538 is secured by means of screws 543 to a horizontally disposed bar 544 which extends to the left in Figure 1 and forwardly and is fastened by means of a screw 545 to a block member 546 which is integral with the inside surface of the vertical side member 12.

The lower end of the vertically disposed bar 538 is secured by bolts 623 to a horizontally disposed bar 547 which extends to the left in Figure 1 and forwardly and is secured to a block 548, integral with the vertical side member 12, by means of a screw 549.

The other horizontally disposed dovetail bar 535 is mounted for horizontal sliding movement in a dovetailed block 550 which is secured to a vertically disposed bar 551 by means of bolts 552. The upper end of the vertically disposed bar 551 is secured by bolts 553 to a horizontally disposed angular bar 554 which extends to the right in Figure 1 and is secured to a block 559 integral with the side member 11, by means of a bolt 555.

The lower end of the vertically disposed bar 551 is also secured by bolts 623 to a horizontally disposed bar 540 which extends to the right in Figure 1 and forwardly and is secured to a block 541, integral with the vertical side member 11, by means of a screw 542.

Secured to the front faces of the vertically disposed bars 538 and 551 respectively are angle clips 556 and 557 which are secured by the bolts 539 and 552 which have been described as holding the blocks 537 and 550 to the vertical members 538 and 551 respectively (Figures 12, 15, 16 and 17). The angle clips 556 and 557 project forwardly and have secured thereto by bolts 558 a horizontally disposed bar 560 (Figure 12) which has projecting downwardly from the center thereof a vane 561 which also projects to the right in Figure 20 as at 562, and serves as a guide for the bottles B as they are moved upwardly by the elevating mechanism.

Secured to the top surface of the horizontal bar 560 by means of screws 563, is a horizontally disposed female dovetail bar 564 in which is mounted for sliding movement a dovetail bar 565 (Figures 15 and 20). The horizontal dovetail bar 565 is slotted at its free end for reception of one end of a link 566 which is pivotally secured in the slot by a pin 567. The free end of the link 566 is pivotally secured as at 570 to a vertically disposed lever 571 which is pivotally mounted on a shaft 572. The shaft 572 is fixedly mounted in bearing blocks 573 and 574 having bearing bores 568 and 569 and which are integral with the vertical side members 11 and 12 respectively.

The lower extension of the arm 571 which is indicated by reference character 575 has a pin 576 fixed therein on which is pivotally mounted a portion 577 of a connecting rod 578. The lower end of the connecting rod 578 (Figure 20) is threadably imbedded in a yoke 580 which is mounted for sliding movement on a collar 581 fixed on the shaft 26. Secured to the side of the yoke 580 by means of a nut 583 is a cam follower 582 which is engaged by the surface of the cam 79. The bar 565 is employed to push the completed carton full of bottles onto a conveyor to be later described.

If for any reason the carton filled with bottles encounters an obstruction, the following mechanism is operated. Pivoted as at 585 is a lever 586 which is also engaged by the pin 576 and is held in spaced relation to portion 577 by a bolt 588 on which is mounted a compression spring 589. The bolt 588 slidably penetrates the arm 577 as well as the lever 586 and has secured on the top end thereof lock nuts 590 to thereby provide adjustment for the compression of the spring 589, the arm 586 having an extension arm 591 secured thereto by any suitable means, such as rivets 592 and the ends of the arm 586 have secured thereto by means of a screw 593 an angle clip 594 which is threadably penetrated by an adjustment screw 595 having a lock nut 596 thereon. The adjustment screw 595 is normally in engagement with a sensitive switch, commonly called a micro-switch, 598. The micro-switch 598 is secured to a plate 599 which is mounted on the end of the bar 577. The wiring between a source of power and the switch 598 will be later described.

If for any reason the bar 565 cannot have a full stroke as heretofore stated, the cam 79 will force the connecting rod 578 upwardly, but the vertically disposed lever 571 will not be able to move its full stroke. Therefore the portion 577 of the connecting rod 578 will be forced to ride over and beyond the pin 576 as shown in Figure 20. This will force the lever 591 downwardly and will pull the adjustment screw 595 away from contact with the micro-switch 598 thereby disconnecting the current from the master central switch, to be later set forth. When the obstructing carton of bottles or other matter has been removed from the path of the arm 565, the parts just described may be returned to normal operating position as shown in Figure 20, by manually moving the arm 591 downwardly and moving the associated parts of lever 571 to the desired position and then releasing the bar 591.

The remote ends of the horizontally disposed bar 560 have spring perches 603 secured thereto (Figures 1, 12 and 15) which support the lower ends of the tension springs 335 heretofore described. The upper end of the vertically disposed bar 561 has secured, by screws 604, the lower end of the strap iron bar 445 heretofore described as being welded to the lower surface of the chute 443. The extreme right-hand end of the dovetail bar 535 as viewed in Figure 15 has welded thereto a bar 605 which has threadably mounted therein an adjustment screw 606 which has threadably mounted thereon a lock nut 607. The adjustment screw 606 engages a micro-switch 610 whenever there are not any cartons between the suction members 490 and 491 or when they occupy the position shown in Figure 15.

After the bottles B have been raised upwardly or elevated by the bracket 165 and at which time the sidewalls and bottom flaps of the carton C have already been drawn apart by the suction mouthpieces 490 and 491, as shown in Figure 16, certain mechanism is operated to cause the suction mouthpieces to press against the outside walls of the carton and also press the bottles B together in such a manner that the elevating mechanism or bracket 165 may be lowered and the bottles will remain in position.

It is obvious that the L-shaped member 459 has been moved out of the way of the bottles prior to their being elevated and this L-shaped member will remain out of the way until the carton C is pushed onto the conveyor to be later described (Figure 15).

When the elevator bracket 165 has returned to its lower position and the bottles are held in place by the sponge faced members 490 and 491, the glued flap 405 of the carton C is first folded into horizontal position by means of an apparatus to be presently described, and then the other flap 406 is folded into horizontal position.

Inasmuch as the folding means are identical on both sides of the machine, except their being opposite hand, like reference characters will apply. Mounted for horizontal sliding movement in the dovetailed bars 537 and 550, as viewed in Figures 12 and 15 are horizontal dovetail bars 612. The proximate ends of dovetail bars 612 in Figures 15, 16, 17 and 29 have welded thereto angle clips 613 which have secured to their horizontal surfaces transverse angle bars 614 by means of screws 615.

Pivotally secured near the central portion of the horizontal dovetailed bars 612 (Figure 25) are rectangular blocks 618 which have slidably mounted thereon the upper forked ends of bell crank levers 619. The bell cranks 619 are secured to shafts 620 which are oscillatably mounted in brackets 621. The brackets 621 are fastened by the screws 623 to the lower ends of the vertically disposed bars 533 and 551.

Secured to the shafts 620 are the arms 625 which extend outwardly and have secured in the remote ends thereof suitable tension springs 626 (Figure 1). The tension springs 626 extend upwardly and are secured to a spring perch 627 which is welded or fastened by screws 628 to the front surfaces of the flanged vertical side members 11 and 12 (Figure 1).

Also fixedly secured on shafts 620 are links 630 which have pivotally secured to the proximate ends thereof connecting rods 631. The lower ends of the connecting rods 631 are threadably imbedded in yokes 632 (Figures 25 and 26) and the free ends of the yokes 632 are mounted for sliding movement on collars 633 which are fixed to the shaft 26 (Figures 23 and 25). The yokes 632 have fixed thereon suitable cam followers 635 which engage the surfaces of cams 77 and 80.

Pivotally secured to the horizontal dovetail bars 535 and 536, which are mounted for horizontal sliding movement in the block 537, are square blocks 640 which have slidably mounted thereon the forked upper ends of bell cranks 641. The left-hand bell crank 641, as viewed in Figure 23, is pivotally mounted on a shaft 642 and the right-hand bell crank, as viewed in Figure 23, is pivotally mounted on a shaft 643.

The shaft 642 is fixedly secured in the bearing 461 of bracket 457, heretofore described, and the shaft 642 is fixedly secured in a bracket 645 which is secured to the inside surface of the vertical side member 11 by any suitable means such as screws 644 (Figure 8).

The remote ends of the bell cranks 641 (Figure 23) have bearing portions 646 thereon in which are pivotally mounted pins 647. Secured to the pins 647 is the top end of connecting rods 648. The connecting rods 648 extend downwardly and are fixedly secured to pins 650 which are rotatably mounted in the bearing portions 651 of a bell crank 652 and an arm 649.

A horizontal arm 653 of the bell crank 652 extends rearwardly and has a portion 654 which is fixedly mounted on a shaft 655 as viewed in Figure 23 and has a downwardly projecting arm 656 which has fixedly secured therein a shaft 657 on which is rotatably mounted one end of a connecting rod 659 (Figure 24).

It will be noted that the lever 649 as shown in Figure 23 does not have the downwardly projecting leg 656 but is also fixedly mounted on the shaft 655. The shaft 655 is rotatably mounted in bearings 662 and 663 having bearing bores 665 and 669 therein and which are integral with the side members 11 and 12 respectively. The connecting rod 659, which has just been described, projects downwardly and forwardly and is threadably imbedded in a yoke 664 which is mounted for sliding movement on a collar 666 fixedly secured to the shaft 26. The yoke 664 has secured thereto a cam follower 667 which engages the surface of the cam 81 mounted on the shaft 26 as heretofore described.

After the folding angle bars 614 have folded the flaps 405 and 407 on the carton C the plunger bar 555 pushes the carton onto a conveyor which is to be presently described.

The bearing block 468, which has heretofore been described, as being fixed to the bracket 457, extends from left to right in Figure 18 and has uprising portions 668 thereon which have fixed therein the remote ends of a shaft 670 on which is rotatably mounted a plurality of rollers 671. A horizontally disposed plate 674 is secured to the top surface of the bearing block 468 by bolts 675 which penetrate sleeves 676 on which are rotatably mounted ball bearings 677. The bolts 675 besides penetrating the sleeves 676 also penetrate angle bars 678 and the plate 674. The ends of the bolts 675 are then threadably secured in the portion 668 of the bearing block 468.

The plate 674 has openings 680 and 681 therein through which the rollers 671 and a plurality of rollers 682 project. The rollers 682 are rotatably mounted on a shaft 683 which is fixedly secured in bearing blocks 684 secured to the bottom side of the plate 674 by welding. Rearwardly of the plate 674 and adjacent thereto is a shaft 685 which is rotatably mounted in bearings 686 and 687 which are secured to the vertically disposed plate 261, heretofore described as being fixed to the vertical side member 11 and the side member 12 respectively.

Fixed to the central portion of the shaft 685 is a rubber roller 688 (Figures 13 and 19) on which is mounted a conveyor belt 690. Rotatably mounted on each side of the roller 688 and on the shaft 685 are bearings 691 and 692 which are secured to the downturned flanges of an inverted channel member 693 by any suitable means such as screws or bolts 694.

The extreme left-hand end of the inverted channel bar 693 as viewed in Figure 2 has secured thereto by any suitable means such as bolts 697 a U-shaped member 698 which has welded thereto a column 699. The lower end of the column 699 is supported on the floor on which the base of the machine rests.

Also extending beyond and mounted on the extreme end of the inverted channel member 693, as viewed in Figure 5, are bearing blocks 700 and 701 which have rotatably mounted therein a shaft 702 which has a rubber roller 703 mounted thereon around which the conveyor belt 690 passes. The left-hand end of the shaft 702 as viewed in Figure 5 has secured thereon a sprocket wheel 704 which supports a sprocket chain 705 which extends downwardly and is supported by a sprocket wheel 706 secured to a shaft 707 on a motor 708. The motor 708 has wires 709 extending therefrom which are connected to an electric plug 710 which will be inserted in a part of the electrical system which will be later described.

Welded to the remote sides of the channel member 693 is a plurality of vertically disposed bars 714 (Figure 2) which extend upwardly and have slidably mounted near their top ends a plurality of rods 715 which are held in position by thumb screws 716 which threadably penetrate the top ends of the bars 714 and lock the horizontally disposed rods 715 in position. The ends of the rods 715 are welded to a pair of guide bars 717 and 718, (Figure 5).

A detailed description of the various figures of the drawings having been given, it is believed that an explanation of the operation of the machine can best be understood by referring to the diagrammatic showing in Figures 39 and 39-A where many parts illustrated in the drawings are shown schematically, and there the piping and wiring systems are schematically shown for the first time for the reason that the pipes and wires on the mechanical figures in the drawings would not tend for clearness, for, as a matter of fact, the wiring and the controls for the various parts of the machine could be disposed at points remote from the machine.

It has already been disclosed how the suction mouthpieces 490 and 491 are connected to a means for providing a vacuum for the operation of the mouthpieces, so the piping will not be repeated at this time. A source of power such as 735 has three wires 736, 737 and 738 which run to a master switch 739 which is generally referred to as a manual control starter and such as is manufactured by the Federal Electric Products Company located at Newark, New Jersey, and which is more clearly described in Sweet's File for Product Designers, page 2 of section 3B, diagonal 5.

Connected to the other side of the switch 739 are wires 740, 741 and 742 which extend downwardly into a junction box 743. The wires 740, 741 and 742 pass downwardly out of the junction box 743 into a motor control unit 744 which is also referred to as a magnetic starter and is further described in the Sweet's catalogue heretofore described in section 3A, diagonal 5, page 30, under the heading "Magnetic Starters, CR7006." That portion of the diagram which is shown within the confines of the motor control 744 is copied from a diagram provided with the switches by the General Electric Company.

The wire 740 is connected to a terminal 745 within the motor control unit 744 and the wire 741 is connected to a terminal 747 within the motor control unit 744 and the wire 742 is connected to a terminal 748 within the confines of the control unit 744. Also connected to the terminal 745 is a wire 749 which extends to a terminal 750 on the upper side of the motor control unit 744.

Also connected to the terminal 750 is a wire 751 which extends upwardly through the top of the motor control unit 744 and enters a three-unit push button station 752 consisting of a start push button 753, a jog push button 754 and a stop push button 755 housed therein. The wire 751 contacts the upper side of the jog push button 754 and the other upper side of the jog push button 754 has a wire 756 running therefrom to a junction point 756a. The wire 756 extends from the junction point 756a upwardly to the lower side of the start switch 753 and also extends downwardly to a wire 757 which extends upwardly to the lower side of the jog switch 754 and downwardly to the upper side of the stop switch 755.

Extending from the other opposite lower side of the start switch 753 and to the left in Figure 39 is a wire 758 which extends downwardly and is joined by a wire 759 which extends from the opposite lower side of right-hand lower side, as viewed in Figure 39, of the jog switch 754. The other end of the wire 758 is connected to a terminal 760 within the motor control unit 744.

There are also confined within the motor control unit 744 adjacent the terminals 745 and 760, terminals 747 and 748 which are brought into contact when desired with the terminal 750 and terminals 761, 752a and 746, which are adjacent the terminal 750. Connected to the terminals 746, 752a and 761, respectively, are wires 762, 763 and 764. The wires 762 and 764 pass downwardly through overload units 850 and to the motor 21. The wire 763 passes directly to the motor 21.

The wire 765 passes downwardly from the right-hand side of the stop switch 755 into the motor control unit 744, passing through the same and also passing through the junction box 743 and into the lower side of a junction box 766 and through the junction box 766 to the micro-switch 598 which is located on the arm portion 577 of the connecting rod 578 as shown in Figure 20.

Extending from the opposite side of the micro-switch 598 is a wire 780 which also passes through the junction box 766, through the junction box 743 and into the motor control unit 744 where it is connected to a terminal 782. Extending from the terminal 782 is a wire 785 which passes through a solenoid unit 786 and passes to a terminal 787 to which is connected a wire 788, the other end of which is connected to the terminal 748.

Within the junction box 743 and extending from the wire 742 is a wire 790 which passes downwardly out of the junction box 743 and into the lower side of the junction box 766, passing through the same into a junction box 767, where it joins a wire 768 which passes upwardly to the right-hand side of the micro-switch 610 which has been described as being mounted on the vertically disposed bar 551 as shown in Figure 15.

The wire 768 also passes downwardly out of the bottom of the junction box 767 and extends into the right-hand side of a junction box 770 and passes out of the left-hand side of the junction box 770 and upwardly to the right-hand side of the micro-switch 157 which is mounted on the plate member 156 which is shown more clearly in Figures 13, 15 and 21.

Also joining the wire 768 within the confines of the junction box 770 (Figure 39–A) is a wire 771 which extends upwardly to the right-hand side of the micro-switch 158 which is similar to the micro-switch 157. Extending from the left-hand side of the micro-switch 157 is a wire 773 which extends downwardly into the left-hand side of the junction box 770 and has connected thereto a wire 774 which projects upwardly out of the junction box 770 and is connected to the left-hand side of the switch 158.

The wire 773 passes through the junction box 770 coming out of the right-hand side thereof and extends upwardly into the bottom of the junction box 767 and passes through the same to the right-hand side of the micro-switch 775 which is secured to a bar 727 which is welded to the horizontal leg of an angle bracket 725 which extends downwardly on its right-hand end as viewed in Figure 4 and is secured to the exterior vertical surface of the vertical side member 11 by any suitable means such as screws 728.

It may be noted that the horizontal leg of the bar 725 also extends outwardly from the vertical side member 11 and is fastened to the arm 507 by any suitable means such as screws 726. The micro-switch 775 has a follower wheel 775a which is permitted to engage the surface of the cam 84 heretofore described as being fixedly secured to the shaft 26 (Figures 3 and 4).

Referring again to Figure 39–A, the left-hand side of the micro-switch 775 has extending therefrom a wire 776 which extends downwardly and into the junction box 767 where it has connected thereto a wire 777 which passes out of the right-hand side of the junction box 767 and upwardly to the left-hand side of the micro-switch 610. The wire 776 also passes out of the lower left-hand side of the junction box 767, as observed in Figure 39–A, and passes into the junction box 766 where it is joined by a wire 782 which passes downwardly out of the junction box 766 to the right-hand side of the solenoid 65 as observed in Figure 39–A which has a wire 778 extending upwardly therefrom into the bottom of the junction box 766 where it is joined by a wire 779 which extends outwardly from the bottom of the junction box 768 and passes into the bottom of the junction box 743 and is connected to the wire 741 therein.

Secured to the lower terminals 747, 748 and 745 within the motor control unit 744 are wires 792, 793 and 794 respectively which extend downwardly through the bottom of the control unit 744 into a three phase manual starter switch 795 generally referred to as a Cross-D-Line type with overload protection. This manual motor starter is similar to that referred to in the Sweet File-Product Designers Catalogue, section 3B, diagonal 5, page 2, under the heading "Manual A-C Motor Starters, Bulletin 404" and such as is manufactured by the Federal Electric Products Company.

Extending from the lower portion of the switch 795 are lead wires 800, 801, and 802 which enter into the top of a switch 805. The wires 800, 801 and 802 are connected to terminals 806, 807 and 808 respectively. The switch 805, being identical to the switch 795, has extending from the bottom thereof wires 810, 811 and 812 which are connected to the motor 531. Leading from the terminals 806, 807 and 808 within the switch 805 are wires 815, 816 and 817 respectively which extend into a switch box 818 and are connected to terminals 820, 821 and 822 respectively within the switch box 818. Extending from the lower end of the switch box 818 are wires 824, 825 and 826 which enter the motor 526, thereby completing the circuit.

Connected to the terminals 820, 821 and 822 within the switch box 818 are wires 829, 830 and 831 respectively which pass out of the switch box 818 into a switch box 832 and the switch box 832 has wires 835, 836 and 837 extending therefrom which are connected to a three phase female electric plug 840 to which is connected the male plug 710 having the wire 709 connected thereto which leads to the motor 708 as shown in Figure 5.

By referring to Figures 40, 41 and 42 there may be observed a modified form of suction valve control mechanism which operates in conjunction with the suction mouthpieces 502 and 503 and has improvements thereto with respect to the views shown in Figures 1, 3, 4 and 5.

It has already been described how the shaft 26 has secured thereon a cam 84 which has adjacent thereto another cam 85 which is also secured to the shaft 26. In the modified form of the invention, the cam 85 is omitted and the cam 84 has integral therewith a cam 85b which has secured thereto by any suitable means such as screws 85a an L-shaped bar 851. The cam 85b has a raised portion 85c integral therewith and the surface of the cam 85b is engaged by a cam follower 517a which replaces cam follower 517 and which is secured in a leg 853 of a pivotally mounted bracket 854. Adjacent the cam follower 517a and projecting at right angles from the leg 853 is a portion 856 the end of which rests against the lower portion of the cam 85b. The bracket 854 is pivotally mounted near its center on a shaft 857 and the remote ends of the shaft 857 are secured in downwardly projecting ears 858 and 859 of a bracket 860.

The bracket 860 extends upwardly and has secured on its surface adjacent the side member 11 and by any suitable means such as screws 862 a supporting bar 863. The bar 863 has a lateral projection on its side which is next to the vertical side member 11 and has a downturned portion through which a bolt 864 secures the same to the vertical side member 11.

Integral with the bracket 860 and disposed on the top thereof is a cylindrical member 866 one end of which is closed by a wall 867, the other end of the left-hand end of the member 866, as viewed in Figure 41, having an opening therein which is covered intermittently by a circular cover, 870. A threaded shaft 871 projects laterally from the cover 870 and threadably penetrates a leg 872 of the bracket 854 and has a lock nut 873 secured in the end thereof.

The bracket 854 has a horizontally disposed portion 874 integral therewith and this portion 874 has a vertically disposed adjustment screw 875 threadably imbedded therein. The upper end of the adjustment screw 875 intermittently engages a button 876 of a micro-switch 877 which is secured to the vertical side wall portion of the bracket 860.

The annular ring portion 866 of the bracket 860 has threadably imbedded therein pipe couplings 880 and 881 to which are secured the ends of the pipes 505 and 518 respectively which have heretofore been described.

By referring to Figure 39-A, it may be observed that the micro-switch 877 is shown in dotted lines, due to its being part of the modified form of the invention. The micro-switch 877 has a wire 885 leading from the right side thereof downwardly into the junction box 767 wherein it is connected to the wire 768 and thus the current proceeds through the wire 790. The other side of the switch 877 has a wire 886 connected thereto which extends downwardly also into the junction box 767 and is connected to the wire 773. It is obvious from the arrangement of the wires 885 and 886 that the current will flow through micro-switch 877 and through the wires 790 and 773 in a like manner to that of the micro-switch 157 and the micro-switch 158 as heretofore described.

Inasmuch as there has been no modification of the action of the cam 84 in the modified showing, no attempt will be made to describe the same at this time.

By referring to Figures 39-A and 43 to 46 inclusive, there may be observed a modified form of that part of the invention shown in Figures 24, 26, 28, 30 and 31. This modified form pertains more especially to the bottle elevating means.

Where like parts are used in the modified form of the invention, the same reference characters will apply and where similar parts are used in the new modified form of the invention to those shown in the original form of the invention, the suffix "a" will appear after the reference characters.

A description has already been given stating that the shaft 26 has the cam 79 secured thereon and a yoke portion 205 has lateral sliding movement on the collar of the cam 79. The yoke 205 is replaced by a modified yoke portion 205a and has slidably mounted therein a shaft 900. This shaft 900 has a cam follower 582a, replacing cam 582 which is threadably mounted in the same which traverses the perimeter of the cam 79. The transverse shaft 900 has a slot 901 therein which is slidably penetrated by an upper portion 902 of a plate 903. The plate 903 is secured by screws 904 to a bar 905 the lower end of which is fixedly mounted on a shaft 908.

The shaft 908 oscillatably penetrates a bearing block 909 which has out-turned portions at its lower end which are slidably penetrated by screws 910 which in turn are threadably imbedded in the base member 10.

The bearing block 909 also has an upturned lip 911 integral therewith which has fixedly secured therein a spring perch 912 on which one end of a tension spring 913 is mounted. The free end of the shaft 908 has a bar 915 fixedly mounted thereon which extends upwardly and has a laterally projecting portion 916 integral therewith. Slidably penetrating the portion 916 of bar 915 is a small shaft 917 which has a headed portion 918 thereon. The bearing portion 916 has an enlarged cavity 920 thereon in which an enlarged portion 921 of the pin 917 has lateral sliding movement. The portion 921 of the pin 917 extends outwardly from the bar 915 and its free end penetrates a hole 922 in a bracket 923 which extends upwardly and is secured by any suitable means such as screws 924 to the cross bar 14 of the frame.

The purpose of the slidably mounted shaft 900 and the plate 903 and other associated parts is to provide a means for permitting free motion or rotation of the cam 79 without moving the yoke 205a relative to the cam surface 79 and raising the bottles B. To do this, the shaft 900 is moved to the left in Figure 46 by drawing the pin 917 to the left in Figure 43 thereby drawing the enlarged portion 921 out of the hole 922, and moving the top end of the bar 915 in a counter-clockwise direction in Figure 47 and thus moving the shaft 908 in a like manner and moving the top of the plate 903 to the left and thus drawing the shaft 900 to the left and drawing the cam follower 582a out of engagement with the cam 79.

By referring to Figure 43 it may be noted that the yoke 205a extends to the right and has an enlarged portion 929 integral therewith. The portion 929 has in its lower end a slot 930, which is transversely penetrated by a shaft 931 which has pivotally mounted thereon a bar 932 which extends outwardly or to the right in Figure 43 and passes under a shaft 203a which replaces shaft 203. The end of the bar 932 is also passed under a downwardly projecting portion 934 of the yoke 205a and is urged against this projection 934 by a bolt 935 which slidably penetrates the bar 932 as well as the end of the yoke 205a. The yoke 205a has a counter bore 936 therein in which the lower end of a compression spring 937 is confined. The upper end of the compression spring 937 which, incidentally, is wound around the bolt 935, is restricted by lock nuts 938 threadably mounted on the upper end of the bolt 935.

Secured to the extreme end of the yoke 205a by any suitable means, such as screws 940, is a microswitch 941 which has a button 942 slidably mounted therein. The extreme right-hand end of the bar 932 extends beyond the yoke 205a and in normal operation of the machine the push button 942 is urged upwardly which closes the switch.

By referring to Figure 39–A, it may be observed that the switch 941 has leading therefrom wires 945 and 946. These wires are shown in dotted lines, inasmuch as this is a modification of the original part of the invention. The wires 945 and 946 extend downwardly and pass into the junction box 956 wherein they are connected to the wires 765 and 780 respectively and thus complete a circuit identical to that circuit which runs through the switch 598 and has heretofore been described.

Referring again to Figure 43 and the yoke 205a, there is a downwardly projecting portion 948 integral with the yoke 205a, and this is disposed below the pin 931. The portion 948 has a hole 949 therein in which the free end of the tension spring 913 is mounted. Oscillatably mounted on the shaft 203a is a bell crank 196a, which is identical to the bell crank 196 heretofore described and is mounted on the same shaft 197, and associated parts from this bell crank 196a through the elevating means are identical and no further description is deemed necessary.

The purpose of the bar 932 and associated parts is to provide a means for relieving a prohibitive pressure against the elevating mechanism in the event that the bottles B meet an obstruction in the mechanism. In the event that the bottles obstruct the mechanism and thereby prevent the bell crank 196a from moving upwardly when the cam 97 forces the yoke 205a to the right as observed in Figure 43, the yoke 205a will move to the right and the shaft 203a will remain in the position shown in Figure 43.

This will cause the right-hand end of the yoke, as viewed in Figure 43, to be raised slightly with relation to the shaft 203a and pass over and beyond the shaft 203a. In so doing, the bar 932 will be forced away from the downwardly projecting portion 954 of the yoke 205a and this will cause the button 942 of switch 941 to move downwardly as viewed in Figure 43, or upwardly as viewed in Figure 39–A, thus opening the switch 941 and breaking the circuit which passes therethrough.

Method of operation

Prior to starting the machine, the empty cartons C in a flattened horizontal position must be loaded into the hopper which has the sides 275, 276, 277 and 278. Also the bottles B must be ready for entrance onto the conveyor chain 96 at the intake end of the machine. The master switch 739 is closed which will permit the current to pass from wires 736, 737 and 738 through wires 740 and 741 and 742 through the wires 793, 794 and 792.

When the switch 795 is closed, the current will continue through the wires 800, 801 and 802 to the switch enclosed in the switch box 805 and when the switch is closed in box 805, the current will pass through the wires 810, 811 and 812 to the vacuum pump motor 531. The motor 531 will drive the vacuum pump 530 and will cause a vacuum to be created in the vacuum tank 528, however if there is not sufficient vacuum in the vacuum tank 528, it will be necessary to start the motor 526.

In the switch box 805 and connected to the terminals 806, 807 and 809 are the wires 815, 816 and 817 which extend to the switch box 818, and when the switch is closed within the switch box 818 the current will continue through the wires 824, 825 and 826 into the motor 526 which will drive the second vacuum pump 525 thereby increasing the amount of vacuum pressure as may be required.

The bottles B which are filled in a bottling machine are delivered by a conveyor 100a onto the plates 99 which are a part of the endless conveyor chain 96 in side by side relation as shown in Figure 15. The conveyor 100a is driven at the same rate of speed as the conveyor chain 96. During the travel of the bottles B along the conveyor chain 96, they are held in the proper position by the horizontally disposed bars 127 and 128 and the center partition 132 on the left-hand side in Figure 15, and the bottles on the right-hand side are held in proper position by the horizontally disposed bars 129 and 130 and by the center partition 132.

It may be observed in Figure 13 that as the bottles leave the conveyor chain 96 they are pushed by the bottles on conveyor chain 96 onto the plate 161 which is disposed on the cross bar 13. From there they are pushed onto the plates 166 and 167 which are part of the elevating means. The bottles that are on the plate 161 and also on the plates 166 and 167 are continued in their course from left to right in Figure 13 by the bottles which are in back of them and still remaining on the conveyor chain 96. As they pass onto the elevating means as shown in Figure 13, the various parts of the machine will occupy the position shown in Figure 29.

When three bottles each are passed onto the plates 166 and 167, on each side of the partition 152, the bottle furthest to the right in Figure 13 will push the vertically disposed levers 177 and 178 to the right in Figure 13. This will cause the adjustment screws 188 mounted in the lower ends of the levers 177 and 178 to depress and open the micro-switches 157 and 158. If the bottles are not all the way onto the plates 166 and 167, one or both of the micro-switches 157 and 158 will not be depressed.

By referring to Figure 39-A, it may be observed that in the event that neither of the switches 157 and 158 are depressed to open the same, the current will flow from the lead wire 742 in the junction box 743 as shown in Figure 39 and will pass through the wire 790 and down through the lower portion of the wire 768 and through either the wire 771 or continue through the wire 768 to the side of the micro-switches 157 and 158 respectively. If the switches 157 and 158 are not depressed, the current will continue through the wire on the other side which would be wire 774 for switch 158 and would be wire 773 for switch 157. The current would continue through the wire 773 and to the micro-switch 775 which is shown in the side elevation of Figure 3.

So as to be certain that the parts of the machine will occupy a definitely predetermined position whenever one or both of the switches 157 and 158 is not depressed to open same, the switch 775 must be contacted by the projection on the cam 84, thereby completing the circuit when the parts are in a predetermined position before the machine will stop. The micro-switch 775 is the switch which is used for this purpose, and when depressed and closed, the current will continue through the wire 773 and through the switch 775 and through the wire 776 to the junction boxes 767 and 766 and through the wire 782 where it will enter the solenoid 65 thereby pulling the plunger 64 to the right in Figure 39-A and drawing the vertically disposed bar 61 out of contact with the projection 59 of treadle bar 72 which is fixedly mounted on the shaft 53. This will cause the treadle bar 52 to be raised and the knife 48, as viewed in Figure 35, will be raised into the slotted portion of the dog 49. The slotted portion of the dog 49, which is indicated by the reference character 49a, is tapered to conform with the taper of the knife 48. Therefore, the rotation of the arm 41 of the cam 35 will cause the dog 49 to be engaged by the knife 48 which will draw the dog 49 out of contact with the cavities 32 in the plate 30. This will, of course, be the disengagement of the clutch and the shaft 26 will not any longer rotate inasmuch as the gear wheel 24 is rotatably mounted on the shaft 26. The circuit through the solenoid 65 is completed by continuing on through the wire 778 into the junction box 766 to the wire 779 and is joined to the lead wire 741 leading from the master switch 739.

As the bottles B are being passed onto the elevating bracket 165, the cartons C are brought into the proper relationship as follows: The cartons are stacked in the hopper 274 and the flap 405 will be lower most and being disposed on the right-hand side as viewed in Figure 6. By referring to Figure 8, it may be observed that the sliding plate 267 at the bottom of the hopper 274 is in its furthest back position or in other words, as far to the left as it possibly can be. The plate 267 (Figure 2) is pulled to the right by the bracket 302 which is fixedly secured to the shaft 303, which is driven by lever bar 306 through the connecting rod 308 extending from the bell crank 310, which is oscillated by the cam 35. At this time, the treadle 54 is in its lowered position and the dog 49 of the clutch mechanism is in engagement with the clutch plate 30 and the shaft 26 is driven by the gear 24 which is in turn driven by the pinion 23 mounted on the shaft 22 driven by the motor 21.

The motor 21 as observed in Figure 39 receives its power by the closing of the master switch 739 which continues the circuit from its source 735 through the wires 740, 741 and 742 to the lower terminals 747, 748 and 745 within the motor control unit 744. The current continues through the wire 742 to the terminal 748 where the current continues also through the wire 788 to the solenoid 786 and through the wire 785 to the terminal 782 and through the wire 780 to the right-hand side of the micro-switch 598 as viewed in Figure 39-A.

The micro-switch 598, as heretofore described, is secured to the end of the connecting rod 578 as viewed in Figure 20 and is normally depressed to closed position by the adjustment screw 595, thereby completing the circuit between the wire 780 and the wire 765 on the other side of the switch 598.

The circuit continues through the wire 765 to the switch box 752 as viewed in Figure 39 and to the right-hand side of the stop switch 755. The current continues through the switch 755 and to the wire 757 and when the start switch 753 is depressed manually to close the same, the current continues through the wire 757 and through the wire 756, through the switch 753 to the wire 758 and to the terminal 760 within the motor control unit 744.

The circuit from the terminal 760 is not completed until after the motor control unit switch 744 has been energized. However, the current does proceed through the switch 755 as heretofore described and passes through the wire 757 to the wire 756 and through the wire 753 to one side of the jog switch 754 and through the switch 754 to the wire 751 which returns to the terminal 750 within the control unit 744.

From the terminal 750, the circuit continues through the wire 749 to the lower terminal 745 and thence through the wire 740 to the master switch 739 and then to the source of power 735. This completes the circuit in the solenoid 786 within the control unit 744, thereby causing the terminals 745, 747 and 748 to be raised upwardly against the lower surfaces of terminals 746, 752a and 761. The circuit then continues through the wires 762, 763 and 764 through the overload units 850 within the control unit 744 and to the motor 21.

Referring again to the Figure 9 and the hopper 274, the plate 267, as it is brought from left to right in Figure 9, has the plate 272 thereon which contacts the edge of the lowermost carton C and pushes the carton C from left to right through the opening 273 in the lower edge of the hopper 274 and projects the carton between the rollers 350 and 360 as well as the rollers 351 and 361 and the lower side of the carton C of the flap 405 passes over the glue roll 348 which has received a supply of glue from the mating glue roll 349, which turns at all times and is driven by the gear 344 on the same shaft as the glue roll 349 and the gear 344, meshing with the gear 345 mounted on the shaft 344, is driven through the shaft 344 by the sprocket wheel 380 which is driven by a chain 382 mounted on the sprocket wheel 383 which is integral with the pinion 23 mounted on the shaft 22 and driven by the motor 21.

It will be noted that although the clutch mechanism may not be in engagement with the gear 24, the pinion 23 will still continue to drive the glue rollers 349 and 348.

After the carton C has passed through the rollers heretofore described, it is picked up by the plate 327 as heretofore disclosed and propelled forwardly into the sheet metal U-shaped member 421 which is in the position shown in Figure 27. The U-shaped member is driven by the pinion 430 meshing with the segment on the lever 432 and this is pivoted as at 433 and the free end is driven by the connecting rod 436, the lower end of which is connected to the yoke 438 which has the cam follower 440 mounted thereon, and which cam follower follows the groove 442 in the side surface of the cam 35. The U-shaped sheet metal member 421 then turns in a clockwise direction as indicated in Figures 27, 29 and 6 and during this clockwise rotation of the member 421, the carton slides onto the chute 443, and as the U-shaped member 421 reaches the position shown in Figure 6, the carton will fall by gravity onto the horizontal leg of the L-shaped member 450.

After the carton has fallen onto the horizontal leg of the L-shaped member 450, the suction mouthpieces 490 and 491 will travel inwardly to the approximate position shown in Figure 15 at which point the suction pipes 502 and 503 will attain a negative pressure by the closing of the valve 506.

It may be observed in Figure 3 that the valve 506 will remain closed approximately one-half of a revolution of the shaft 26 and during this time there will be a suction in the pipes 502 and 503 which is caused by the vacuum pumps 525 and 530 heretofore described. When there is no pressure required in the lines 502 and 503, the cam follower 517 on the arm 508 of the escape valve release mechanism will be raised on the projecting portion of the cam 85.

The movement of the suction members 490 and 491 is caused by the cam member 81 which is mounted on the cam shaft 26 and driven by the gear 24 which is meshing with the gear 23 which is mounted on the shaft 22.

The cam 81 holds the cam follower 667 fixed to the yoke 664, which is integral with the connecting rod 659, which is pivoted to the lower leg 656 of a bell crank 652, on the right-hand side of the machine as observed in Figure 29.

The bell crank 652, as observed in Figure 29, extends upwardly and is pivotally secured to the shaft 655 and therefore turns the shaft as it is pulled or pushed, as indicated in Figure 24 and will cause the horizontal leg 653 of the bell crank 652 as well as lever 649 to move at their free ends in a vertical direction. This will move the connecting rods 648 in a like manner and move the bell cranks 641 so that the upper ends thereof are moved in a horizontal direction. The upper ends of the bell cranks 641, being pivotally mounted in relation to the horizontally disposed dovetail bars 535 and 536, will cause the bars 535 and 536 to be moved inwardly and outwardly with respect to each other.

The suction mouthpieces 490 and 491 will grasp each side of the carton C which has fallen onto the horizontal leg of the L-shaped bar 450, and as the suction mouthpieces 490 and 491 are drawn away from each other, the suction through the pipes 502 and 503 will cause the carton C to be opened at its lower end as shown in Figures 37 and 38. As the carton C is drawn open by the suction mouthpieces 490 and 491, the L-shaped bar 450 is drawn to the left in Figure 15 by the dovetail bar 455 which is pivotally secured to the bell crank 477, which is pivoted, and is moved by the connecting rod 478, the lower end of which is connected to the lever 481, and which lever 481 has on the end thereof the follower 484 which is engaged by the cam 75.

If for any reason the carton C does not fall between the suction mouthpieces 490 and 491, the suction mouthpieces will be drawn together until their faces contact each other at which time the adjustment screw 606 on the end of the dovetail bar 535 will come in contact with the switch 610 and will depress and close the same at which time the circuit will run from the switch 610 as viewed in Figure 39-A to the wire 777 where it joins wire 776, and through the junction boxes 767 and 766 and through the wire 776 to the right-hand side of the solenoid 65 at which time it will draw the plunger 64 to the right and disengage the bar 61 from the clutch pedal 52 thereby releasing the same as heretofore described.

The circuit is completed through the solenoid 65 and through the wire 778 into the junction box 766, and then through the wire 779 and lead wire 741 within the junction box 743, and through the switch 739 and through the wire 737 to the source of power 735, and then it returns through the wire 738 to the switch 739, through the wire 742, where it passes through the wire 790 and through the junction boxes 743 and 766 and into the junction box 777 where it is connected to the wire 768 which passes out of the junction box 767 and to the right hand side of the switch 610 (Figure 39-A) thereby completing the circuit.

As the lower end of the carton C is drawn open by the suction mouthpieces 490 and 491, the bottles B on the elevating plates 166 and 167 are moved upwardly by the bracket 165 which is slidably mounted on the dovetailed bar 164. The bracket 165, as heretofore described, has the connecting rod 192 pivotally secured thereto which passes downwardly into the arm 196 of the bell crank and is pivoted in the end thereof, and the bell crank extends rearwardly and is pivoted on the shaft 197 and the other arm 202 of the bell crank is pivoted to a connecting rod 204 which is fixed in the end of the yoke bar 205 which has a follower thereon and the follower 207 is engaged by the surface of the cam 78 mounted on the shaft 26 and driven by the gear 24.

When the bottles B have been raised to the position shown in Figure 16 and have entered the carton C, the sponge rubber surfaces of the suction mouthpieces 490 and 491 come toward each other slightly so as to press the sides of the carton C against the bottles and hold them in this position, at which time the elevating plates 166 and 167 are returned downwardly leaving the bottles in the position originally attained. At this time, the flaps 405 and 406 of the carton C are folded one at a time as shown in Figure 16, by the folder angle bars 614. It has already been described how the folder bars 614 are moved inwardly and outwardly by being mounted on the dovetail bars 612 which are moved by the bell crank levers 619 which are pivoted at their lower ends and also have secured to the free ends thereof the connecting rods 631 which are fixed in the yoke members 632 which have secured thereto cam followers 635 which are engaged by the cams 77 and 80 mounted on the shaft 26 which is driven by the gear 24.

After the flaps 405 and 406 of the carton C have been folded properly, the suction mouthpieces 502 and 503 are drawn slightly apart from each other to release the carton and also at this time there is no longer any suction in the pipes 502 and 503 to also permit the carton to be released. The carton is then supported by the folding means and the horizontally disposed dovetail bar 656 pushes the carton onto the conveyor plate 678 where it passes between the rollers 677 as well as over the rollers 671 and 682 which convey the filled carton onto the conveyor belt 690 which is driven, as heretofore described, by the motor 708 which has the sprocket wheel 706 fixed to the shaft 707 of the motor and which has mounted thereon the sprocket chain 705 which passes upwardly over the sprocket wheel 704 which is fixed to the shaft 702 mounted in bearings 700 and 701 at the end of the conveyor 690 and over which the endless belt 690 passes. The conveyor belt 690 is of sufficient length to give time for the glued flaps to set before they are discharged from the conveyor 690.

In the drawings and specification there has been set forth a preferred embodiment of the invention, and although specific terms are employed, they are used in a generic and descriptive sense only, and not for purposes of limitation, the scope of the invention being defined in the claims.

We claim:

1. A machine for placing articles in a carton having side walls and bottom flaps depending therefrom, means for conveying the articles into the machine, means for moving the cartons to a pre-determined position in the machine, means for applying glue to at least one of the bottom flaps, means for positioning the open bottomed cartons above a batch of the articles, means for elevating the articles disposed at the end of the conveyor and onto which the articles are moved by the pressure of the following articles, suction means for engaging the opposed side walls of the carton and moving them apart from each other a sufficient amount to receive the batch of articles sufficient to fill the carton, means for actuating the elevating means to move the articles up into the carton, means for exerting pressure on the suction means on each side of the carton to clamp the carton and the articles therein, means for then lowering the elevating means away from the bottom of the articles, means for folding the bottom flaps against the bottom of the articles, means for causing the suction and pressure means to move away from the side walls of the carton to allow the carton with the flaps in folded condition to rest on the folding means, means for moving the carton from off the folding means rearwardly of the machine, and means for conveying the carton away from the machine.

2. A machine for placing articles in a carton having side walls and bottom flaps depending therefrom, means for conveying the articles into the machine, means for moving the cartons to a pre-determined position in the machine, means for applying glue to at least one of the bottom flaps, means for positioning the open bottomed cartons above a batch of articles, means for elevating the articles disposed at the end of the conveyor and onto which the articles are moved by the pressure of the following articles, suction means for engaging the opposed side walls of the carton and moving them apart from each other a sufficient amount to receive the batch of articles sufficient to fill the carton, means for actuating the elevating means to move the articles up into the carton, means for exerting pressure on the suction means on each side of the carton to clamp the carton and the articles therein, means for then lowering the elevating means away from the bottom of the articles, means for folding the bottom flaps against the bottom of the articles, the folding means being operated in sequence to first fold one of the bottom flaps against the bottom of the articles and then to fold the other of the bottom flaps against the lower surface of the first bottom flap, means for causing the suction and pressure means to move away from the side walls of the carton to allow the carton with the flaps in folded condition to rest on the folding means, means for moving the carton from off the folding means rearwardly of the machine, and means for conveying the carton away from the machine.

3. Apparatus for placing bottles in an open bottomed carton having depending bottom flaps, which comprises a conveyor for moving two aligned rows of bottles, means for disposing a carton above the bottles, means for applying adhesive to at least one of the bottom flaps of the carton before it is disposed above the bottles, elevating means for the bottles and means for moving a batch of bottles onto the elevating means, combined suction and pressure means for engaging opposed sides of the carton and moving them apart from each other, means for moving the elevating means to place a batch of bottles in the carton through the open bottom thereof, means for exerting pressure to the suction and pressure means to clamp the carton and the bottles therein with sufficient pressure to hold the same in elevated position, means for moving the elevating means away from the bottom of the bottles, means for folding first one of the bottom flaps inwardly against the bottom of the bottles and means for then folding the second of said flaps inwardly against the bottom of the bottles, and means for moving the carton from off the folding means, and a conveyor onto which the carton passes as it is moved off the folding means.

4. In a machine for placing articles in an open bottomed carton having sidewalls and a pair of flaps extending downwardly from the lower edge of the sidewalls of the carton, a conveyor for conveying the articles into the machine, means for advancing a carton in the machine, means for applying glue to at least one of the bottom flaps of the carton, means for positioning the carton with its flaps depending from the lower portion thereof above a pre-determined number of the articles, means for engaging the side-walls of the carton and moving the sidewalls along with the bottom flaps apart from each other, means for elevating a sufficient quantity of the articles into the carton to fill the carton, means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the holding means to allow the cartons to rest on the folding means, and means for discharging the filled cartons from the machine.

5. A machine for placing a plurality of articles in an open bottomed carton having a bottom flap, which comprises a conveyor for conveying the articles, means associated with the conveyor for aligning the articles into two parallel rows, means for positioning an open bottomed carton above the line of travel of the articles, means for opening the carton to a sufficient width to receive a batch of bottles, means for applying glue to the bottom flap before the carton is positioned above the line of travel of the articles, means for raising a batch of the articles, sufficient to fill the carton, upwardly into the carton, means for applying pressure on the means for opening the carton for holding the carton and the articles, means for lowering the means for raising a batch of the articles, means for folding the bottom flap beneath the articles while they are held in elevated position and means for conveying the filled cartons from the machine.

6. A machine for placing a plurality of articles in an open bottomed carton having a bottom flap, which comprises a conveyor for conveying the articles, means associated with the conveyor for aligning the articles into two parallel rows, means for positioning an open bottomed carton above the line of travel of the articles, means for opening the carton to a sufficient width to receive a batch of bottles, means for applying glue to the bottom flap, means for raising a batch of the articles, sufficient to fill the carton, upwardly into the carton, means for applying pressure on the means for opening the carton for holding the carton and the articles, means for lowering the means for raising a batch of the articles, means for folding the bottom flap beneath the articles while they are held in elevated position, and means for carrying the filled cartons from the machine.

7. Apparatus for placing a batch of bottles into a carton as they come from a bottling machine, comprising a conveyor onto which the bottles are discharged from the bottling machine, means for positioning an open bottomed carton above the row of bottles, said carton having bottom flaps depending from the lower end of opposed sides, means for opening the carton to a width sufficient to receive a batch of bottles, means for raising a batch of bottles up into the carton to a point where the lower portions of the bottles are disposed above the hinge point of the flaps of the bottom of the carton, means for clamping the sides of the carton to hold it and its contents in elevated position while the raising means are lowered, means for applying pressure on the means for opening the carton for holding the carton and the articles, means for lowering the means for raising a batch of the articles, means for folding the bottom flaps of the carton beneath the bottles while they are held in raised position, a conveyor for conveying the filled cartons from the machine and means for moving the filled cartons, after the bottom flaps have been closed, onto the last-named conveyor.

8. Apparatus for placing a batch of bottles into a carton as they come from a bottling machine, comprising a conveyor onto which the bottles are discharged from the bottling machine, means for positioning an open bottomed carton above the row of bottles, said carton having bottom flaps depending from the lower end of opposed sides, means for rendering adhesive at least one side of at least one of the bottom flaps, means for opening the carton to a width sufficient to receive a batch of bottles, means for raising a batch of bottles up into the carton to a point where the lower portions of the bottles are disposed above the hinge point of the flaps of the bottom of the carton, means for clamping the sides of the carton to hold it and its contents in elevated position while the raising means are lowered, means for folding the bottom flaps of the carton beneath the bottles while they are held in raised position, a conveyor for conveying the filled cartons from the machine and means for moving the filled cartons, after the bottom flaps have been closed, onto the last-named conveyor.

9. Apparatus for placing bottles in a carton having a depending bottom hingedly secured to the lower edge of one side of the carton, as they are discharged from a bottling machine, comprising a conveyor onto which the bottles are discharged from the bottling machine, means for aligning the bottles on the conveyor in two parallel rows, means for positioning an open bottomed carton above the bottles, means for opening the carton to a sufficient width to receive a batch of bottles, means for raising a batch of bottles upwardly into the carton, means for clamping the sides of the carton to hold it and its contents in elevated position while the raising means are lowered, means for moving the bottom portion of the carton to folded position beneath the bottles while they are held in raised position, to engage another portion of the carton, and means for conveying the cartons with the bottles therein from the machine.

10. Apparatus for placing bottles in a carton having a depending bottom hingedly secured to the lower edge of one side of the carton, as they are discharged from a bottling machine, comprising a conveyor onto which the bottles are discharged from the bottling machine, means for aligning the bottles on the conveyor in two parallel rows, means for positioning an open bottomed carton above the bottles, means for opening the carton to a sufficient width to receive a batch of bottles, means for raising a batch of bottles upwardly into the carton, means for clamping the sides of the carton to hold it and its contents in elevated position while the raising means are lowered, means for moving the bottom portion of the carton to folded position beneath the bottles while they are held in raised position, to engage another portion of the carton, means for securing the bottom to the carton when it reaches folded position, and means for conveying the cartons with the bottles therein from the machine.

11. In a machine for placing articles in an open bottomed carton having a pair of flaps extending downwardly from the lower edge of the side walls of the carton, means for driving the machine, a conveyor for conveying the articles into the machine, means for advancing a carton in the machine, means for applying glue to at least one of the bottom flaps of the carton, means for positioning the carton with its flaps depending from the lower portion thereof above a pre-determined number of the articles, means for engaging the side walls of the carton and moving the side walls along with the bottom flaps apart from each other, means for automatically rendering inactive the driving means from the machine when parts of the machine have attained a pre-determined position and in the event that a carton is not properly positioned above the articles, means for elevating a sufficient quantity of the articles into the carton to fill the carton, means for engaging the carton from opposed sides thereof and exerting inwardly directed pressure against the side walls of the carton to clamp the carton and the articles, means for lowering the elevating means for folding the bottom flaps inwardly onto each other, means for releasing the holding means to allow the cartons to rest on the folding means, and means for discharging the filled cartons from the machine.

12. In a machine for placing articles in an open bottomed carton having a pair of bottom flaps extending downwardly from the lower edge of the side walls of the carton, means for driving the machine, a conveyor for conveying the articles into the machine, means for advancing a carton in the machine, means for rendering adhesive at least one of the bottom flaps of the carton, means for positioning the carton with its flaps depending from the lower portion thereof above a pre-determined number of the articles, means for engaging the side walls of the carton and moving the side walls along with the bottom flaps apart from each other, means for automatically rendering inactive the machine in the event that a carton is not positioned correctly above the articles, means for elevating a sufficient quantity of the articles into the carton to fill the carton, means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the holding means to allow the cartons to rest on the folding means, and means for discharging the filled cartons from the machine.

13. In a machine for placing articles in an open bottomed carton, a hopper for receiving carton blanks stacked one upon the other, each of the cartons having a pair of bottom flaps extending downwardly from the lower edge of the side walls of the carton, a conveyor for conveying the articles into the machine, means for engaging the lowermost carton in the hopper and pushing the carton out of the hopper, means for rendering adhesive at least one of the bottom flaps of the carton, intermittently reciprocating positioning means, means for urging the carton into the intermittently reciprocating positioning means, arcuate means for retaining the carton within the positioning means during its rotation from a horizontal to a nearly vertical position and then releasing the carton with its flaps depending from the lower portion thereof above a pre-determined number of articles, means for engaging the side walls of the carton and moving the side walls along with the bottom flaps apart from each other, means for elevating a sufficient quantity of the articles into the carton to fill the carton, means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the holding means to allow the cartons to rest on the folding means, and means for discharging the filled cartons from the machine.

14. In a machine for placing articles in an open bottomed carton having a pair of bottom flaps extending downwardly from the lower edge of the side walls of the carton, a conveyor for conveying the articles into the machine, means for advancing a carton in the machine, means for rendering adhesive at least one of the surfaces of at least one of the bottom flaps of the carton, means for positioning the carton with its flaps depending from the lower portion thereof above a pre-determined number of the articles, means for engaging the side walls of the carton and moving the side walls along with the bottom flaps apart from each other, means for elevating a sufficient quantity of the articles into the carton to fill the carton, means for supporting the carton at the bottom edges of its flaps from the time it is positioned until its side walls are engaged, means for moving the carton supporting means out of the path of travel of the articles, means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the holding means to allow the cartons to rest on the folding means, and means for discharging the filled cartons from the machine.

15. In a machine for placing articles in an open bottomed carton having a pair of flaps extending downwardly from the lower edge of the side walls of the carton, a conveyor for conveying the articles into the machine, means for advancing a carton in the machine, means for applying glue to at least one of the bottom flaps of the carton, means for positioning the carton with its flaps depending from the lower portion thereof above a pre-determined number of the articles, means for engaging the side walls of the carton and moving the side walls along with the bottom flaps apart from each other, means for elevating a quantity of the articles into the carton, means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the holding means to allow the carton to rest on the folding means, means for discharging the filled carton from the machine, and means for automatically rendering inactive the machine if, for any reason, the carton discharging means or the filled carton does not occupy a pre-determined position.

16. In a machine for placing articles in an open bottomed carton having a pair of flaps extending downwardly from the lower edge of the side walls thereof, a conveyor for conveying the articles into the machine, means for advancing a carton in the machine, means for rendering adhesive at least one of the bottom flaps of the carton, means for positioning the carton with its flaps depending from the lower portion thereof above a pre-determined number of the articles, means for engaging the side walls of the carton and moving the side walls along with the bottom flaps apart from each other, means for elevating a quantity of the articles into the carton, resilient means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the holding means to allow the cartons to rest on the folding means and means for discharging the filled cartons from the machine.

17. In a machine for placing articles in an open bottomed carton having a pair of flaps extending downwardly from the lower edge of the side walls of the carton, means for driving the machine, a conveyor for conveying the articles into the machine, means for advancing a carton in the machine, means for applying glue to at least one of the bottom flaps of the carton, means for positioning the carton with the flaps thereof depending from the lower portion thereof above a pre-determined number of the articles, means for engaging the side walls of the carton and moving the side walls along with the bottom flaps apart from each other, means for elevating a sufficient quantity of the articles into the carton to fill the carton, means whereby if a pre-determined quantity of the articles is not on the elevating means, the driving means will be rendered inactive, means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the holding means to allow the cartons to rest on the folding means, and means for discharging the filled cartons from the machine.

18. In a machine for placing articles in an open bottomed carton having a pair of flaps extending downwardly from the lower edge of the side walls of the carton, a conveyor for conveying the articles into the machine, means for advancing a carton in the machine, means for rendering adhesive at least one of the bottom flaps of the carton, means for positioning the carton with its flaps depending from the lower portion thereof above a pre-determined number of the articles, means for engaging the side walls of the carton and moving the side walls along with the bottom flaps apart from each other, means for elevating a sufficient quantity of the articles into the carton to fill the carton, means for automatically stopping the conveyor while the elevating means is not in position for receiving the articles from the conveyor, clamping means for engaging the carton from opposed sides thereof and exerting inwardly directed pressure against the side walls of the carton to clamp the carton and the articles, means for lowering the elevating means from out of contact with the bottom of the articles, means for folding the bottom flaps inwardly onto each other, means for releasing the clamping means to allow the cartons to rest on the folding means, and means for discharging the filled cartons from the machine.

19. Apparatus for placing bottles in an open bottomed carton having depending bottom flaps which comprises a conveyor for moving two aligned rows of bottles, means for disposing a carton above the bottles, means for rendering adhesive at least one of the bottom flaps of the carton before it is disposed above the bottles, elevating means for the bottles and means for moving a batch of bottles onto the elevating means, means for stopping the moving means as the bottles are moving from the conveyor to the elevating means, although the elevating means may be in position for receiving the bottles, combined suction and pressure means for engaging opposed sides of the carton and moving them apart from each other, means for moving the elevating means to place a batch of bottles in the carton through the open bottom thereof, means for exerting pressure to the suction and pressure means to clamp the carton and the bottles therein with sufficient pressure to hold the same in elevated position, means for moving the elevating means away from the bottom of the bottles, means for folding first one of the bottom flaps inwardly against the bottom of the bottles and means for then folding the second of said flaps inwardly against the bottom of the bottles, and means moving the carton from off the folding means and a conveyor onto which the carton passes as it is moved off the folding means.

20. Apparatus for placing bottles in an open bottomed carton having depending bottom flaps which comprises a conveyor for moving two aligned rows of bottles, a clutch and clutch releasing arm, an electrically operated solenoid plunger connected to the clutch releasing arm, an electric motor for driving the clutch mechanism, means for disposing a carton above the bottles, means for applying adhesive to at least one of the bottom flaps of the carton before it is disposed above the bottles, elevating means for the bottles and means for moving a batch of bottles onto the elevating means, combined suction and pressure means for engaging opposed sides of the carton and moving them apart from each other, means for moving the elevating means to place a batch of bottles in the carton through the open bottom thereof, means for exerting pressure to the suction and pressure means to clamp the carton and the bottles therein with sufficient pressure to hold the same in elevated position, means for moving the elevating means away from the bottom of the bottles, means for folding first one of the bottom flaps inwardly against the bottom of the bottles, means for then folding the second of said flaps inwardly against the bottom of the bottles, and means moving the carton from off the folding means and a conveyor onto which the carton passes as it is moved off the folding means, automatically and electrically controlled means for completing an electric circuit to the solenoid to move the clutch releasing arm and thus disengage the clutch mechanism when an insufficient quantity of bottles is disposed on the elevating means, and means for stopping the machine when all moving parts thereof are in a pre-determined position.

21. Apparatus for placing bottles in an open bottomed carton having depending bottom flaps which comprises a conveyor for moving two aligned rows of bottles, means for disposing a carton above the bottles, means for applying adhesive to at least one of the bottom flaps of the carton before it is disposed above the bottles, elevating means for the bottles and means for moving a batch of bottles onto the elevating means, combined suction and pressure means for engaging opposed sides of the carton and moving them apart from each other, electrically operated means for automatically stopping the apparatus in the event that insufficient suction is available in the suction means to move the opposed sides of the carton apart from each other, means for moving the elevating means to place a batch of bottles in the carton through the open bottom thereof, means for exerting pressure to the suction and pressure means to clamp the carton and the bottles therein with sufficient pressure to hold the same in elevated position, means for moving the elevating means away from the bottom of the bottles, means for folding first one of the bottom flaps inwardly against the bottom of the bottles, means for then folding the second of said flaps inwardly against the bottom of the bottles, and means for moving the carton from off the folding means and a conveyor onto which the carton passes as it is moved off the folding means.

22. Apparatus for placing bottles in an open bottomed carton having depending bottom flaps which comprises a conveyor for moving two aligned rows of bottles, means for disposing a carton above the bottles, means for rendering adhesive at least one of the bottom flaps of the carton, elevating means for the bottles, means for moving a batch of bottles into the elevating means, combined suction and pressure means for engaging opposed sides of the carton and moving them apart from each other, means for moving the elevating means to place a batch of bottles in the carton through the open bottom thereof, means for rendering inactive the elevating means in the event the bottles, or any part of the elevating means, are interrupted in their upward travel before reaching a pre-determined position, means for exerting pressure to the suction and pressure means to clamp the carton and the bottles therein with sufficient pressure to hold the same in elevated position, means for moving the elevating means away from the bottom of the bottles, means for folding first one of the bottom flaps inwardly against the bottom of the bottles, means for then folding the second of said flaps inwardly against the bottom of the bottles, means for moving the carton from off the folding means and a conveyor onto which the carton passes as it is moved off the folding means.

23. Apparatus for placing bottles in an open bottomed carton having depending bottom flaps which comprises a conveyor for moving two aligned rows of bottles, means for disposing a carton above the bottles, means for rendering adhesive at least one of the bottom flaps of the carton, elevating means for the bottles and means for moving a batch of bottles into the elevating means, combined suction and pressure means for engaging opposed sides of the carton and moving them apart from each other, means for moving the elevating means to place a batch of bottles in the carton through the open bottom thereof, means for rendering inactive the elevating means in the event the bottles, or any part of the elevating means, are interrupted in their upward travel before reaching a pre-determined position, electrically operated means for stopping the apparatus when the bottles are interrupted in their upward travel before reaching a pre-determined position, means for exerting pressure to the suction and pressure means to clamp the carton and the bottles therein with sufficient pressure to hold the same in elevated position, means for moving the elevating means away from the bottom of the bottles, means for folding first one of the bottom flaps inwardly against the bottom of the bottles, and means for then folding the second of said flaps inwardly against the bottom of the bottles, means for moving the carton from off the folding means, and a conveyor onto which the carton passes as it leaves the folding means.

24. In a machine for placing bottles in an open bottomed carton having depending bottom flaps which comprises a conveyor for moving two aligned rows of bottles, elevating means for moving a batch of bottles, means for disposing a carton above the bottles, means for rendering adhesive at least one of the bottom flaps of the carton before it is disposed above the bottles, means for moving a batch of bottles onto the elevating means, combined suction and pressure means for engaging opposed sides of the carton and moving them apart from each other, means for moving the elevating means to place a batch of bottles in the carton through the open bottom thereof, means for exerting pressure to the suction and pressure means to clamp the carton and the bottles therein with sufficient pressure to hold the same in elevated position, means for moving the elevating means away from the bottom of the bottles, means for folding first one of the bottom flaps inwardly against the bottom of the bottles and means for then folding the second of said flaps inwardly against the bottom of the bottles, and means for moving the carton from off the folding means and a conveyor onto which the carton passes as it is moved off the folding means.

25. In a machine for placing bottles in an open bottomed carton having depending bottom flaps which comprises a conveyor for moving two aligned rows of bottles, a cam shaft having a cam disposed at one end and a hand wheel on the other end, a vertically disposed yoke member, a cam follower disposed on the yoke member for engaging the cam, a glue reservoir mounted on top of the yoke member, glue rolls for transferring glue to at least one of the bottom flaps of the carton, means whereby the cam may be turned manually to raise or lower the glue reservoir to bring the glue into or out of contact with the glue rolls, means for disposing a carton above the bottles, elevating means for the bottles and means for moving a batch of bottles onto the elevating means, combined suction and pressure means for engaging opposed sides of the carton and moving them apart from each other, means for moving the elevating means to place a batch of bottles in the carton through the open bottom thereof, means for exerting pressure to the suction and pressure means to clamp the carton with the bottles therein with sufficient pressure to hold the same in elevated position, means for moving the elevating means away from the bottom of the bottles, means for folding first one of the bottom flaps inwardly against the bottom of the bottles and means for then folding the second of said flaps inwardly against the bottom of the bottles, and means for moving the carton from off the folding means, and a conveyor onto which the carton passes as it is moved off the folding means.

26. Apparatus for placing bottles in a carton having an open bottom and a depending bottom flap as they are discharged from a bottling machine, comprising a conveyor onto which the bottles are discharged from the bottling machine, means for aligning the bottles on the conveyor in two parallel rows, means for positioning an open bottomed carton above the bottles, means for raising a batch of bottles upwardly into the carton, means for positioning the bottles on the raising means, stop motion means for the apparatus, means controlled by failure of the bottle positioning means to position a required number of bottles on the raising means for actuating the stop motion means, means for moving the bottom portion of the carton to folded position beneath the bottles while they are held in raised position, and means for conveying the cartons with the bottles therein from the machine.

27. Apparatus for placing bottles in a carton as they are discharged from a bottling machine, comprising a conveyor onto which the bottles are discharged from the bottling machine, means for aligning the bottles on the conveyor in two parallel rows, means for positioning an open bottomed carton above the bottles, said carton having a depending bottom flap hingedly connected to one of its side walls, means for raising a batch of bottles upwardly into the carton, means for positioning the bottles on the raising means, stop motion means for the apparatus controlled by failure of the bottle positioning means to position a required number of bottles on the raising means for actuating the stop motion means, a second stop motion means for the apparatus cooperating with the first-named stop motion means for causing all moving parts of the machine to stop in a pre-determined position, means for moving the bottom portion of the carton to folded position beneath the bottles while they are held in raised position, and means for conveying the cartons with the bottles therein from the machine.

28. In a machine for placing bottles in a carton as they are discharged from a bottling machine, comprising a conveyor onto which the bottles are discharged from the bottling machine, means for aligning the bottles on the conveyor in two parallel rows, means for positioning an open bottomed carton above the bottle, said carton having a bottom flap hingedly connected to the lower end of one of its side walls, stop motion means for the machine, means controlled by failure of the positioning means positioning the open bottomed carton above the bottles for actuating the stop motion means, means for raising a batch of bottles upwardly into the carton, means for moving the bottom portion of the carton to folded position beneath the bottles while they are held in raised position, and means for conveying the cartons with the bottles therein from the machine.

29. Apparatus for placing bottles in a carton as they are discharged from a bottling machine, comprising a conveyor onto which the bottles are discharged from the bottling machine, means for aligning the bottles on the conveyor in two parallel rows, means for positioning an open bottomed carton above the bottles, said carton having a bottom flap hingedly connected to the lower end of one of its side walls, stop motion means for the machine, means controlled by failure of the positioning means positioning the open bottomed carton above the bottles for actuating the stop motion means, a second stop motion means for the apparatus cooperating with the first-named stop motion means for causing all moving parts of the machine to stop in a pre-determined position, means for raising a batch of bottles upwardly into the carton, means for moving the bottom portion of the carton to folded position beneath the bottles while they are held in position, and means for conveying the cartons with the bottles therein from the machine.

30. In a machine for placing bottles in a carton as they are discharged from a bottling machine, comprising a conveyor onto which the bottles are discharged from the bottling machine, means for aligning the bottles on the conveyor in two parallel rows, means for positioning an open bottomed carton above the bottles, said carton having a bottom hingedly connected to the lower end of one of its side walls, means for raising a batch of bottles upwardly into the carton, means for moving the bottom portion of the carton to folded position beneath the bottles while they are held in raised position, means for discharging the carton with the bottles therein from the machine, stop motion means for the machine, means controlled by failure of the discharging means to discharge the filled cartons from the machine for actuating the stop motion means, and means for conveying the discharged cartons with the bottles therein from the machine.

31. In a machine for placing bottles in an open bottomed carton having a depending bottom flap as they are discharged from a bottling machine, comprising a conveyor onto which the bottles are discharged from the bottling machine, means for aligning the bottles on the conveyor in two parallel rows, means for positioning an open bottomed carton above the bottles, means for raising a batch of bottles upwardly into the carton, stop motion means for the machine, means controlled by failure of the bottle raising means to move upwardly to a pre-determined position for actuating the stop motion means, means for moving the bottom flap of the carton to folded position beneath the bottles while they are held in raised position, and means for conveying the cartons with the bottles therein from the machine.

32. A machine for placing articles in a carton having side walls and bottom flaps depending therefrom, means for conveying the articles into the machine, means for moving the cartons to a pre-determined position in the machine, means for rendering adhesive at least one of the bottom flaps, means for positioning the open bottomed cartons above a batch of the articles, means for causing relative movement between the articles disposed at the end of the conveyor and onto which the articles are moved by the pressure of the following articles, suction means for engaging the opposed sides of the carton and moving them apart from each other a sufficient amount to receive the batch of articles sufficient to fill the carton, means for actuating the means for causing said relative movement, stop motion means for the machine, and means controlled by insufficient suction in the suction means to hold the opposed side walls of the carton as they are being moved apart from each other for actuating the stop motion means, means for exerting pressure to the suction means on each side of the carton to clamp the carton and the articles therein, means for moving the means causing said relative movement, means for folding the bottom flaps against the bottom of the articles, means for causing the suction and pressure means to move away from the side walls of the carton to allow the carton with the flaps in folded condition to rest on the folding means, means for moving the carton from off the folding means rearwardly of the machine, and means for engaging the carton after its flaps have been folded and moving it out of the machine.

33. A machine for placing articles in a carton having side walls and bottom flaps depending therefrom, means for conveying the articles into the machine, means for moving the cartons to a predetermined position in the machine, means for rendering adhesive at least one of the bottom flaps, means for positioning the open bottomed cartons above a batch of the articles, means for causing relative movement between the articles disposed at the end of the conveyor and onto which the articles are moved by the pressure of the following articles and the carton, suction means for engaging the opposed side walls of the carton and moving them apart from each other a sufficient amount to receive the batch of articles sufficient to fill the carton, stop motion means for the machine, and means controlled by insufficient suction in the suction means to hold the opposed side walls of the carton as they are being moved apart from each other for actuating the stop motion means, stop motion means for the apparatus cooperating with the first-named stop motion means for causing all moving parts of the machine to stop in a predetermined position, means for actuating the means causing relative movement to place the articles in the carton, means for exerting pressure on the suction means on each side of the carton to clamp the carton and the articles therein, means for retracting the means causing relative movement, means for folding the bottom flaps against the bottom of the articles, means for causing the suction and pressure means to move away from the side walls of the carton and to allow the carton with the flaps in folded condition to rest on the folding means, means for moving the carton from off the folding means rearwardly of the machine, and means for engaging the carton after its flaps have been folded and moving it out of the machine.

34. An apparatus of the class described, comprising in combination means for moving a plurality of articles into the apparatus, means for positioning an open bottomed carton having a depending bottom flap above the articles, means for elevating a plurality of the articles into the carton, means for opening the carton to a sufficient width to receive a batch of bottles, means for moving the opening means to cause them to engage the sides of the carton to support the carton and the articles therein, means for lowering the elevating means, means for folding the bottom flap into horizontal position against the bottom of the articles in the carton, and means for securing the flap to the carton after it is folded into horizontal position.

35. An apparatus of the class described, comprising in combination means for moving a plurality of bottles into the apparatus, means for positioning an open bottomed container above the bottles, means for opening the carton to a sufficient width to receive a batch of bottles, means for causing relative movement betwen the bottles and the container to position a plurality of the bottles in the container, means for moving the opening means to clamp the sides of the container while the means causing relative movement are returned to original position, means for folding the flap into horizontal position against the bottles in the container, and means for securing the flap to the container after it is folded into horizontal position.

GROVER C. CURRIE.
BERNARD D. DANS.
STERLING R. ARNER.

REFERENCES CITED

The following references are of record in the file of this patent:

UNITED STATES PATENTS

| Number | Name | Date |
|---|---|---|
| 986,548 | Cowles | Mar. 14, 1911 |
| 1,870,533 | Scott et al. | Aug. 9, 1932 |
| 1,955,493 | Grover | Apr. 17, 1934 |
| 2,050,547 | Thayer | Aug. 11, 1936 |
| 2,276,129 | Wesselman | Mar. 10, 1942 |
| 2,312,651 | Koolnis | Mar. 2, 1943 |
| 2,350,560 | Kimball | June 6, 1944 |
| 2,382,987 | Gardner | Aug. 21, 1945 |
| 2,379,655 | Russell et al. | Apr. 2, 1946 |